(12) United States Patent
Yamada et al.

(10) Patent No.: US 8,303,192 B2
(45) Date of Patent: Nov. 6, 2012

(54) RESIN CAGE AND ROLLING BEARING

(75) Inventors: Takiyoshi Yamada, Chigasaki (JP);
Takahiko Uchiyama, Fujisawa (JP);
Kenichi Iso, Yamato (JP); Junji Ono,
Fujisawa (JP); Masahiro Harunaga,
Maebashi (JP); Kinji Yukawa, Fujisawa
(JP); Makoto Yasuda, Kasumigaura
(JP); Jianjun Zhan, Fujisawa (JP);
Nariaki Aihara, Yokohama (JP)

(73) Assignee: NSK Ltd., Tokyo (JP)

( * ) Notice: Subject to any disclaimer, the term of this patent is extended or adjusted under 35 U.S.C. 154(b) by 847 days.

(21) Appl. No.: 12/094,101

(22) PCT Filed: Nov. 20, 2006

(86) PCT No.: PCT/JP2006/323133
§ 371 (c)(1),
(2), (4) Date: May 13, 2009

(87) PCT Pub. No.: WO2007/058351
PCT Pub. Date: May 24, 2007

(65) Prior Publication Data
US 2009/0220181 A1 Sep. 3, 2009

(30) Foreign Application Priority Data

| Nov. 18, 2005 | (JP) | 2005-334058 |
| Apr. 28, 2006 | (JP) | 2006-126785 |
| May 23, 2006 | (JP) | 2006-143098 |
| Jun. 8, 2006 | (JP) | 2006-160071 |
| Jun. 15, 2006 | (JP) | 2006-166552 |
| Jun. 23, 2006 | (JP) | 2006-174002 |
| Oct. 4, 2006 | (JP) | 2006-272773 |

(51) Int. Cl.
*F16C 33/56* (2006.01)
(52) U.S. Cl. ....................................................... 384/576
(58) Field of Classification Search .................. 384/523, 384/526, 527, 528, 531, 532, 534, 572, 576, 384/578, 573, 574, 575, 577, 579, 580
See application file for complete search history.

(56) References Cited

U.S. PATENT DOCUMENTS 3,554,621 A * 1/1971 McAllister ................... 384/484
(Continued)

FOREIGN PATENT DOCUMENTS

GB 833 847 A 5/1960
(Continued)

OTHER PUBLICATIONS

English translation of The International Preliminary Report of the Patentability dated May 29, 2008 (Twelve (12) pages).

(Continued)

*Primary Examiner* — Phillip A Johnson
(74) *Attorney, Agent, or Firm* — Crowell & Moring LLP

(57) ABSTRACT

A resin snap cage 4 comprises a resin-made circular main part 10, a plurality of pockets 11 provided in one axial end face of the circular main part 10, and a circular reinforcing member 12 installed concentrically at the other end face in an axial direction of the circular main part 10. While this reinforcing member 12 is circular along the circular main part 10, a sectional shape in a plane parallel to an axial direction is a rectangle. The reinforcing member 12 is embedded in a recessed portion formed at the other end face in an axial direction of the circular main part 10 to be integrated, an outside diameter surface 12a, an inside diameter surface 12b, and a pocket-side surface 12c of the reinforcing member 12 are covered with the circular main part 10, and a surface 12d thereof opposite to the pocket side is exposed. This resin snap cage 4 is produced by insert molding where the reinforcing member 12 is made as an insert, and the circular main part 10 and the reinforcing member 12 are integrated at the time of the insert molding.

9 Claims, 57 Drawing Sheets

U.S. PATENT DOCUMENTS

| | | | |
|---|---|---|---|
| 5,419,641 A | 5/1995 | Fujinami et al. | |
| 7,320,257 B2 | 1/2008 | Takizawa et al. | |
| 7,592,798 B2 | 9/2009 | Yabe et al. | |
| 2004/0057640 A1 | 3/2004 | Michioka et al. | |

FOREIGN PATENT DOCUMENTS

| | | | |
|---|---|---|---|
| JP | 5-14641 U | | 2/1993 |
| JP | 5-17230 U | | 3/1993 |
| JP | 5-52215 A | | 3/1993 |
| JP | 6-8821 U | | 2/1994 |
| JP | 6-294418 A | | 10/1994 |
| JP | 8-145061 A | | 6/1996 |
| JP | 8-152026 A | | 6/1996 |
| JP | 8-320026 A | | 12/1996 |
| JP | 9-79265 A | | 3/1997 |
| JP | 9-174192 A | | 7/1997 |
| JP | 9-177794 A | | 7/1997 |
| JP | 10-9272 A | | 1/1998 |
| JP | 10009272 A | * | 1/1998 |
| JP | 2000-161365 A | | 6/2000 |
| JP | 2001-74048 A | | 3/2001 |
| JP | 2003-287032 A | | 10/2003 |
| JP | 2004-92769 A | | 3/2004 |
| JP | 2004-156715 A | | 6/2004 |
| JP | 2005-3195 A | | 1/2005 |
| JP | 2005-31063 A | | 2/2005 |
| JP | 2005-55379 A | | 3/2005 |
| JP | 2005-164253 A | | 6/2005 |
| JP | 2006-17654 A | | 1/2006 |
| JP | 2006-300251 A | | 11/2006 |
| WO | WO 2005/071362 A1 | | 8/2005 |

OTHER PUBLICATIONS

Japanese Office Action dated Jan. 18, 2011 including English-language translation (Nine (9) pages).
International Search Report dated Feb. 13, 2007 (Five (5) pages).
Chinese Office Action dated May 26, 2010 (Seven (7) pages).
Japanese Office Action dated Apr. 10, 2012 including English-language translation (Six (6) pages).
Extended European Search Report dated Jun. 8, 2012 (sixteen (16) pages).

* cited by examiner

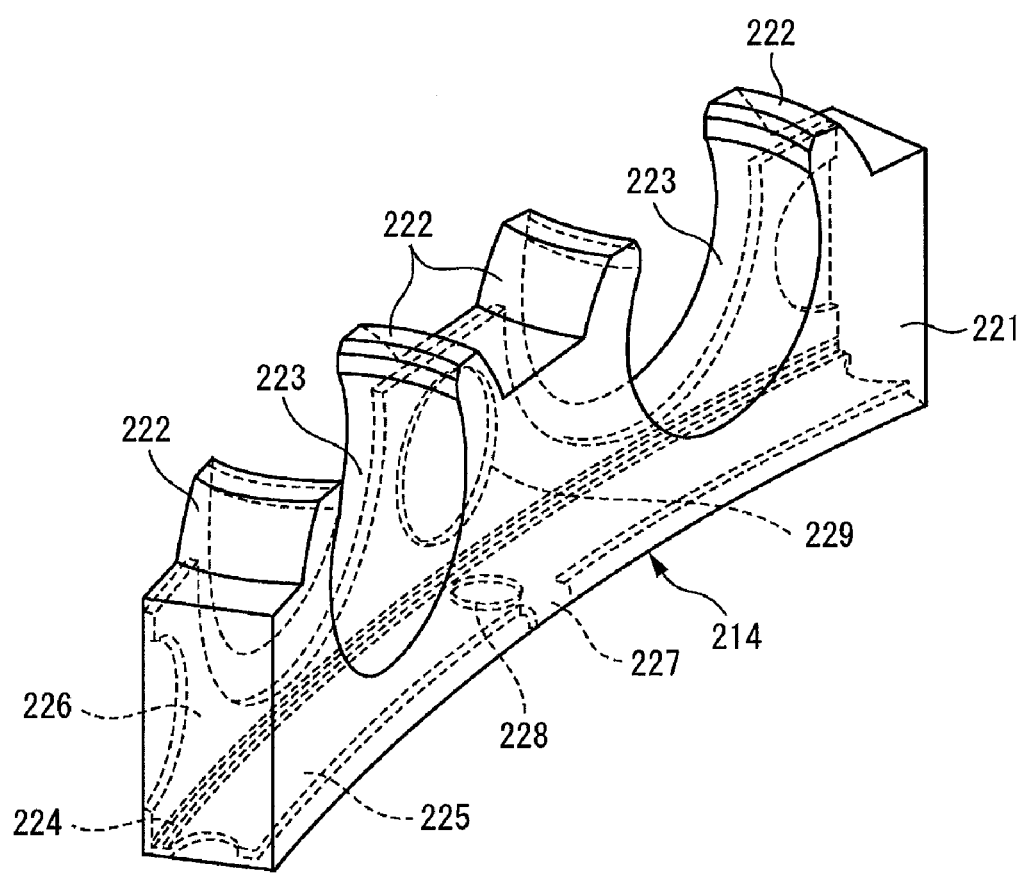
F I G. 12

F I G. 14
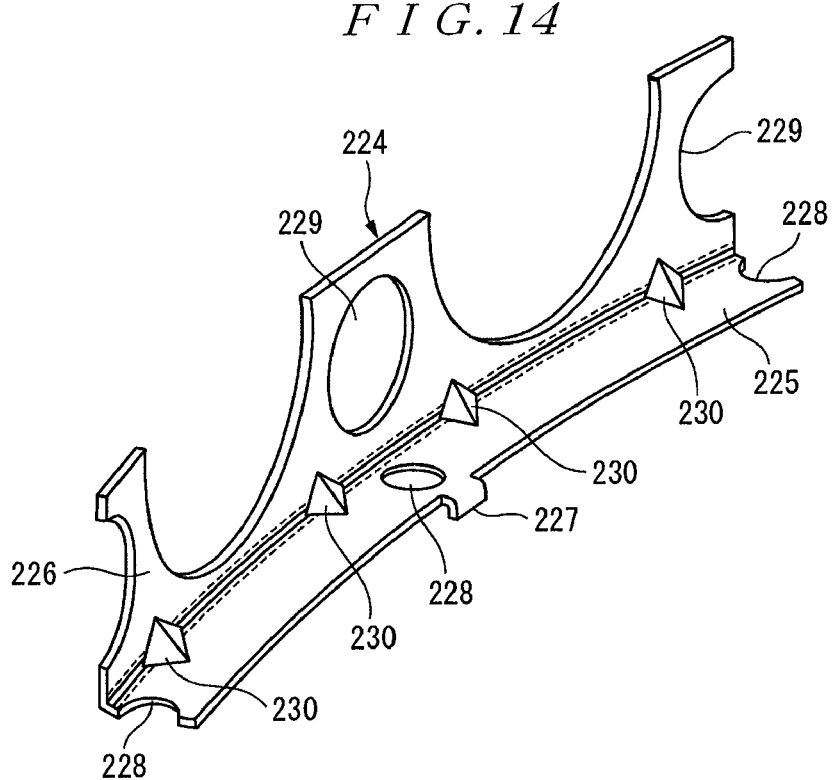
F I G. 15
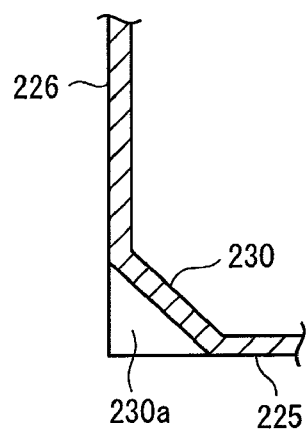

F I G. 16
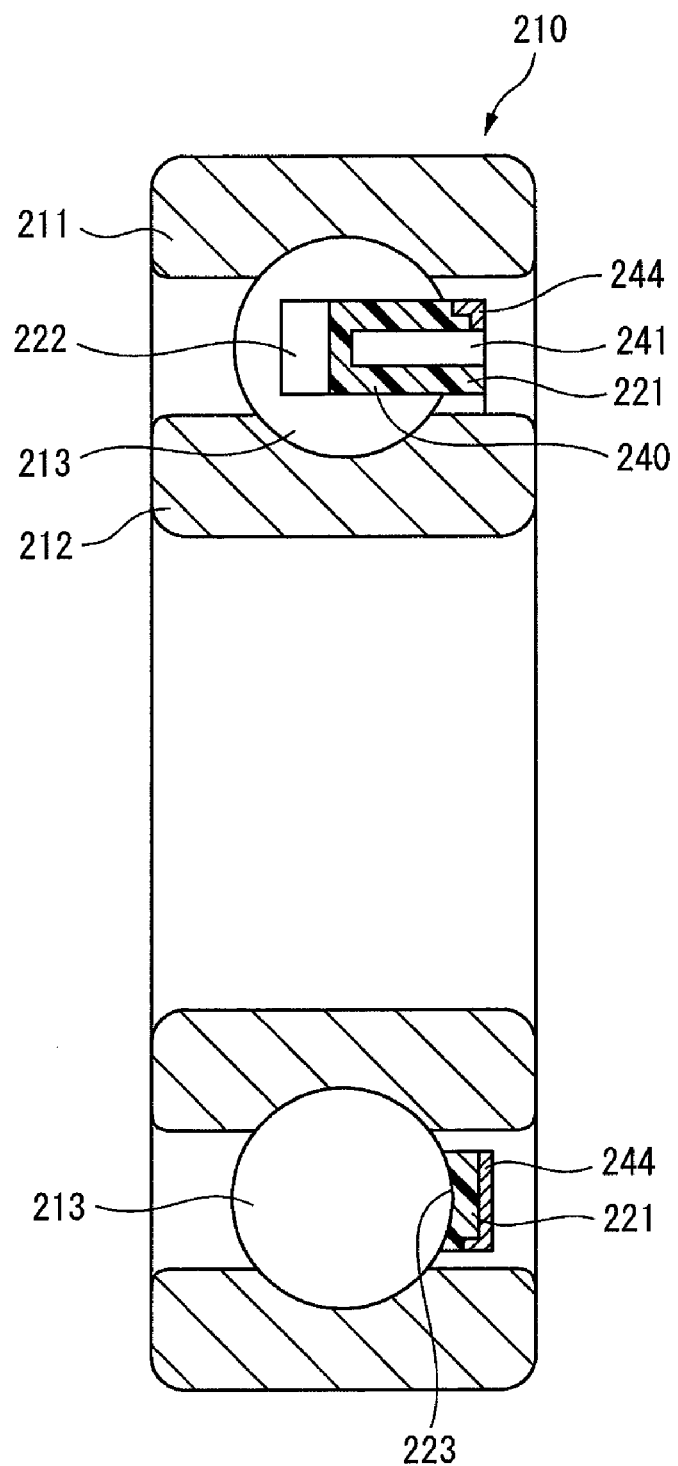

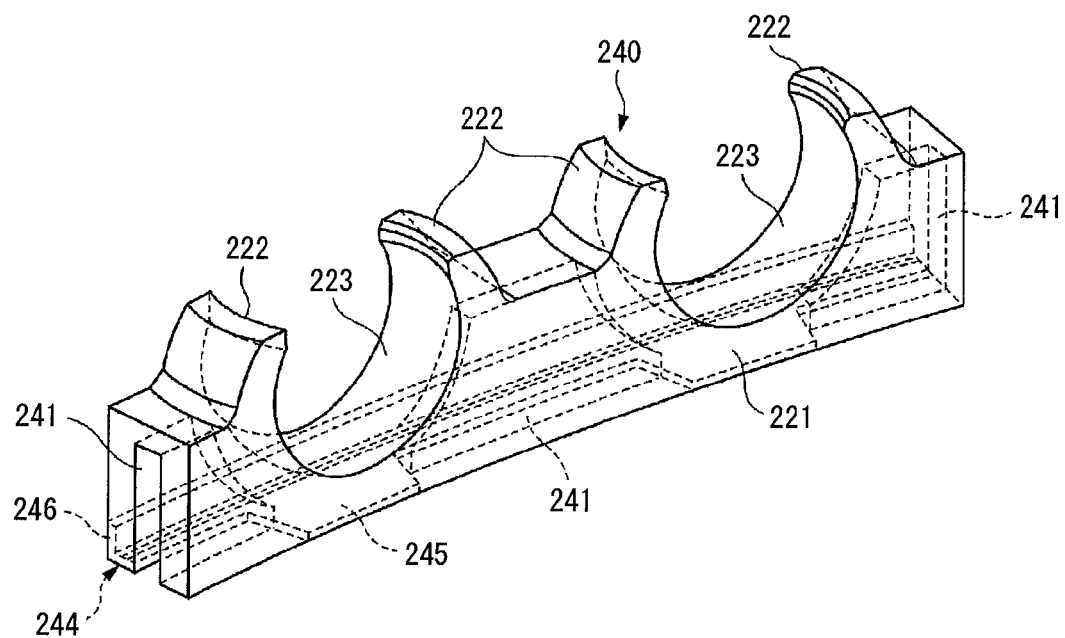
F I G. 17

F I G. 18
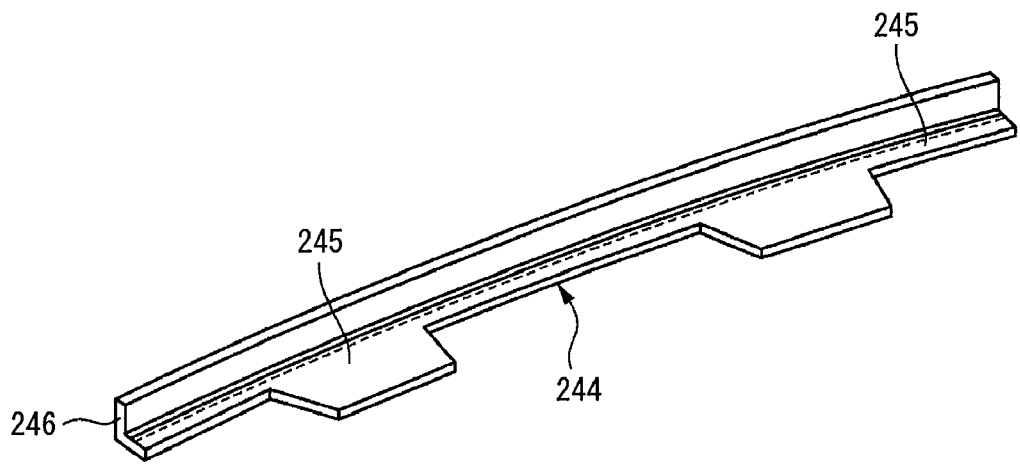
F I G. 19
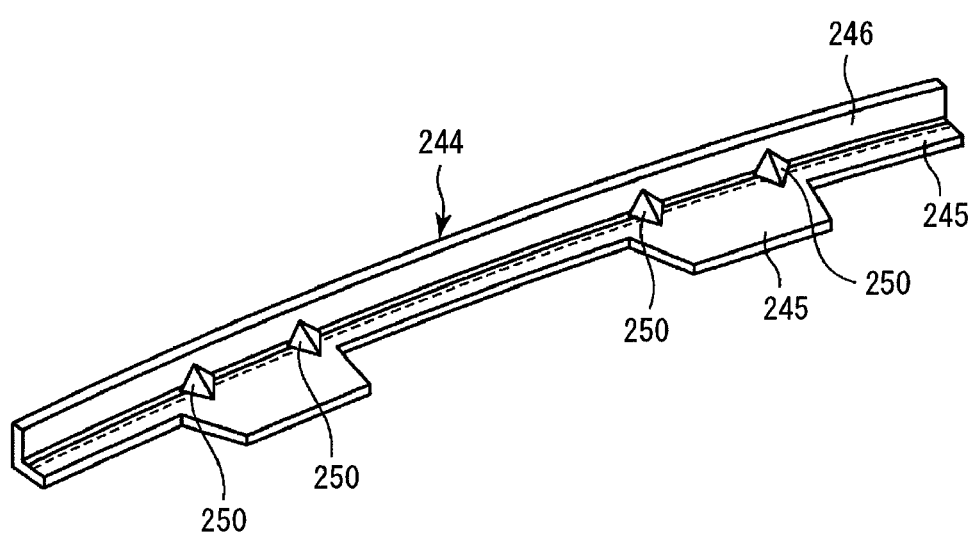

F I G. 28
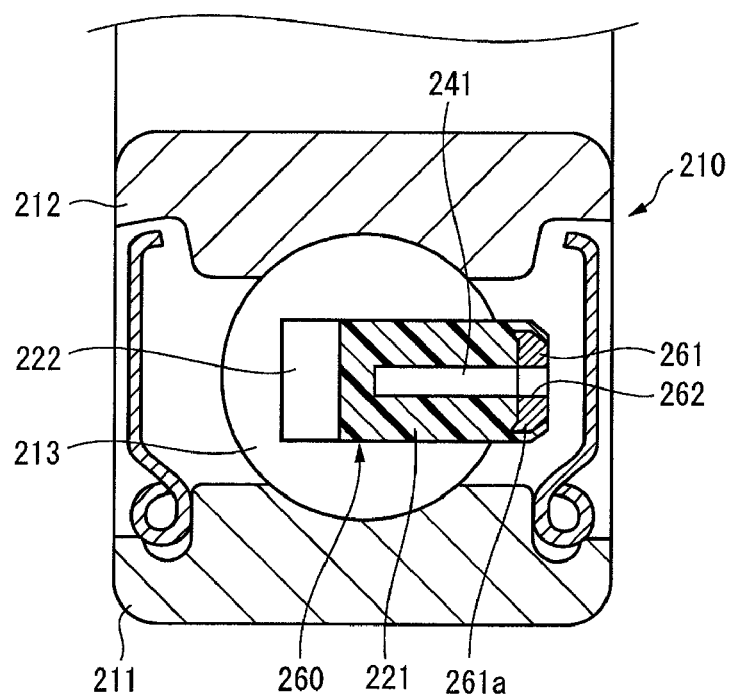
F I G. 29
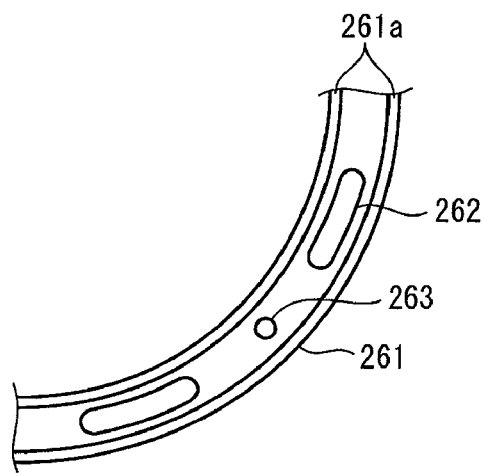

F I G. 41
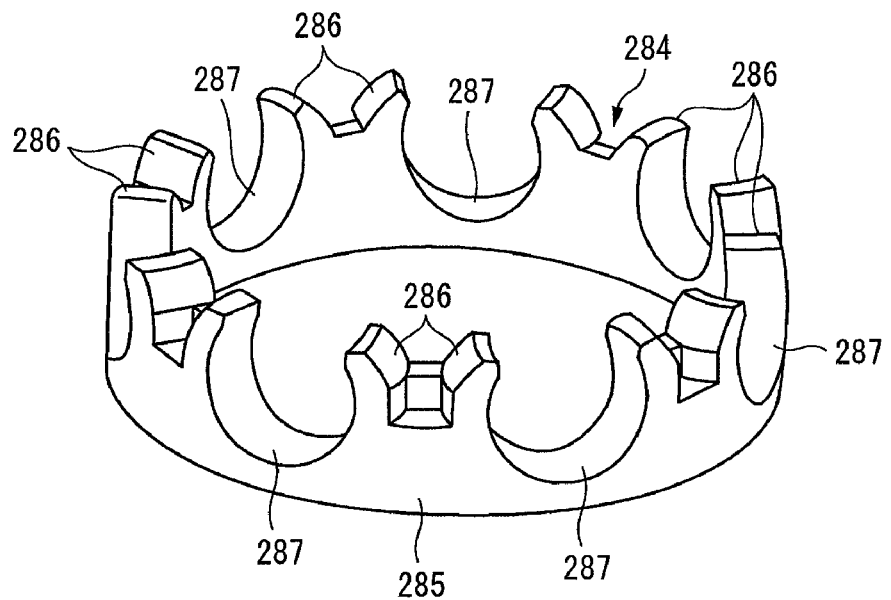
F I G. 42
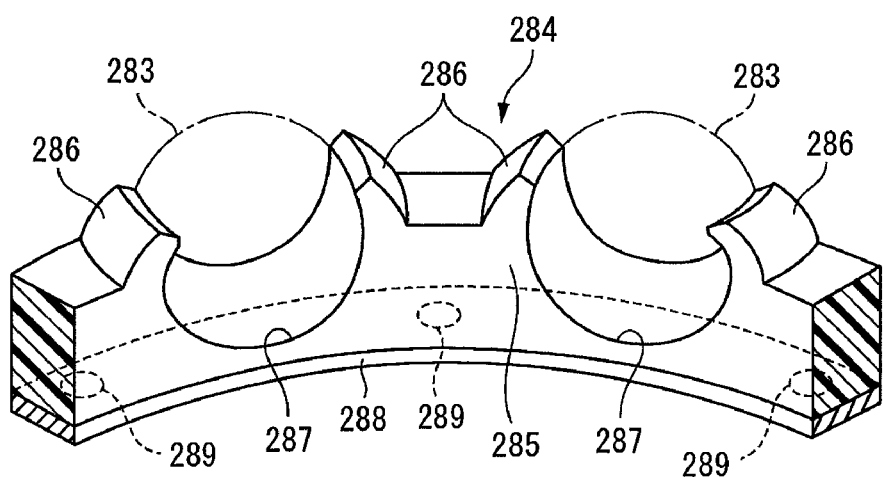

F I G. 44
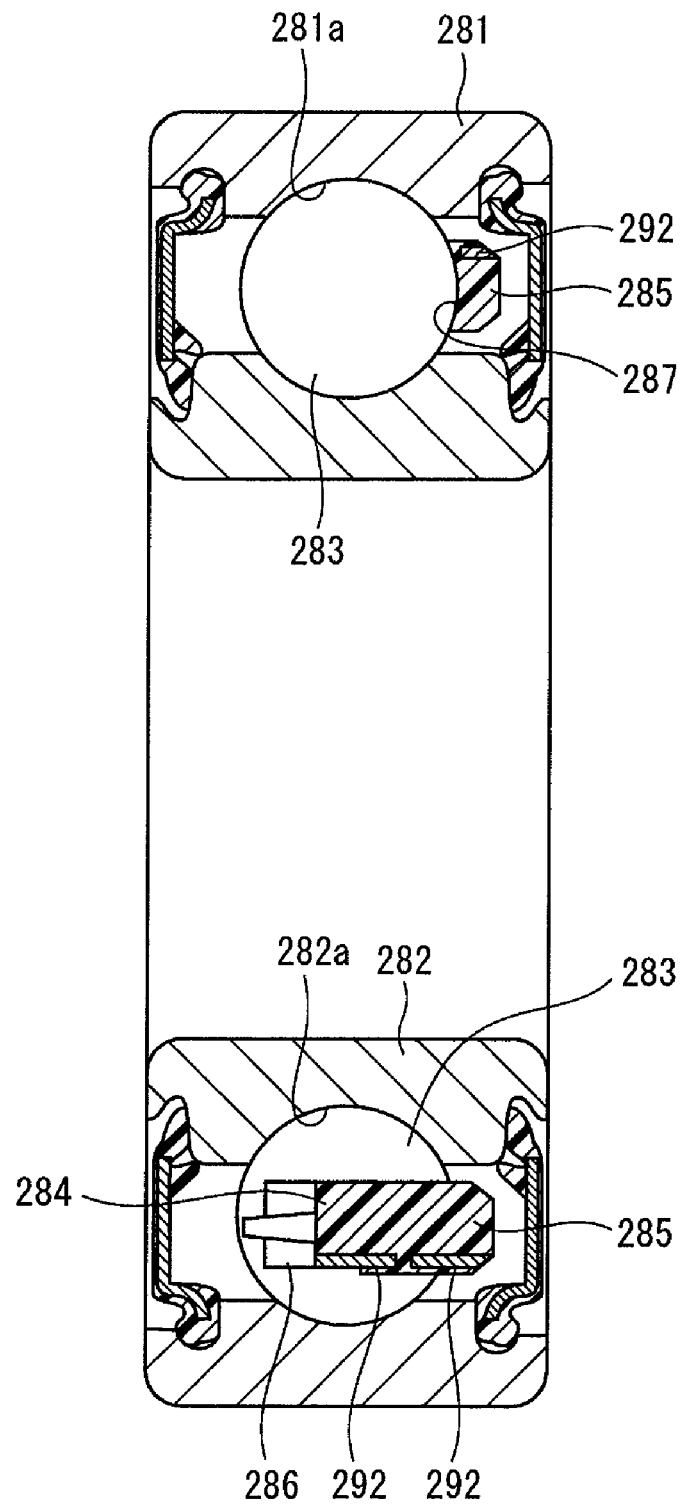

F I G. 45
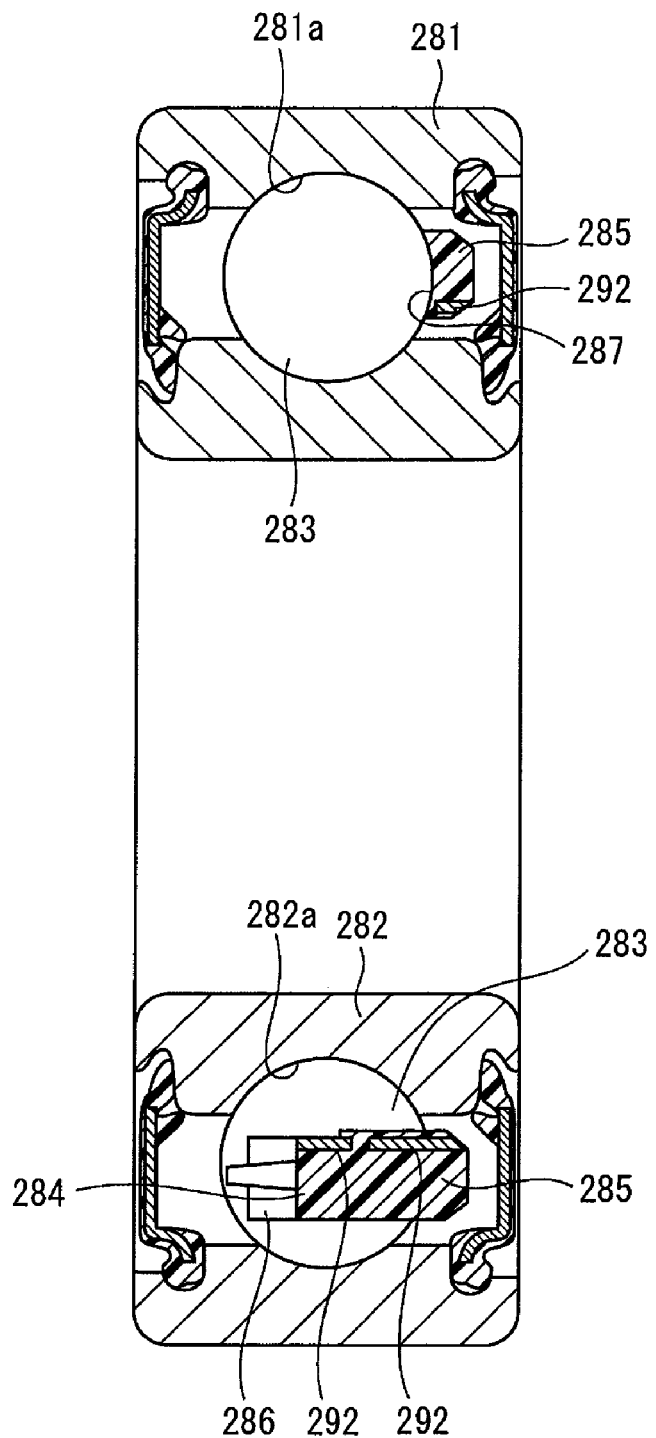

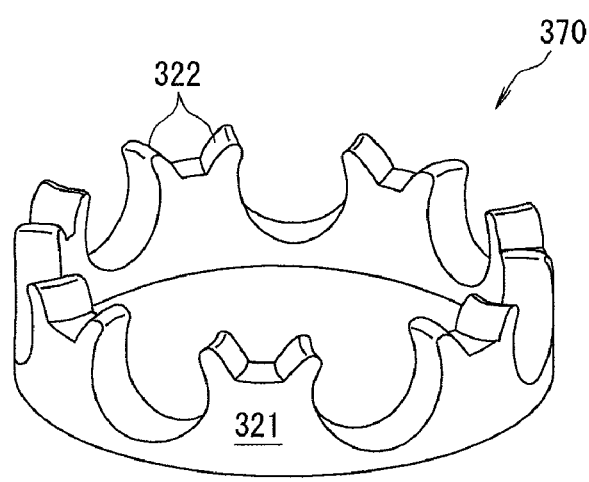
F I G. 47A
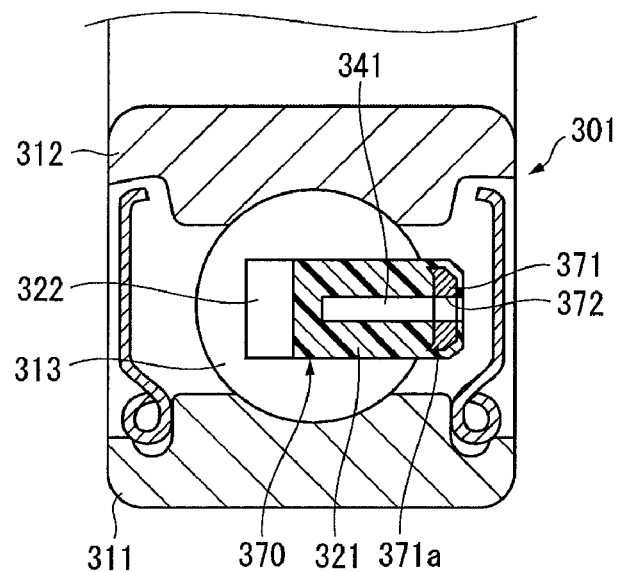
F I G. 47B
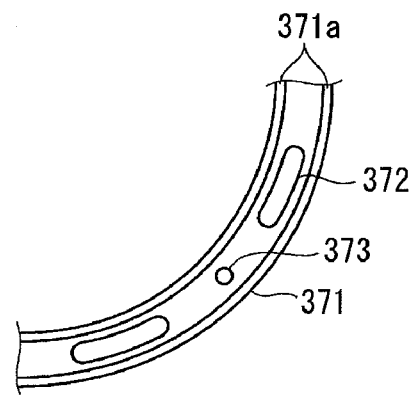
F I G. 47C

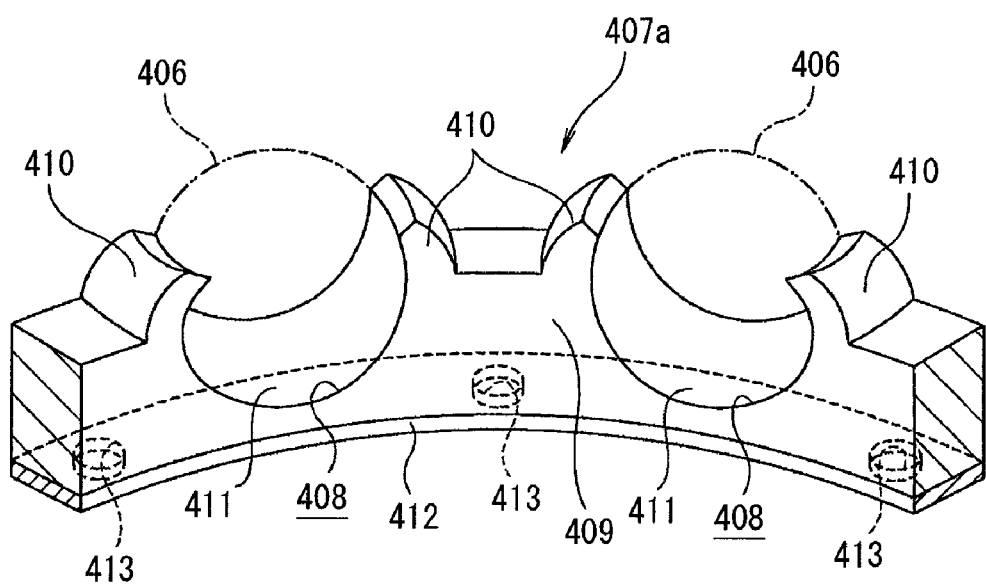
F I G. 51

F I G. 52
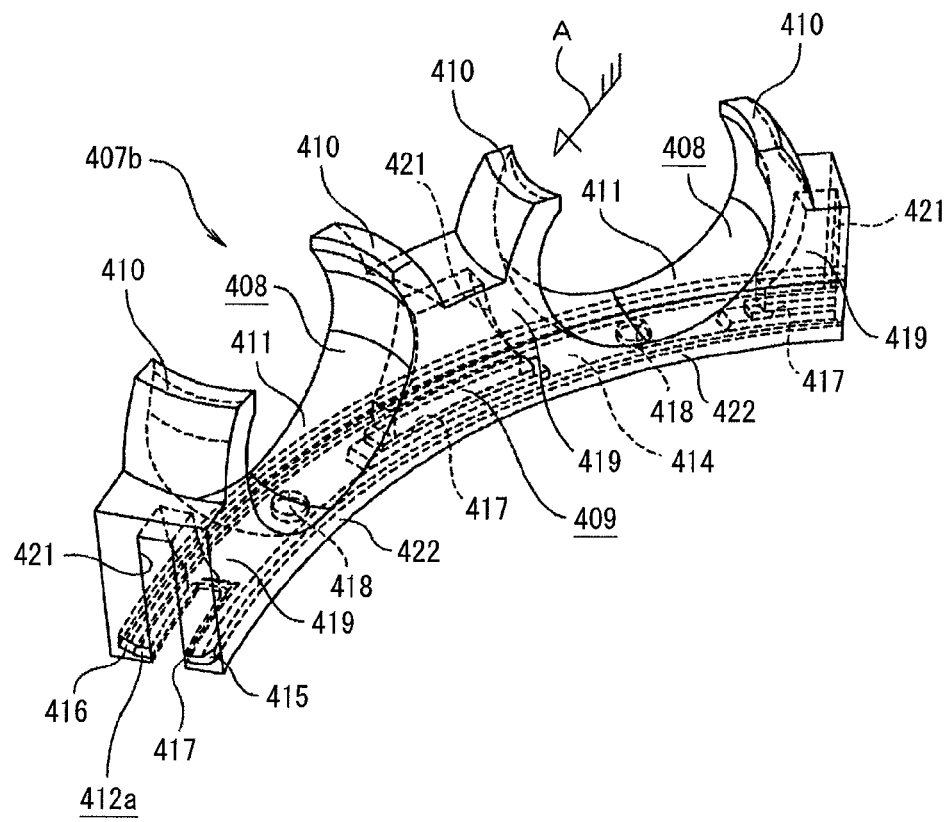
F I G. 53
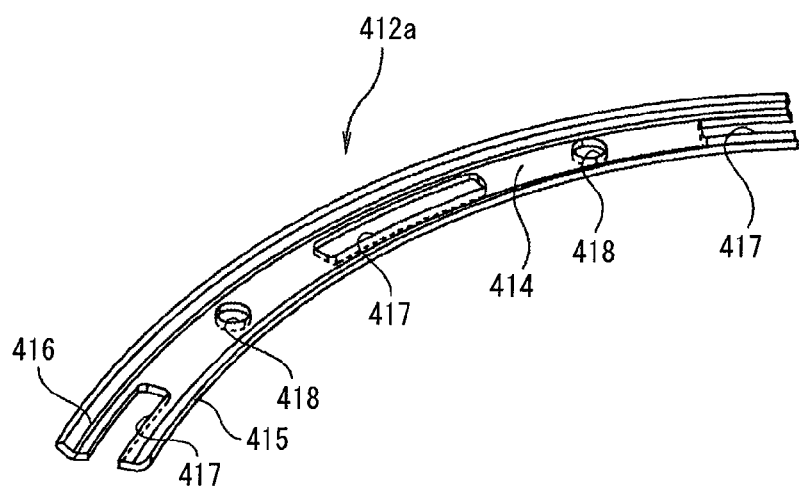

F I G. 54
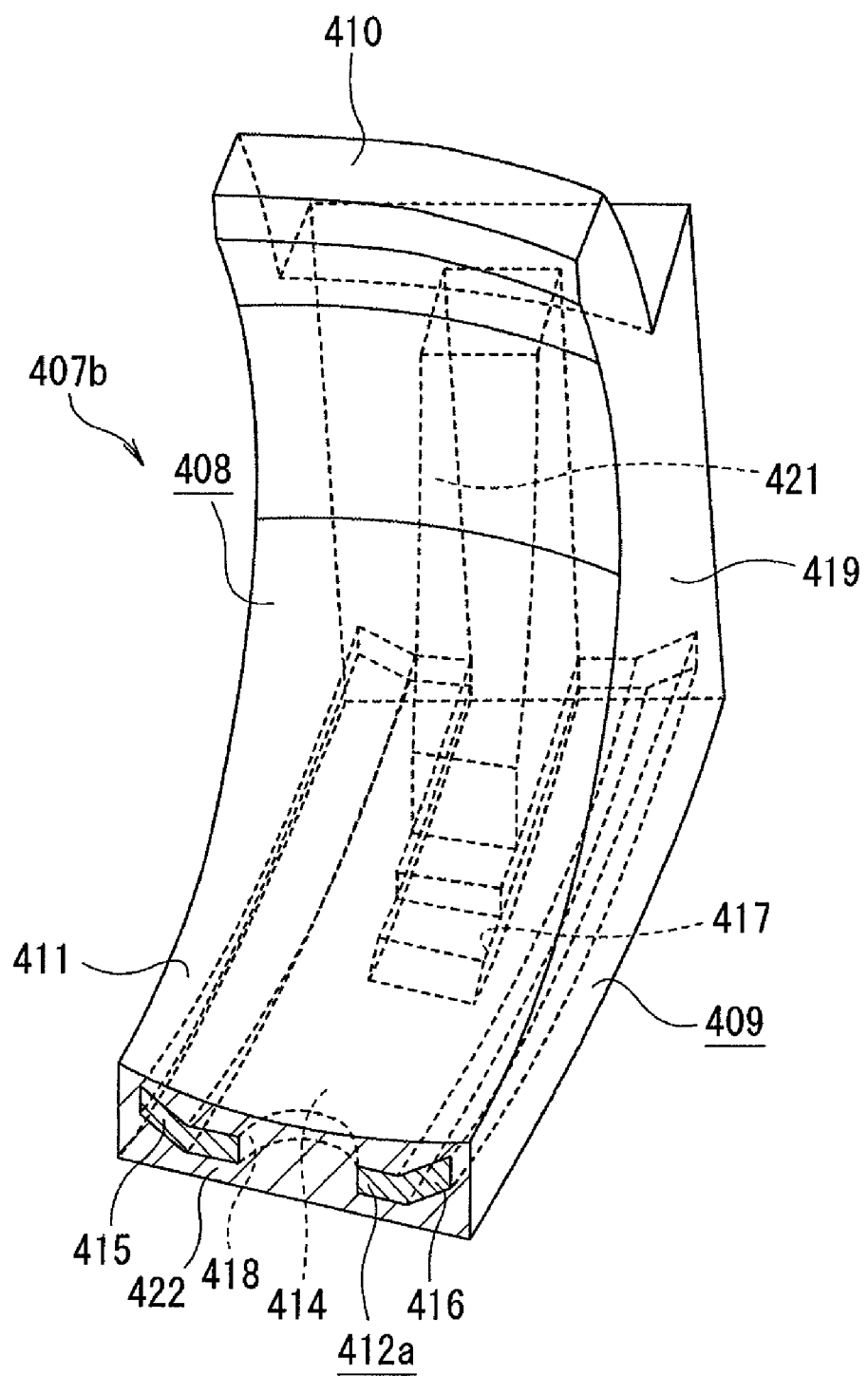

F I G. 55
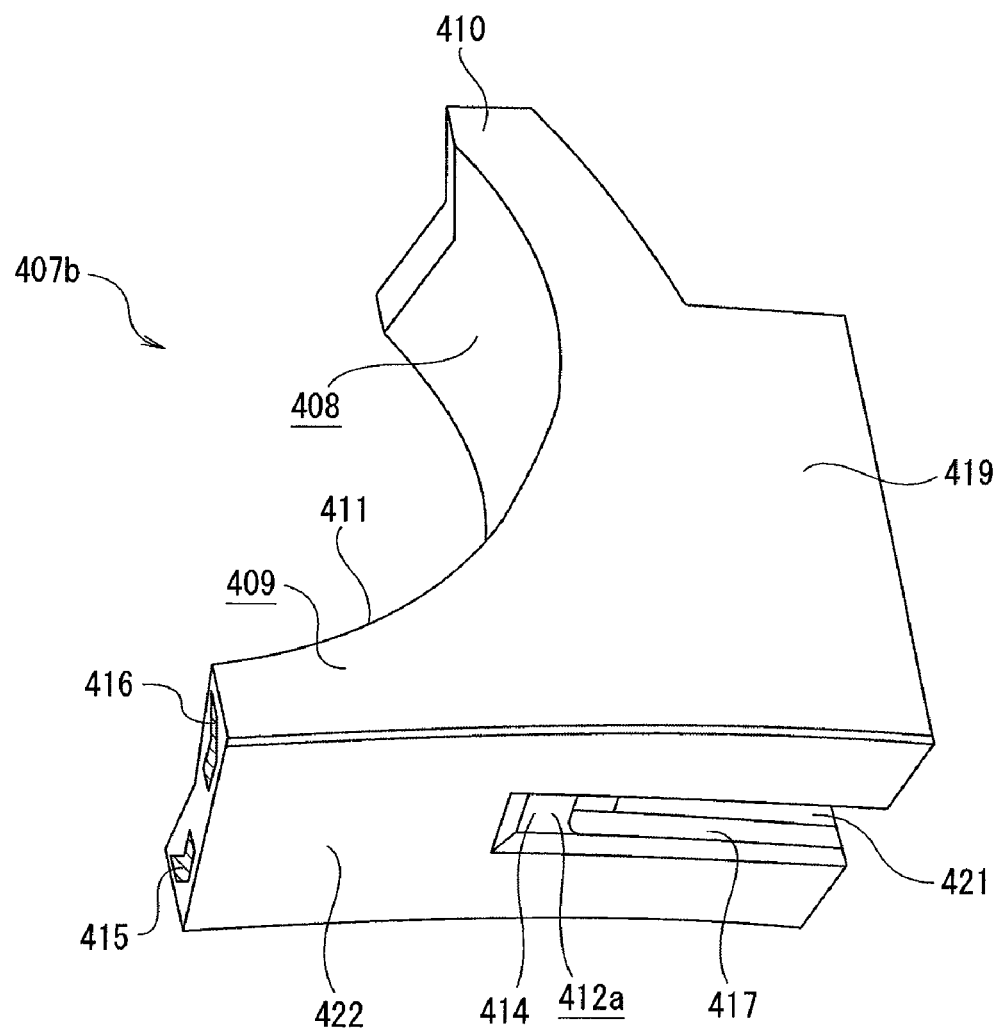

F I G. 56
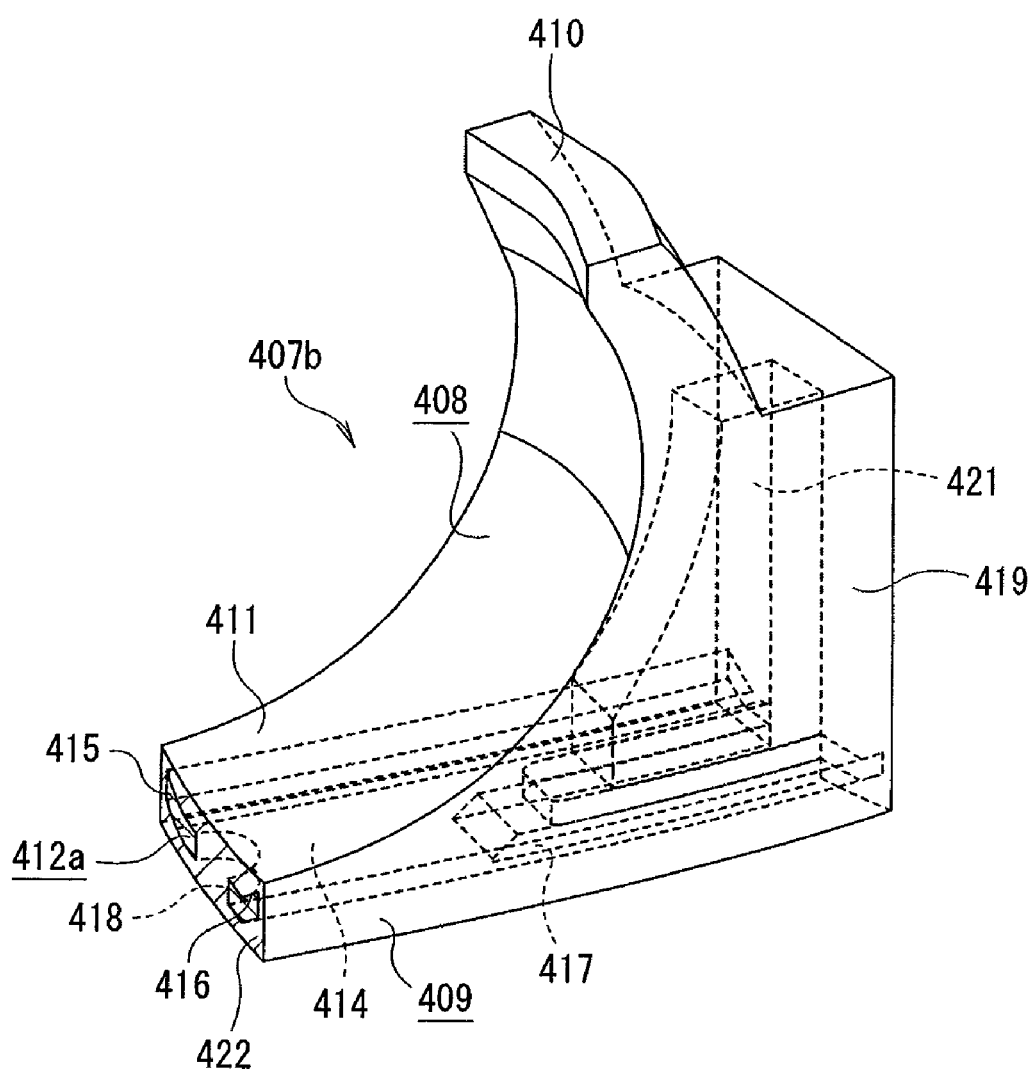

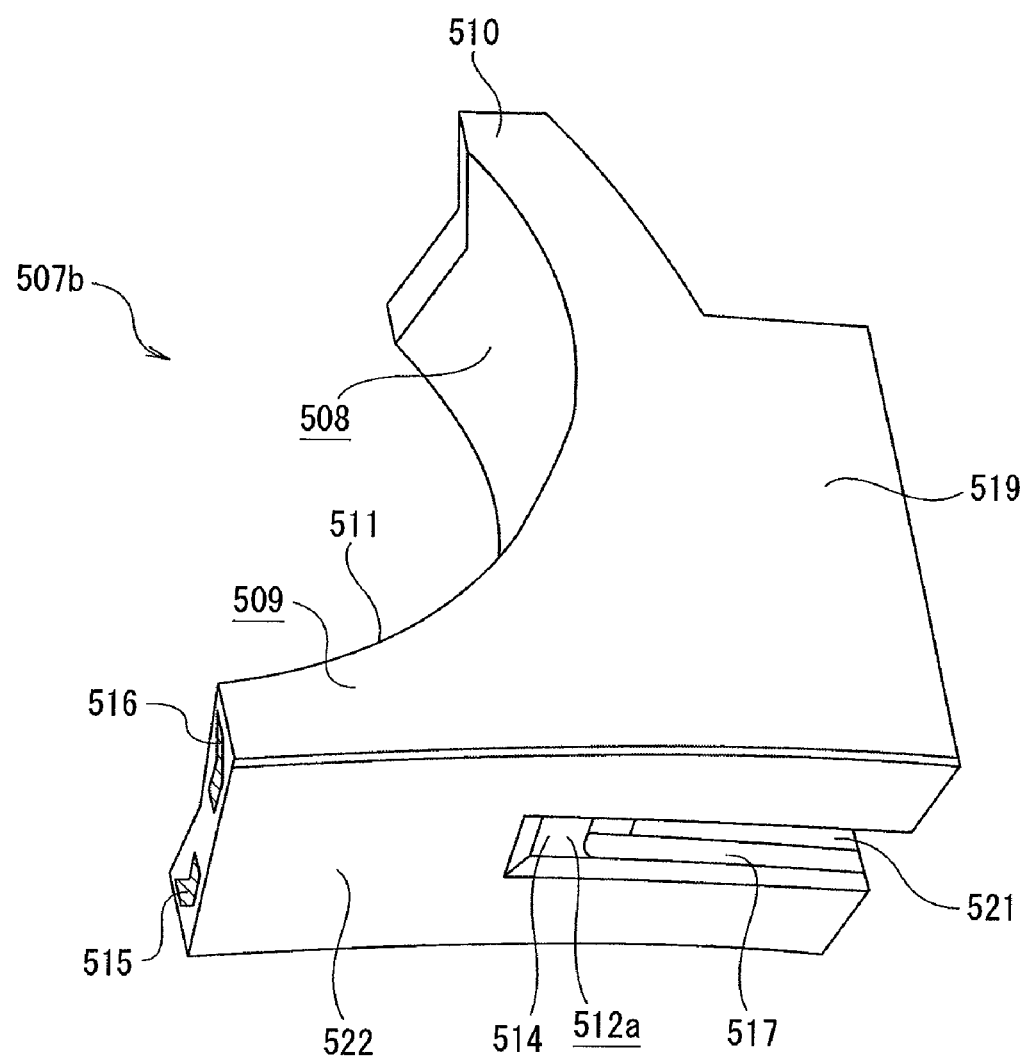
F I G. 62

F I G. 67
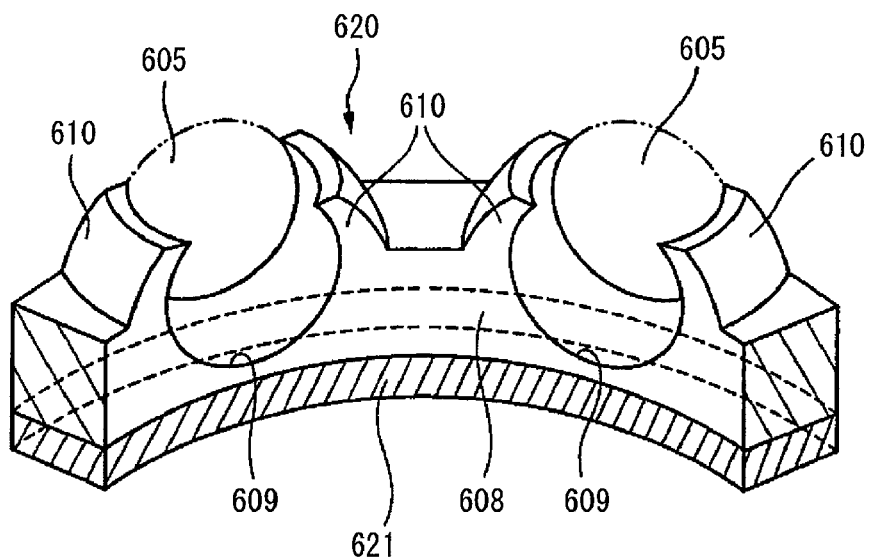
F I G. 68
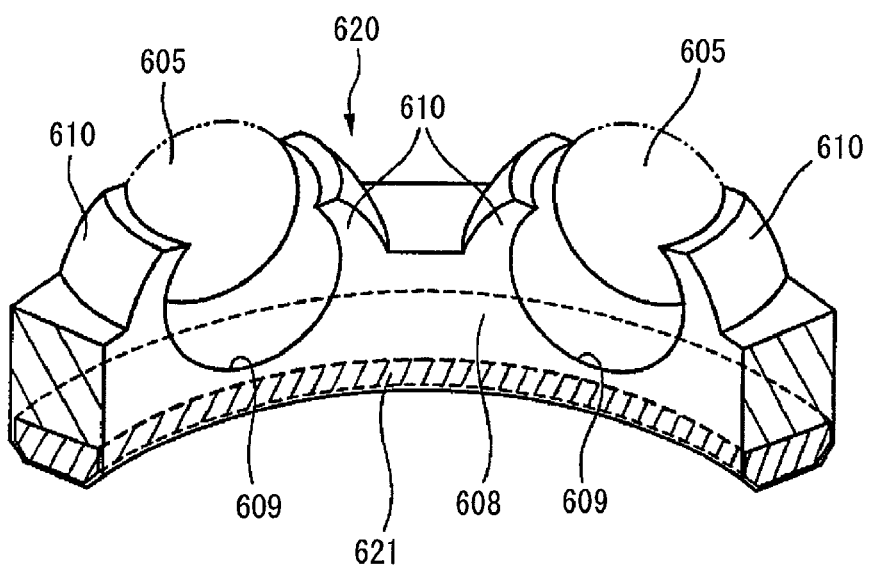

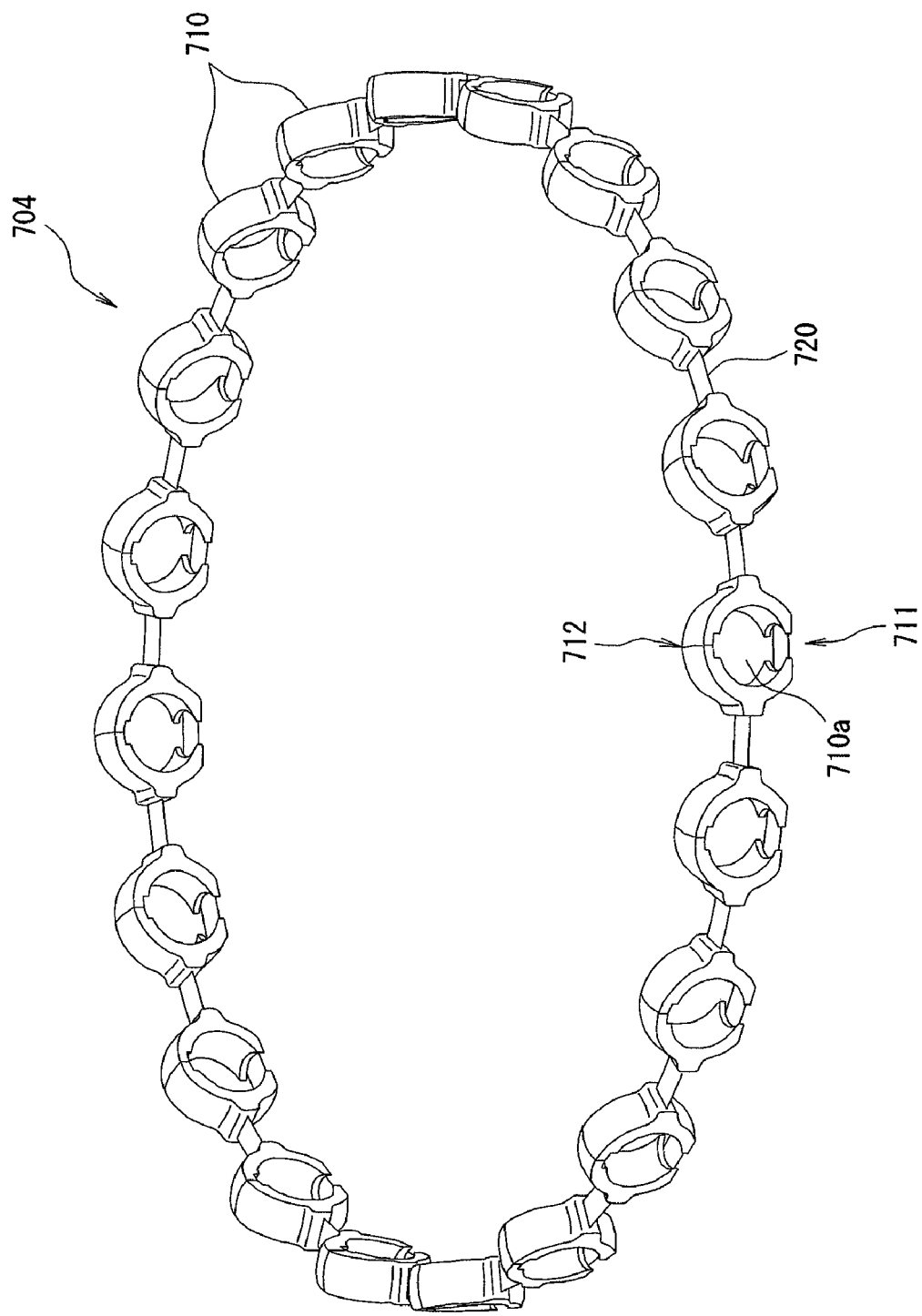

F I G. 76A
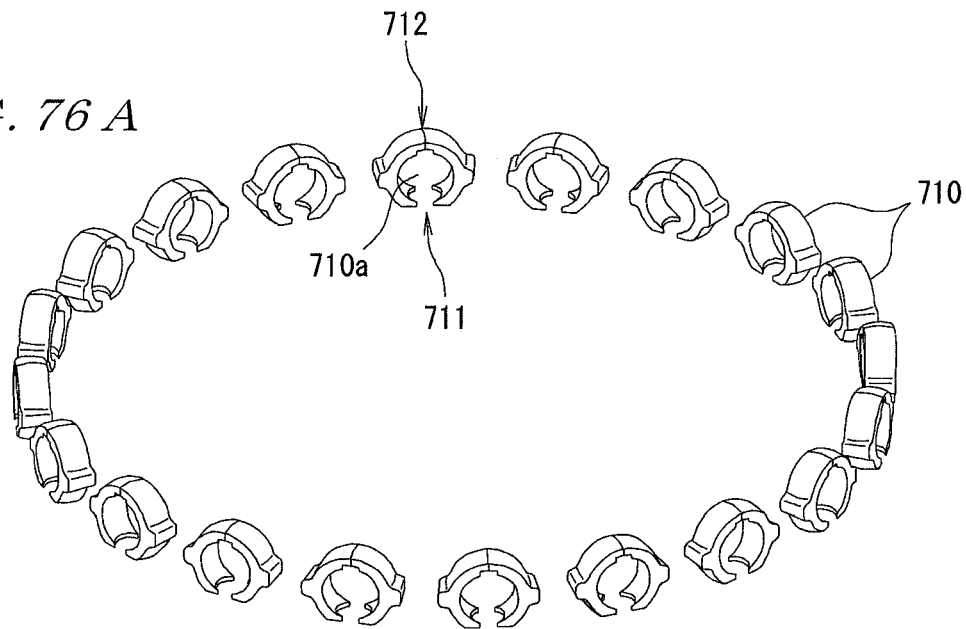
F I G. 76B
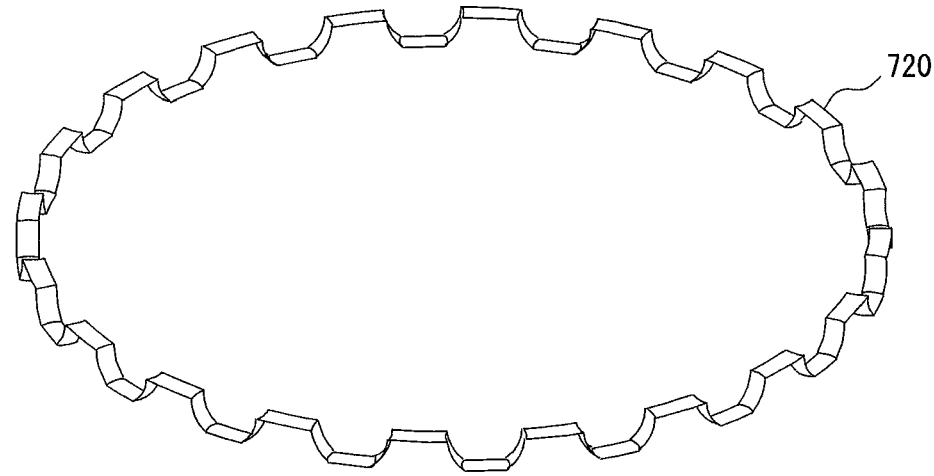

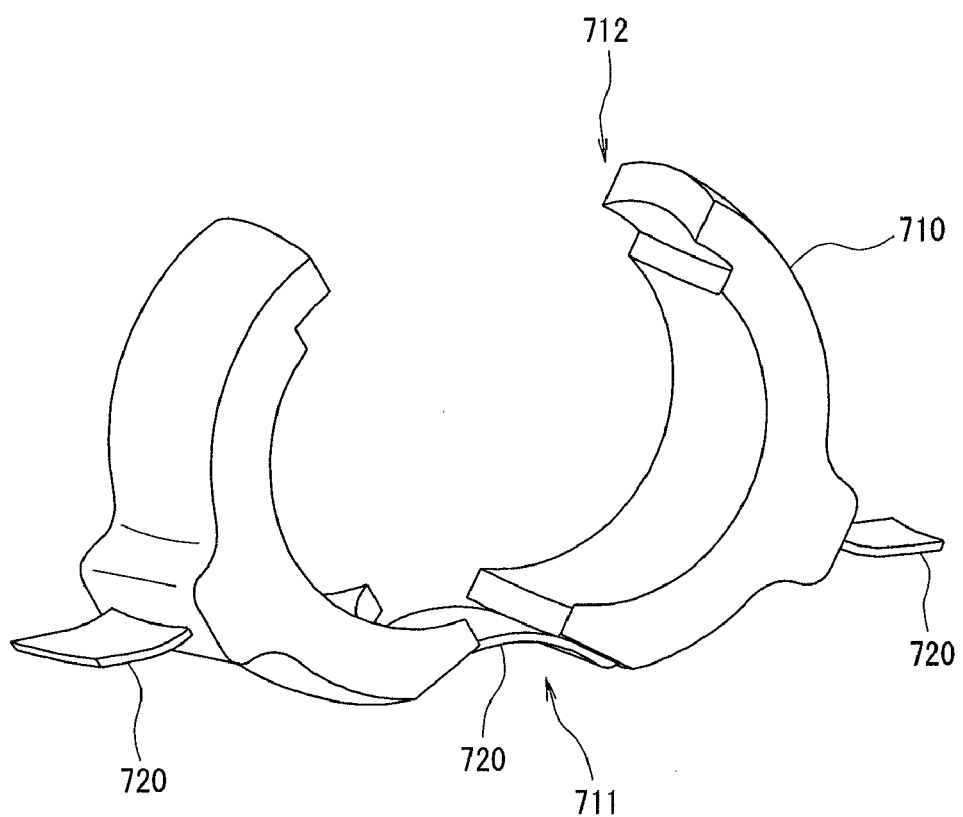
F I G. 77

F I G. 78
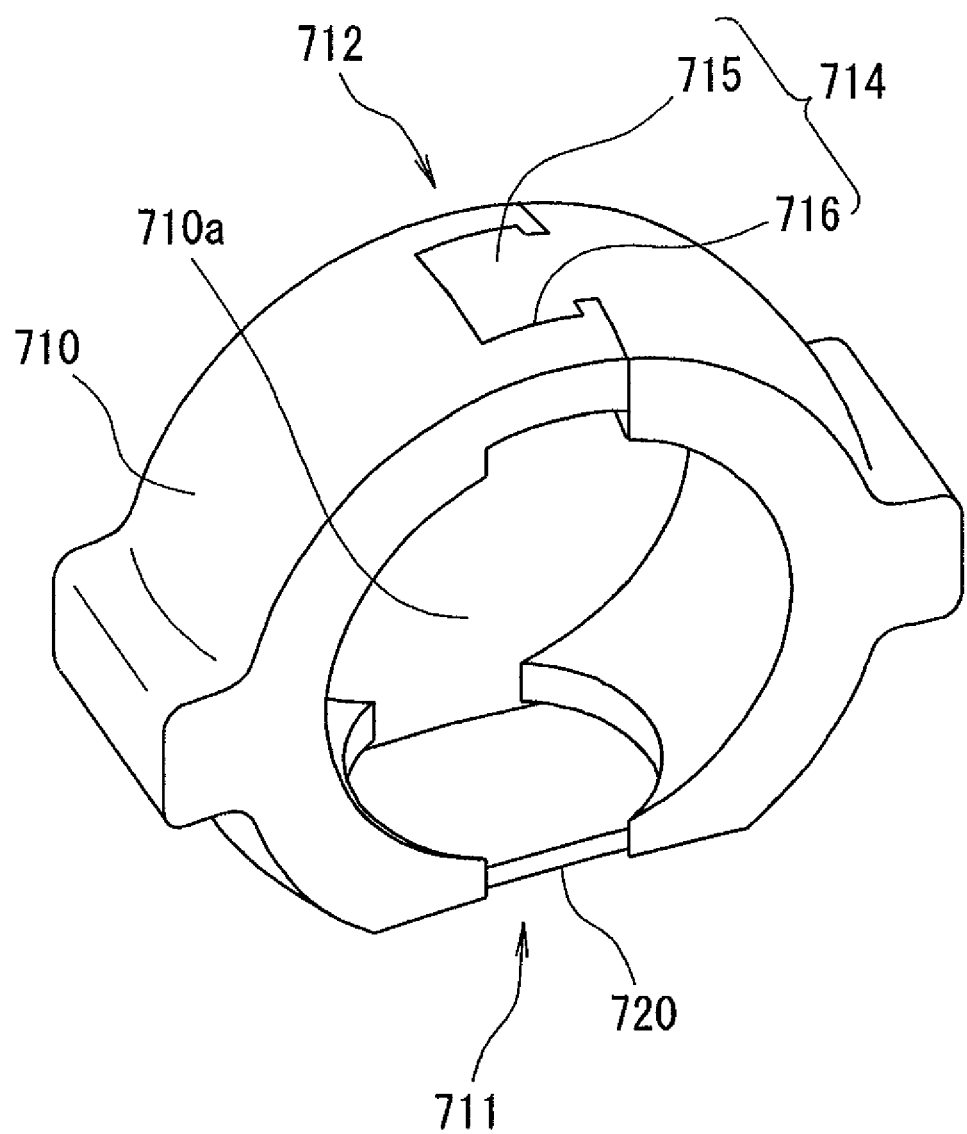

F I G. 83
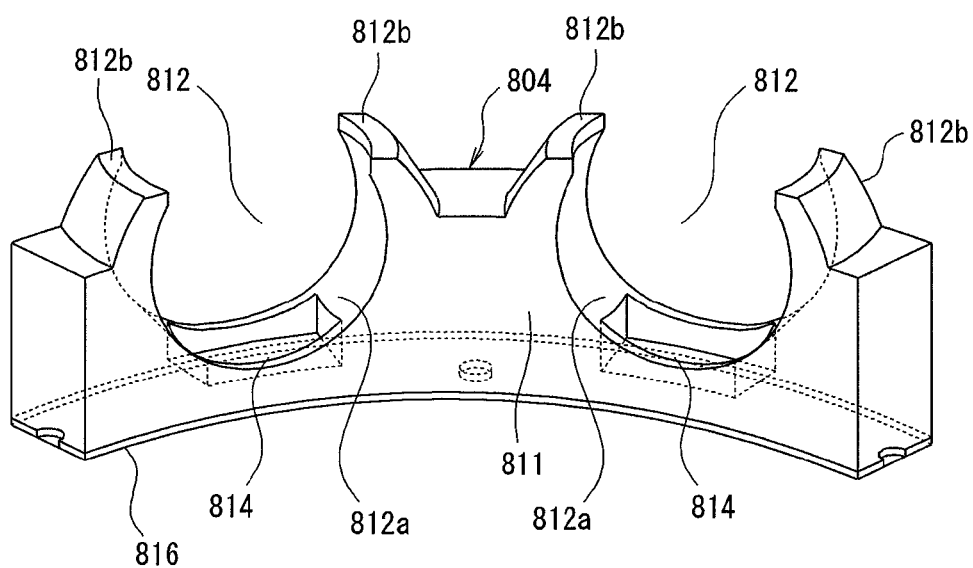
F I G. 84
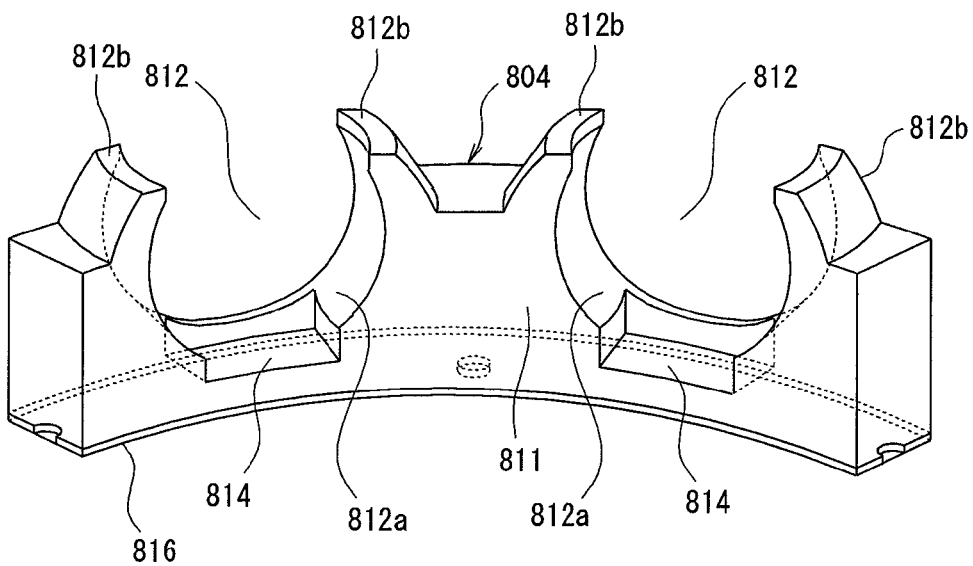

US 8,303,192 B2

RESIN CAGE AND ROLLING BEARING

TECHNICAL FIELD

The present invention relates to a resin cage. In addition, the present invention relates to a rolling bearing equipped with the resin cage.

BACKGROUND ART

Recently, since acceleration of revolution speed of a ball bearing has advanced, there have been problems such as heat generation by a cage contacting an outer ring, a seal, and a shield subsequent to elastic deformation of the cage, heat generation by a PCD of balls and a PCD of pockets of cages shifting, whip, and the like.

As far as the local deformation of a cage, in the consequence of a finite element method analysis (FEM analysis), a pocket is expandedly deformed because of a strain generated in a bottom of the pocket (see FIG. 9). As a whole, the cage is deformed outward in a radial direction (see FIG. 10).

In order to suppress such deformation, it is effective to enhance the rigidity of the bottom of the pocket, and in particular, sectional second moment centering around the radial direction. The installation of a metal plate in a cage can enhance the rigidity, but there is a possibility that the metal plate may contact an inner ring, an outer ring, and a ball, causing heat generation and wear, only by the installation. In addition, on a high speed rotating condition, there is a high possibility that the metal plate may peel off.

Then, an object of the present application is to provide a resin cage which solves such the above-mentioned issues which the conventional technology has, and hardly causes deformation, heat generation, and wear even if it is used in high speed rotation. In addition, it is also its task to provide a rolling bearing which hardly causes heat generation and wear even if it is used in high speed rotation.

DISCLOSURE OF THE INVENTION

In order to solve the above-mentioned problems, the present application has the following structure. That is, a resin snap cage for a radial ball bearing according to a first invention of the present application, which comprises: a circular main part made of a resin; a plurality of pockets provided at a first end face in an axial direction of the circular main part; and a reinforcing member concentrically provided along the circular main part at a second end face in the axial direction of the circular main part, preferably, the following four conditions are fulfilled:

Condition 1: The reinforcing member has a rectangular cross-sectional shape at a plane parallel to the axial direction;

Condition 2: The reinforcing member is embedded to be integrally formed with a recessed portion formed at a second end face in the axial direction of the circular main part;

Condition 3: The resin snap cage is manufactured by insert molding using the reinforcing member as an insert, and the circular main part and the reinforcing member are integrally formed at the time of the insert molding or the reinforcing member is integrally fixed to the circular main part that has been manufactured by injection molding with an adhesive or press fitting.

Condition 4: When F denotes a radial distance between an outside diameter surface of the circular main part and an outside diameter surface of the reinforcing member, G denotes a radial distance between an inside diameter surface of the circular main part and an inside diameter surface of the reinforcing member, and E denotes an axial direction distance between a bottom face of one of the pockets and a pocket-side surface of the reinforcing member, E, F, and G exceed zero and the outside diameter surface, the inside diameter surface, and the pocket-side surface of the reinforcing member are covered with the circular main part and a surface opposite to the pocket side is exposed.

In addition, a resin snap cage for a radial ball bearing according to the first invention of the present application, which comprises: a circular main part made of a resin; a plurality of pockets provided at a first end face in an axial direction of the circular main part; and a circular reinforcing member concentrically provided along the circular main part at a second end face in the axial direction of the circular main part, preferably, the following four conditions are fulfilled.

Condition 5: The reinforcing member has a rectangular shape at a plane parallel to the axial direction;

Condition 6: The reinforcing member is fixed to the second end face in the axial direction of the circular main part, and an outside diameter surface, an inside diameter surface, and a surface opposite to the pocket side are not covered with the circular main part, but are exposed;

Condition 7: The resin snap cage is manufactured by insert molding using the reinforcing member as an insert, and the circular main part and the reinforcing member are integrally formed at the time of the insert molding or the reinforcing member is integrally fixed to the circular main part that has been manufactured by injection molding with an adhesive or press fitting.

Condition 8: When F denotes a radial distance between an outside diameter surface of the circular main part and an outside diameter surface of the reinforcing member, G denotes a radial distance between an inside diameter surface of the circular main part and an inside diameter surface of the reinforcing member, and E denotes an axial direction distance between a bottom face of one of the pockets and a pocket-side surface of the reinforcing member, E, F, and G exceed zero.

In this case, it is preferable that E, F, and G exceed zero. In addition, it is preferable that shot peening or chemical conversion treatment is given to a surface of the reinforcing member to form projections and dents with a surface roughness Ra of 0.3 μm or more, and more preferable to be 0.8 μm or more. Nevertheless, when the surface roughness Ra of the surface of the above-mentioned reinforcing member becomes larger than 6.4 μm, since there are such problems that attachment of a foreign material (dust) becomes easy, it is not preferable.

Furthermore, the above-mentioned the pocket-side surface of the reinforcing member may be concave. Furthermore, as for an opposite pocket-side portion of the above-mentioned reinforcing member, preferably, a portion opposite to the pocket side in the axial direction of the reinforcing member has a tapered shape such that a width between the inside diameter surface and outside diameter surface is gradually smaller from the pocket side to the opposite of the pocket side. Furthermore, the above-mentioned reinforcing member may be manufactured by punching from a metal plate, and in that case, preferably, a lower part in a stamping direction is arranged to face the pockets. Nevertheless, it is preferable to remove burrs and the like generated at the time of manufacturing of the above-mentioned reinforcing member.

Such a resin snap cage for a radial ball bearing according to the first invention is suitable as a cage of an angular contact ball bearing or a double row ball bearing. That is, in an angular contact ball bearing which comprises: an inner ring; an outer ring; a plurality of rolling elements rotatably arranged between the inner ring and the outer ring; and a cage which holds the rolling elements between the inner ring and the outer ring, preferably, the cage is the resin snap cage for the radial ball bearing. In addition, in a double row ball bearing which comprises: an inner ring; an outer ring; a plurality of rolling elements rotatably arranged between the inner ring and the outer ring; and a cage which holds the rolling elements between the inner ring and the outer ring, preferably, the cage is the resin snap cage for the radial ball bearing according to the first invention.

Next, a snap cage for a ball bearing according to a second invention of the present application is a synthetic resin snap cage for a ball bearing, which comprises: a circular main part; a plurality of elastic pieces arranged, in predetermined intervals in a circumferential direction, at a first end face in an axial direction of the main part, the elastic pieces protruding in the axial direction; and a pocket portion formed to rotatably hold a rolling element between the elastic pieces, characterized in that: a reinforcing ring made of a metal plate having a rigidity higher than the synthetic resin of the snap cage for the ball bearing is embedded in the snap cage for the ball bearing; and the reinforcing ring comprises: a circular disc part embedded approximately in parallel to a second end face in the axial direction of the main part; and a cylindrical part extending in the protruding direction of the elastic pieces from one of the outer peripheral part and the inner peripheral part of the circular disc part.

Here, preferably, in the circumferential direction at least three protruding portions extending in an opposite direction to the protruding direction of the elastic pieces in the circular disc part are arranged. In addition, preferably, the synthetic resin of the snap cage for the ball bearing and the reinforcing ring are bonded with an adhesive.

In addition, a snap cage for a ball bearing according to the second invention of the present application is a synthetic resin snap cage for a ball bearing, which comprises: a circular main part; a plurality of elastic pieces arranged in predetermined intervals in a circumferential direction, at a first end face in an axial direction of the main part, the elastic pieces protruding in the axial direction; and a pocket portion formed to rotatably hold a rolling element between the elastic pieces, characterized in that a reinforcing ring constructed of a circular metal plate having a rigidity higher than the synthetic resin of the snap cage for the ball bearing is fixed with an adhesive to a second end face in the axial direction of the snap cage for the ball bearing.

Furthermore, A synthetic resin snap cage for a ball bearing according to a second invention of the present application, which may comprise: a circular main part; a plurality of elastic pieces arranged in predetermined intervals in a circumferential direction, at an end face in an axial direction of the main part, the elastic pieces protruding in the axial direction; and a pocket portion formed to rotatably hold a rolling element between the elastic pieces, characterized in that: a reinforcing ring constructed of a circular metal plate having a rigidity higher than the synthetic resin of the snap cage for the ball bearing is embedded in the main part of the snap cage for the ball bearing; and the synthetic resin of the snap cage for the ball bearing and the reinforcing ring are bonded with an adhesive.

At this time, it is preferable that the adhesive may contain at least one of a phenol resin adhesive and an epoxy resin adhesive. A method for manufacturing the above snap cage for the ball bearing according to the second invention can be manufactured by providing a step of performing insert molding by injecting the synthetic resin around the circular metal plate that has been baked in a state where the adhesive is half cured.

In addition, it is also possible to manufacture it by a manufacturing method comprising steps of: performing insert molding by injecting the synthetic resin around the circular metal plate on which the adhesive has been baked in a half cured state; and curing the adhesive by a secondary heating.

In addition, such the snap cage for a radial ball bearing according to the second invention is suitable as a cage of a ball bearing. That is, in a ball bearing having the plurality of balls rotatably arranged between an outer ring and an inner ring in a circumferential direction through a circular cage, preferably, the snap cage for the ball bearing according to the second invention is employed.

Furthermore, a snap cage according to a third invention of the present application, which comprises: a resin-made circular main part; a plurality of pockets integrally formed at a first face in an axial direction of the main part, each of the pockets rotatably holding a ball between a pair of elastic pieces arranged apart from each other over a circumferential direction; and a metal plate bonded with an adhesive to a second face in the axial direction of the main part, characterized in that the metal plate is made of a metallic material with a coefficient of linear expansion exceeding that of a carbon steel.

Here, it is preferable that the above-mentioned the adhesive be one of a phenol resin adhesive and an epoxy resin adhesive.

The snap cage for the ball bearing according to the third invention may be manufactured by performing insert molding by injecting a synthetic resin around the metal plate that has been baked in a state where the adhesive is half cured. In addition, it is also possible to manufacture it by a manufacturing method comprising a step of performing insert molding by injecting the synthetic resin around the metal plate baked in the state where the adhesive is half cured; and curing the adhesive by a secondary heating.

Furthermore, in a rolling bearing according to a fourth invention of the present application, which rotatably holds a plurality of rolling elements through a cage between an inner ring and an outer ring, the rolling elements are made of ceramics; and the cage is a synthetic resin snap cage in which a reinforcing ring made of a metal plate is embedded in the inside of the cage or bonded at the bottom of the cage, the reinforcing ring having a circular shape as a whole.

Furthermore, a resin snap cage for a radial ball bearing according to a fifth invention of the present application, which comprises: a circular main part; a plurality of elastic pieces spaced apart from each other in a circumferential direction at a first side face in an axial direction of the main part, the plurality of the elastic pieces protruding in the axial direction; and a plurality of pockets, each being surrounded by opposing planes of each pair of the elastic pieces adjacently arranged in the circumferential direction and a part sandwiched by the elastic pieces at the first side face in the axial direction of the main part, each of the pockets having an inner face with a partially spherical concave shape, characterized in that: the snap cage is manufactured by injection molding of a synthetic resin; a reinforcing ring made of a metal plate is shaped into a circular shape as a whole; the reinforcing ring having a radially center portion which is a flat plate portion existing in a direction orthogonal to the axial direction, an inside diameter side portion which is an inside diameter side bent portion bent toward the first side face in the axial direction, and an outer diameter side portion which is an outer diameter side bent portion bent toward the first side face in the axial direction; the reinforcing ring is embedded inside the main part at the time of the injection molding.

At this time, a communication opening may be formed at a portion which is a part of the reinforcing ring in alignment with each of the pockets with respect to the axial direction of the main part.

In addition, the resin snap cage for a radial ball bearing according to the fifth invention of the present application, which comprises: a circular main part; a plurality of elastic pieces spaced apart from each other in a circumferential direction at a first side face in an axial direction of the main part, the plurality of the elastic pieces protruding in the axial direction; a plurality of pockets, each being surrounded by opposing planes of each pair of the elastic pieces adjacently arranged in the circumferential direction and a part sandwiched by the elastic pieces at the first side face in the axial direction of the main part, each of the pockets having an inner face with a partially spherical concave shape, characterized in that: the snap cage is manufactured by injection molding of a synthetic resin; a reinforcing ring made of a metal plate is shaped into a circular shape as a whole; the reinforcing ring having a communication opening formed in a portion aligned with each of the pockets with respect to the axial direction of the main part; and the reinforcing ring is embedded inside the main part at the time of the injection molding.

In a synthetic resin snap cage for a radial ball bearing according to the fifth invention, a long through hole is defined in the circumferential direction at a portion which is a part of the reinforcing ring, and which is aligned, with respect to the axial direction, with an intermediate portion between the pockets adjacently arranged in the circumferential direction, each of the pockets including base portions of the elastic pieces; and a lightening recessed portion is defined inside the intermediate portion through the hole.

The radial ball bearing according to the fifth invention, preferably, which comprises: an outer ring having an outer ring orbit in an inner peripheral surface; an inner ring having an inner ring orbit in an outer peripheral surface: a plurality of balls rotatably provided between the outer ring orbit and the inner ring orbit; and a cage holding each of the plurality of balls, characterized in that the cage is the synthetic resin snap cage for the radial ball bearing according to the fifth invention.

Furthermore, A synthetic resin cage according to a sixth invention of the present application, which comprises: a synthetic resin circular base; and a plurality of sets of pockets provided at a first face in an axial direction of the base, each of the pockets rotatably holding a rotating element between a pair of elastic pieces integrally formed with the base, the elastic pieces being arranged in intervals over a circumferential direction, characterized in that a reinforcing member circularly molded and made of a synthetic resin with modulus of elasticity greater than the synthetic resin is arranged in the base inseparably over a whole circumference of the base by inserting the reinforcing member at the time of injection molding of the base and the elastic pieces.

Here, it is preferable that the reinforcing member formed in a plate shape be attached to a second face in the axial direction of the base inseparably over the whole circumference of the base. In addition, as to a contained amount of a reinforcing fiber and that of the reinforcing particle, the contained amount in the base plus the contained amount in each of the elastic pieces is smaller than the contained amount in the reinforcing member. The synthetic resin cage according to the sixth invention is suited for a cage for a ball bearing.

Furthermore, a cage for a ball bearing according to a seventh invention of the present application, which is constructed of a plurality of pocket members made of a first resin connected in a circular shape, each of the pocket members having a pocket defining a circular opening for rotatably holding a rolling element, and which is manufactured by insert molding using as an insert a reinforcing member made of a metal or a second resin with an elastic deformation capability greater than that of the first resin, characterized in that: the pocket members, each having a pocket bottom portion at a first end face in an axial direction and a pocket top portion at a second end face in the axial direction, are respectively separated in a circumferential direction; first separated portions of the pocket bottom portions are connected by the reinforcing member; and second separated portions of the pocket top portion are openable and closable by elastic deformation of the reinforcing member.

In addition, the cage for the ball bearing according to the seventh invention, which is constructed of a plurality of pocket members made of a first resin connected in a circular shape, each of the pocket members having a pocket defining a circular opening for rotatably holding a rolling element, and which is manufactured by insert molding using as an insert a reinforcing member made of a metal or a second resin with an elastic deformation capability greater than that of the first resin, characterized in that: the plurality of pocket members are connected with first parts of the reinforcing member respectively; the pocket members, each having a pocket bottom portion at a first end face in an axial direction and a pocket top portion at a second end face in the axial direction, are respectively separated in a circumferential direction; and first separated portions of the pocket bottom portion are connected by second parts of the reinforcing member; and second separated portions of the pocket top portion are openable and closable by elastic deformation of first coupling portions coupling the pocket members respectively and second coupling portions coupling the second separated portions of the pocket top portions respectively, in the reinforcing member.

In the cage for a ball bearing according to the seventh invention, preferably, the second coupling portions coupling the second separated portions of the pocket top portions, respectively, is provided in a closed state. In addition, preferably, the second coupling portions are at least partially constructed of the reinforcing member.

Furthermore, a cage for a ball bearing according to the second invention, which is constructed of a plurality of pocket members made of a first resin connected in a circular shape, each of the pocket members having a pocket defining a circular opening for rotatably holding a rolling element, characterized in that: each of the pocket members are deformable at a pocket bottom portion at a first end face in an axial direction; a pocket top portion at a second end face in the axial direction is separated in a circumferential direction; and a separated portion of the pocket top portion is openable and closable by elastic deformation of the pocket bottom portion. In the above cage for the ball bearing, preferably, a coupling portion coupling the separated portion of the pocket top portion is provided in a closed state.

The cage for a ball bearing according to the seventh invention is suitable as a cage of a ball bearing. That is, in the ball bearing which comprises: an inner ring; an outer ring; a plurality of balls rotatably arranged between the inner ring and the outer ring; and a cage which holds the balls between the inner ring and the outer ring, preferably, the cage is the cage for the ball bearing according to the seventh invention is employed.

Furthermore, a resin snap cage according to an eighth invention of the present application, which comprises: a resin circular main part; and a plurality of pockets provided at a first end surface in an axial direction, characterized in that a lubricant reservoir for accommodating lubricant is defined at an inner face of each of the pockets.

Here, it is preferable that the lubricant reservoir be arranged in the vicinity of the bottom of each of the pockets. In addition, a circular reinforcing member may be arranged along the circular main part at a second end face in an axial direction of the circular main part. Furthermore, it is preferable that the resin snap cage be manufactured by insert molding with the reinforcing member an insert; and the circular main part and the reinforcing member are integrally formed.

The above resin snap cage according to the eighth invention is suitable as a cage of a radial ball bearing. That is, in a radial ball bearing which comprises: an inner ring; an outer ring; a plurality of balls rotatably arranged between the inner ring and the outer ring; and a cage which holds the balls between the inner ring and the outer ring, preferably, the cage is the resin snap cage according to the eighth invention.

BRIEF DESCRIPTION OF THE DRAWINGS

FIG. 12 is an enlarged perspective view, of a substantial part, illustrating a circumferential part of the snap cage for a ball bearing illustrated in FIG. 11;

FIG. 14 is an enlarged perspective view, of a substantial part, for describing the modified example of the reinforcing ring illustrated in FIG. 13;

FIG. 15 is a sectional view of the reinforcing ring illustrated in FIG. 14;

FIG. 16 is a sectional view for describing a second embodiment of a snap cage for a ball bearing, and a ball bearing according to the second invention of the present application;

FIG. 17 is an enlarged perspective view, of a substantial part, illustrating a circumferential part of the snap cage for a ball bearing illustrated in FIG. 16;

FIG. 18 is an enlarged perspective view, of a substantial part, illustrating a circumferential part of a reinforcing ring which is embedded in the snap cage for a ball bearing illustrated in FIG. 17;

FIG. 19 is an enlarged perspective view, of a substantial part, for describing a modified example of the reinforcing ring illustrated in FIG. 18;

FIG. 28 is a sectional view, of a substantial part, illustrating a fourth modified example of a reinforcing ring which is fixed to the snap cage for a ball bearing illustrated in FIG. 21;

FIG. 29 is a drawing illustrating a circumferential part of the reinforcing ring illustrated in FIG. 28;

FIG. 41 is a perspective view illustrating the conventional snap cage for the ball bearing;

FIG. 42 is a perspective view illustrating a circumferential part of the conventional snap cage for the ball bearing;

FIG. 44 is a sectional view illustrating a ball bearing in which still other conventional snap cages for a ball bearing are embedded;

FIG. 45 is a sectional view illustrating a ball bearing in which further other conventional snap cages for a ball bearing are embedded;

FIG. 46 are drawings illustrating an example of a snap cage according to a third invention of the present application.

FIG. 47 are drawings illustrating another example of the snap cage according to the third invention of the present application, FIG. 47(a) is a whole perspective view illustrating the snap cage, FIG. 47(b) is a main part sectional view illustrating a state of being embedded into a ball bearing according to FIG. 48, and FIG. 47(c) is a top view illustrating a part of a reinforcing ring;

FIG. 51 is a partial perspective view illustrating an example of a synthetic resin snap cage which is embedded in a rolling bearing according to a fourth invention of the present application;

FIG. 52 is a partial perspective view illustrating another example of the synthetic resin snap cage which is embedded in the rolling bearing according to the fourth invention of the present application;

FIG. 53 is a partial perspective view illustrating a reinforcing ring which is embedded in the synthetic resin snap cage illustrated in FIG. 52;

FIG. 54 is a partially enlarged perspective view with a right end part of FIG. 52 being cut when viewed from arrow A;

FIG. 55 is a partially enlarged perspective view when viewed from a bottom side of FIG. 54;

FIG. 56 is a partially enlarged perspective view when viewed from a right side of FIG. 54;

FIG. 62 is a partially enlarged perspective view when viewed from a bottom side of FIG. 61;

FIG. 67 is a partial perspective view of a synthetic resin snap cage according to a first embodiment of a sixth invention of the present application;

FIG. 68 is a partial perspective view of a synthetic resin snap cage according to a second embodiment of the sixth invention of the present application;

FIG. 75 is a perspective view of a cage embedded in the ball bearing of FIG. 74;

FIG. 76 is an exploded perspective view illustrating a pocket member and a reinforcing member, which constitute the cage of FIG. 75, in an exploded manner;

FIG. 77 is a drawing illustrating the pocket member that a divided portion of a pocket top portion is opened;

FIG. 78 is a drawing illustrating an example of coupling means;

FIG. 83 is a partial perspective view of a resin snap cage illustrating a modified example of this embodiment; and FIG. 84 is a partial perspective view of a resin snap cage illustrating another modified example of this embodiment.

BEST MODE FOR CARRYING OUT THE INVENTION

Embodiment of First Invention

Figure 1:
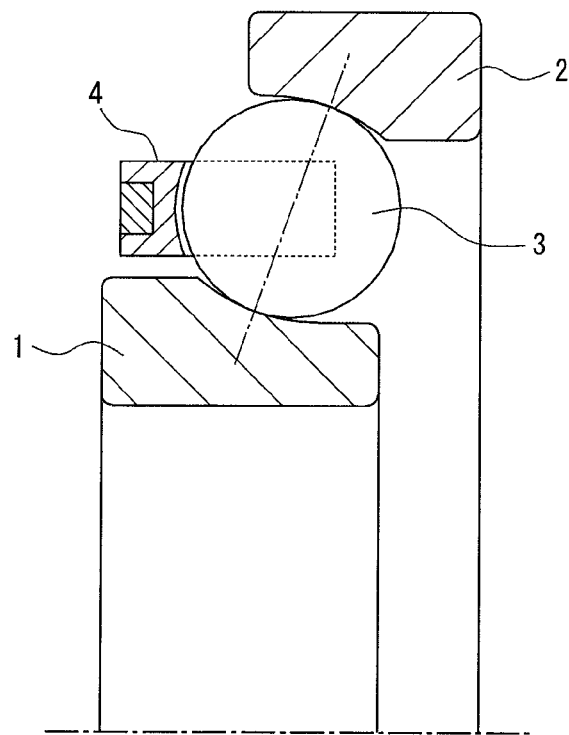
FIG. 1 is a partially longitudinal sectional view illustrating structure of an angular contact ball bearing according to a first invention of the present application.
Figure 2:
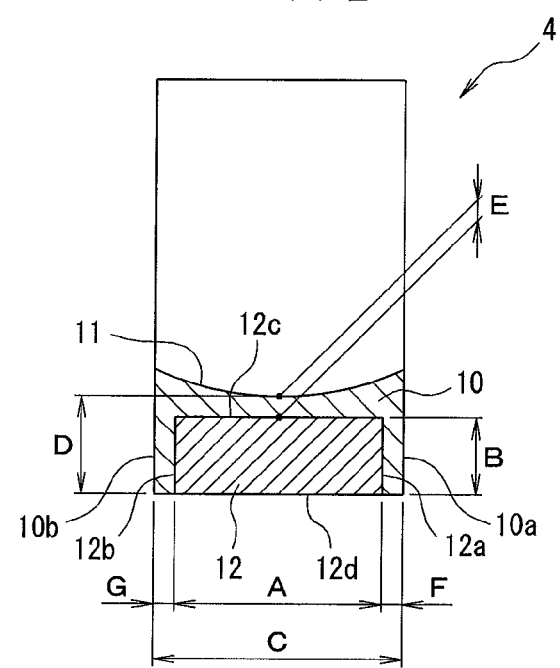
FIG. 2 is a partially sectional view illustrating structure of a resin snap cage according to the first invention of the present application.

An embodiment according to a first invention of the present application will be described in detail with referring to drawings. FIG. 1 is a partially longitudinal sectional view illustrating structure of an angular contact ball bearing which is an embodiment of the first invention, and FIG. 2 is a partially sectional view illustrating structure of a resin snap cage.

The angular contact ball bearing in FIG. 1 comprises an inner ring 1, an outer ring 2, a plurality of balls (rolling elements) 3 arranged rotatably between the inner ring 1 and outer ring 2, and a resin snap cage 4 which holds the balls 3 between the inner ring 1 and outer ring 2. Then, it is lubricated with a lubricant such as grease or lubricating oil.

This resin snap cage 4 comprises a resin-made circular main part 10, a plurality of pockets 11 provided at an end face in an axial direction of the circular main part 10, and a circular reinforcing member 12 arranged concentrically in another axial end face of the circular main part 10. While this reinforcing member 12 is circular along the circular main part 10, its sectional shape in a plane parallel to an axial direction is a rectangle. In addition, the reinforcing member 12 is embedded in a recessed portion and integrally formed in another axial end face of the circular main part 10. An outside diameter surface 12a, an inside diameter surface 12b, and a pocket-side surface 12c of the reinforcing member 12 are covered with the circular main part 10 (resin), and a surface 12d opposite to the pocket side is exposed.

That is, when F denotes a radial distance between an outside diameter surface 10a of the circular main part 10 and the outside diameter surface 12a of the reinforcing member 12, G denotes a radial distance between an inside diameter surface 10b of the circular main part 10 and an inside diameter surface 12b of the reinforcing member 12, and E denotes an axial direction between a bottom face of the pocket 11 and a pocket-side surface 12c of the reinforcing member 12, E, F, and G exceed zero.

Although a manufacturing method of the resin snap cage 4 is not limited particularly, the snap cage 4 may be manufactured by insert molding with the reinforcing member 12 as an insert. In this case, the circular main part 10 and the reinforcing member 12 are unified at the time of the insert molding. In addition, the reinforcing member 12 may be fixed to and unified with the circular main part 10 having been manufactured by the injection molding beforehand. In this case, the circular main part 10 and the reinforcing member 12 are fixed by a commonly used anchoring method, such as bonding with an adhesive or press fitting.

The resin snap cage 4 comprising such reinforcing member 12 has a high rigidity and is hard to be deformed. In addition, the reinforcing member 12 hardly come into contact with the inner ring 1, outer ring 2, and balls 3, so heat generation or wear will hardly occur. Furthermore, there is almost no possibility of the reinforcing member 12 exfoliating from the circular main part 10. Therefore, an angular contact ball bearing can be satisfactorily used in a high speed rotation.

Figure 3:
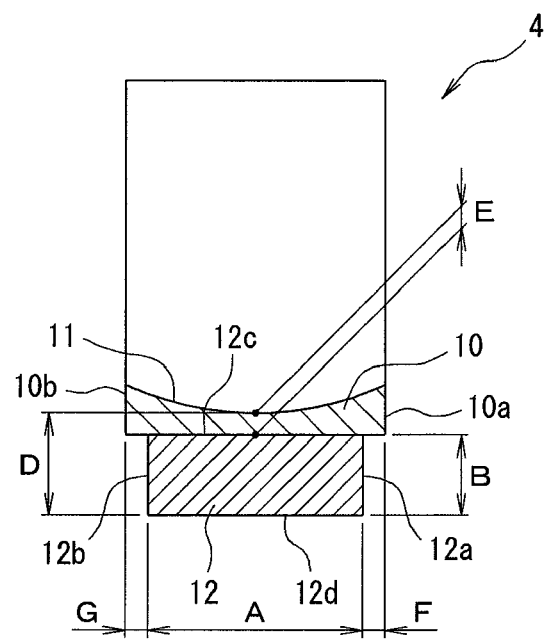
FIG. 3 is a partially sectional view illustrating a modified example of the resin snap cage according to the first invention of the present application.

In addition, the resin snap cage 4 may have a structure as illustrated in FIG. 3. That is, a recessed portion is not formed in another axial end face of the circular main part 10, but the reinforcing member 12 is fixed to the above-mentioned another axial end face. Hence, the outside diameter surface 12a, inside diameter surface 12b, and surface 12d thereof opposite to the pocket side are not covered with the above-mentioned circular main part, but are exposed. In this case, the above-mentioned E, F, and G are zero or more. In such structure, the resin snap cage 4 can be manufactured, in a similar manner to the resin snap cage 4 with the structure of FIG. 2 mentioned above.

It is more preferable that E, F, and G fulfill the following condition in either structure of FIG. 2 or FIG. 3. That is, E is 0.1×D or more, or 0.1 mm or more. F and G are 0.02×C or more, or 0.1 mm or more. Here, C denotes a radial distance between the outside diameter surface 10a and the inside diameter surface 10b of the circular main part 10, and D denotes an axial distance between each bottom face of the pockets 11 and the surface 12d thereof opposite to the pocket side of the reinforcing member 12. When such conditions are satisfied, contacts with the reinforcing member 12 and the inner ring 1, outer ring 2, or balls 3 will hardly occur.

In addition, it is preferable to perform shot peening or chemical conversion treatment to a surface of the reinforcing member 12 to form fine projections and dents. Then, the possibility of exfoliation of the reinforcing member 12 from the circular main part 10 is small. It is preferable that surface roughness Ra of the surface of the reinforcing member 12 be 0.3 µm or more, and 0.8 µm or more is more preferable. Nevertheless, it is not preferable, when the surface roughness Ra of the surface of the reinforcing member 12 becomes greater than 6.4 µm. This is because there are such problems that attachment of a foreign material (dust) becomes easy.

Figure 4:
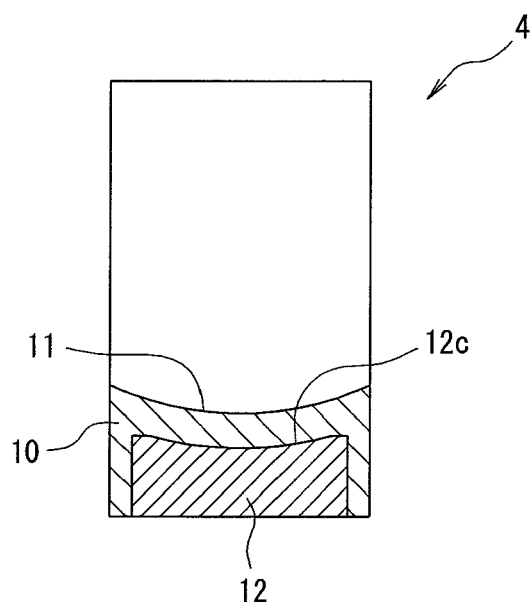
FIG. 4 is a partially sectional view illustrating another modified example of the resin snap cage according to the first invention of the present application.
Figure 5:
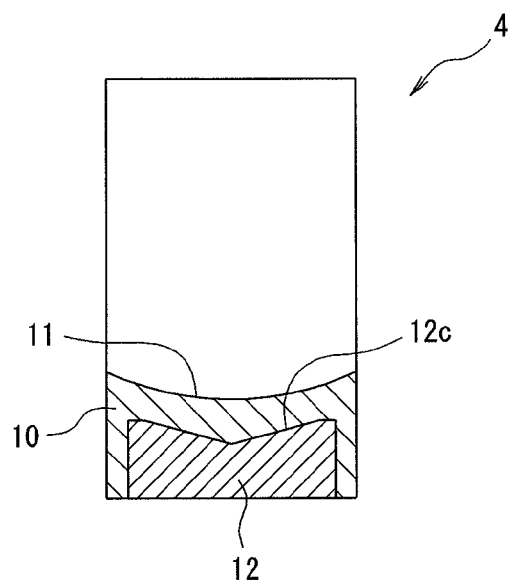
FIG. 5 is a partially sectional view illustrating still another modified example of the resin snap cage according to the first invention of the present application.

Furthermore, the pocket-side surface 12c of the reinforcing member 12 may concave. Then, the rigidity of the resin snap cage 4 improves, and the balls 3 and the reinforcing member 12 hardly come into contact with each other. In addition, since the axial distance between the bottom face of the pocket 11 and the pocket-side surface 12c of the reinforcing member 12 becomes large, it is harder to generate the exfoliation of the reinforcing member 12 from the circular main part 10. The concave surface may have an approximately U-shaped section as illustrated in FIG. 4, or may have an approximately V-shaped section as illustrated in FIG. 5.

Figure 6:
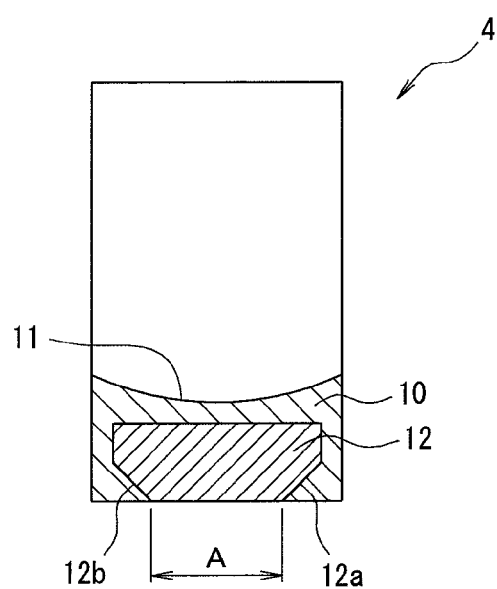
FIG. 6 is a partially sectional view illustrating a further modified example of the resin snap cage according to the first invention of the present application.
Figure 7:
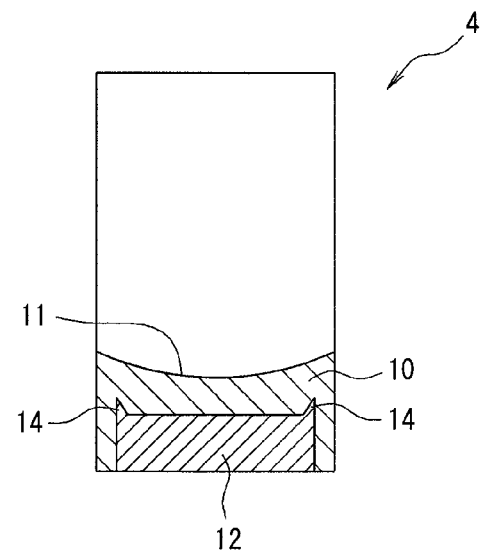
FIG. 7 is a partially sectional view illustrating a still further modified example of the resin snap cage according to the first invention of the present application.

Furthermore, as for an axially opposite pocket-side portion of the reinforcing member 12, it is preferable to have a tapered shape that width (radial distance) A between the inside diameter surface 12b and outside diameter surface 12a becomes small gradually toward the opposite pocket side from the pocket side (see FIG. 6). Then, it is hard to generate exfoliation of the reinforcing member 12 from the circular main part 10.

Furthermore, the reinforcing member 12 may be manufactured by stamping from a metal plate, and in that case, a lower part in a stamping direction is preferably arranged to face the pockets 11. During stamping, a burr may be generated, and the burr 14 thus generated protrudes along the stamping direction from an end portion of the reinforcing member 12. When a portion where such a burr is formed is arranged as an opposite pocket side, the burr contacts the inner ring 1, the outer ring 2, and the balls 3 easily, but when arranging the portion, where such a burr is formed, toward the pockets 11, the burrs 14 are located between the bottom face of the pockets 11 and the pocket-side surface 12c of the reinforcing member 12. Thus, there is almost no possibility of the burr 14 contacting the inner ring 1, outer ring 2, and balls 3. Nevertheless, the burr 14 may be removed beforehand at the time of processing the reinforcing member 12.

Figure 8:
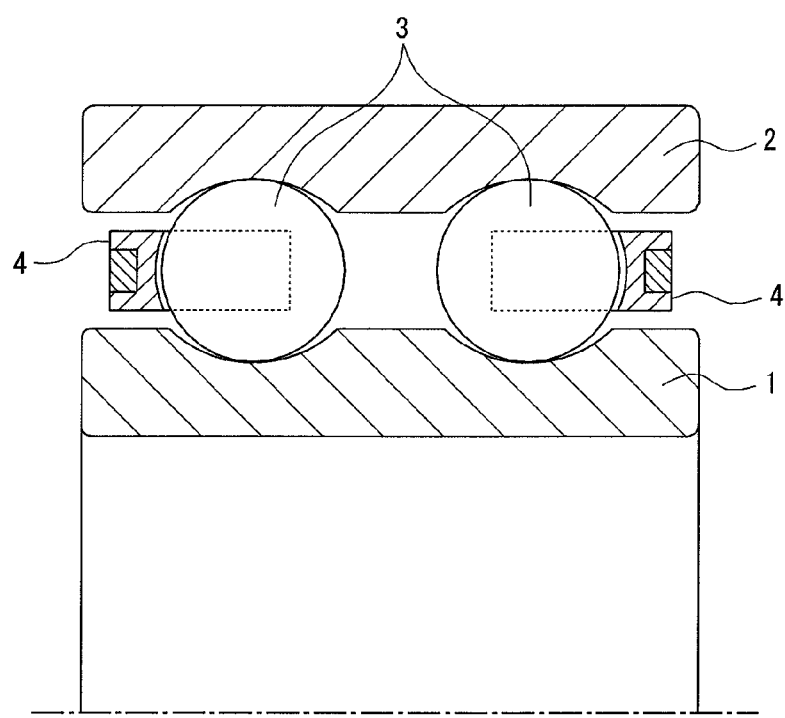
FIG. 8 is a partially longitudinal sectional view illustrating structure of a double row ball bearing according to the first invention of the present application.
Figure 9:
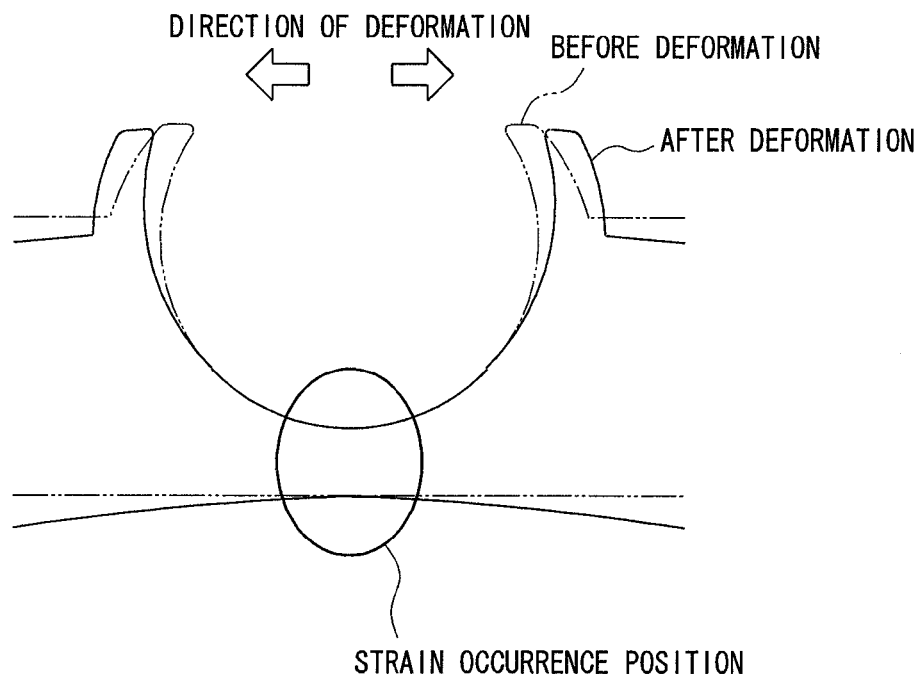
FIG. 9 is an explanatory diagram of an aspect of local deformation of a cage.
Figure 10:
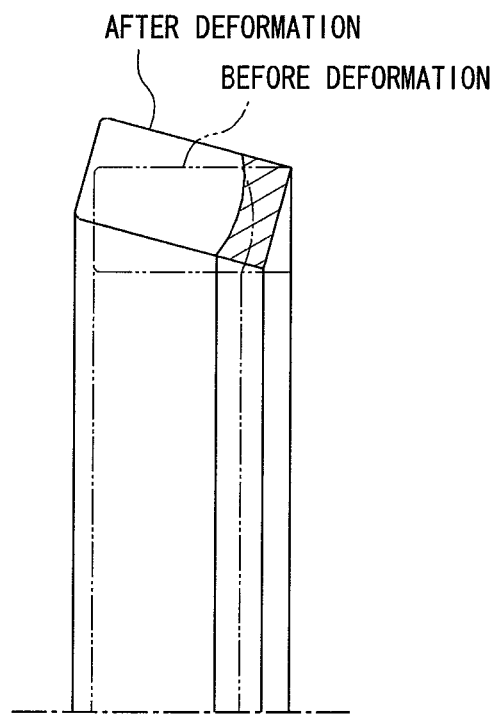
FIG. 10 is an explanatory diagram of an aspect of whole deformation of the cage.

In addition, this embodiment illustrates an example in accordance with the first invention of the present application, without limiting to this embodiment. For example, in this embodiment, the angular contact ball bearing has been exemplified and described as a rolling bearing. However, other types of various radial ball bearings may be applicable in the first invention of the present application. Examples are a deep groove ball bearing, a self-aligning ball bearing, and a double row ball bearing. Nevertheless, the angular contact ball bearing and the double row ball bearing (see FIG. 8) are particularly suitable among these radial ball bearings.

In addition, in order to enhance the rigidity of the reinforcing member 12, desirable is larger thickness B (axial distance between the pocket-side surface 12c and opposite pocket side surface 12d of the reinforcing member 12). In order to increase the thickness B of the reinforcing member 12, the opposite pocket side surface 12d of the reinforcing member 12 is not covered by the circular main part 10 (resin).

Furthermore, material of the reinforcing member 12 is not limited in particular so long as it is possible to fully enhance the rigidity of the resin snap cage 4, but it may include SPCC material, stainless steel, a fiber reinforced resin, or the like. Nevertheless, it is preferable that the hardness set to be Hv 100 or more, Hv 120 or more is more preferable. In addition, it is preferable that the hardness of the reinforcing member 12 set to be lower than that of a mold for injection molding (insert molding) or the like. In particular, when forming the resin snap cage 4, as illustrated in FIGS. 2 to 7, where the reinforcing member 12 is exposed, there are fewer adverse influences exerted to a mold, if the hardness of the reinforcing member 12 is smaller than that of a mold. Specifically, Hv 1200 or less is preferable.

Furthermore, although the type of resin which constructs the circular main part 10 is not limited particularly, an aliphatic polyamide resin, an aromatic polyamide resin, polyether ether ketone, polyparaphenylene sulfide, and the like are suitable.

Furthermore, although the type of the adhesive bonding the circular main part 10 and the reinforcing member 12 is not limited particularly, a phenol-based adhesive is suitable.

In this embodiment, the opposite pocket side surface 12d which is one face of the reinforcing member 12 is exposed. However, it is possible to enhance the concentricity of the circular main part 10 and the reinforcing member 12 by making this opposite pocket side surface 12d to be one of reference planes for dimensional accuracy, for example, at the time of insert molding. In a high speed rotation condition, and in particular, in an area where dmn value (product of the average value (unit is mm) of the inside diameter and the outer diameter of a bearing and the revolution speed (a unit is min-1)) is 1,000,000 or more, or 1,100,000 or more, if the above-mentioned concentricity is poor, or if the rotation center of the whole resin snap cage 4 and that of the reinforcing member 12 are not properly aligned, an unsuitable stress would arise in the circular main part 10 of the resin snap cage 4 or abnormal vibration would be generated. In addition, in this embodiment, since neither comparatively complicated bending nor complicated drilling is performed, it is possible to manufacture the reinforcing member 12 with high accuracy in dimension and at low costs.

In other words, preferable are the resin snap cages 4 which are illustrated in FIGS. 2 and 4 to 7, and in which the outside diameter surface 12a and the inside diameter surface 12b of the reinforcing member 12 are covered with a resin. In particular, on the high speed rotation condition, these resin snap cages 4 are preferable. The resin snap cage 4 in FIG. 3 has many exposed portions of the reinforcing member 12. This brings comparatively favorable heat dissipation, whereby the heat dissipation as the whole resin snap cage 4 becomes favorable. The temperature distribution is little and deformation is hardly generated in the resin snap cage 4. In addition, the resin snap cages 4 in FIGS. 2 to 7 can be formed with high accuracy in dimension, such as the concentricity between the reinforcing member 12 and circular main part 10, at low costs at the time of insert molding.

Embodiment of Second Invention

A second invention of the present application relates to, for example, a snap cage for a ball bearing used for a ball bearing which is used in high speed driving under the environment of high temperature, a manufacturing method of a snap cage for a ball bearing, and a ball bearing embedding this snap cage for a ball bearing, in various rotating equipment, such as a car, a machine tool, and the like.

Figure 40:
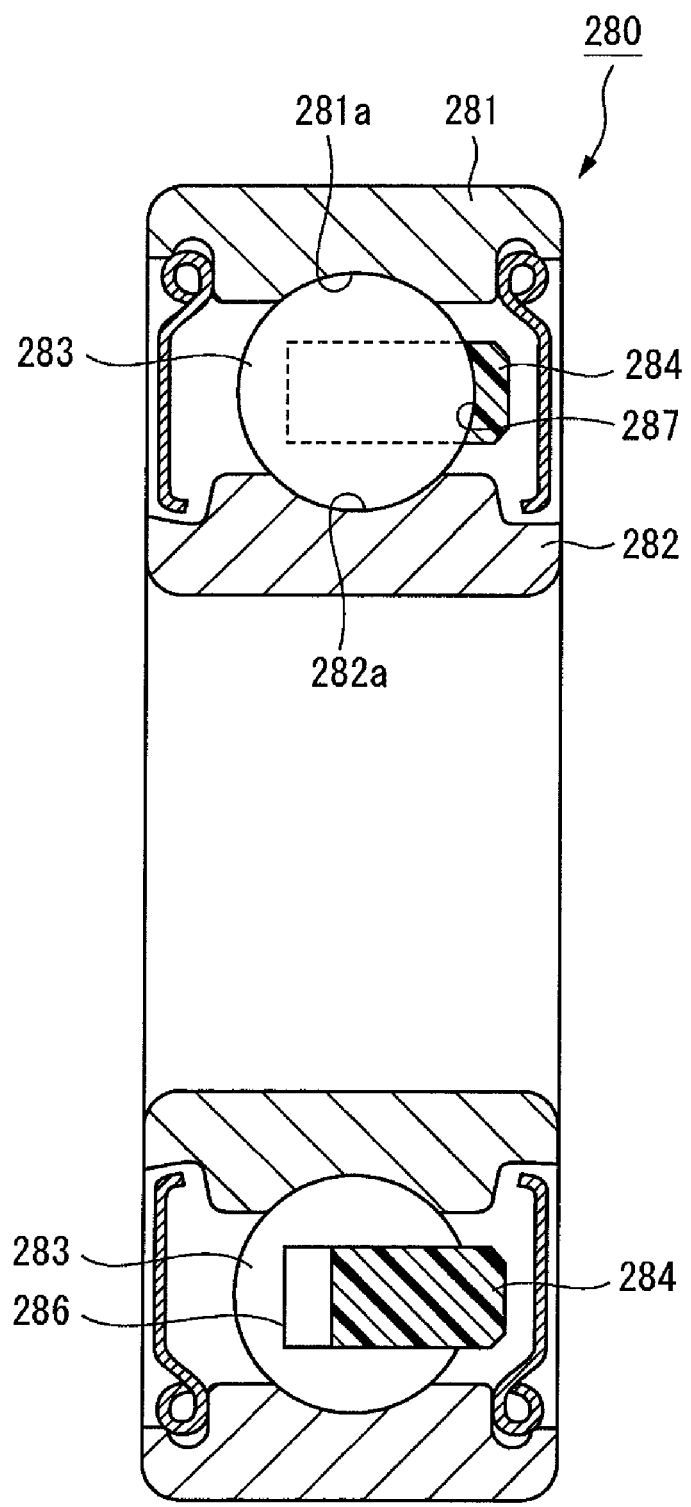
FIG. 40 is a sectional view illustrating a ball bearing in which conventional snap cages for a ball bearing are embedded.

As a ball bearing which supports each rotating part of various rotating equipment, for example, a ball bearing 280 as illustrated in FIG. 40 is used widely. This ball bearing 280 comprises: an outer ring 281 which has an outer ring raceway surface 281a in an inner peripheral surface; an inner ring 282 which has an inner ring raceway surface 282a in an outer peripheral surface; a plurality of balls 283 arranged rotatably in a circumferential direction through a cage 284 between the outer ring raceway surface 281a and the inner ring raceway surface 282a. In addition, in an illustrated example, the outer ring raceway surface 281a and the inner ring raceway surface 282a are both deep groove types.

The cage 284 is a snap cage as illustrated in FIG. 41, and there are formed a plurality of elastic pieces 286 and 286, in one side in the axial direction of the circular main part 285, spaced apart from each other in the circumferential direction so as to protrude in an axial direction. Then, pocket portion 287 each of which holds a ball 283 rotatably are defined between the elastic pieces 286 and 286 adjacently arranged in the circumferential direction.

In addition, the cage 284 is formed by the injection molding with a synthetic resin, which is made of, for example, polyamide 66, polyphenylene sulfide, or the like respectively containing a reinforcing material such as glass fiber. When the operating temperature exceeds 160° C., the synthetic resin made of polyamide 46 which is excellent in heat resistance and containing a reinforcing material such as glass fiber may be used.

In addition, as a technique of preventing deformation of the cage 284 caused by a centrifugal force at the time of high speed rotation, as illustrated in FIG. 42, the technique where a metal plate 288 is additionally installed in the main part 285 has been proposed (e.g., see Japanese Patent Laid-Open No. H8-145061). The main part 285 and the metal plate 288 are firmly bonded by pouring the synthetic resin into holes 289 formed in the metal plate 288 at the time of injection molding of the main part 285. The metal plate 288 enhances the rigidity of the main part 285, and prevents the elastic piece 286 from deforming outward in a radial direction because of the centrifugal force.

Figure 43:
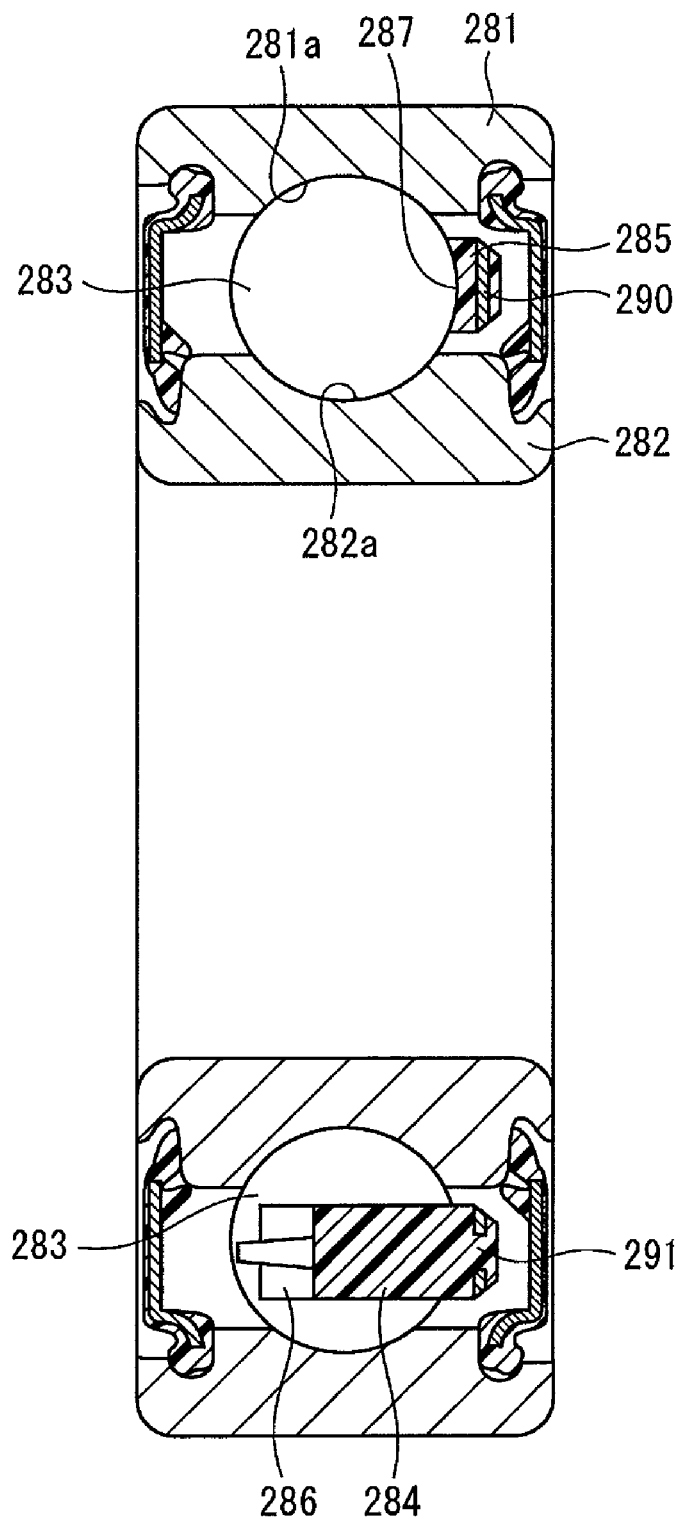
FIG. 43 is a sectional view illustrating a ball bearing in which other conventional snap cages for a ball bearing are embedded.

Furthermore, as another technique of preventing deformation of the cage 284 caused by the centrifugal force at the time of high speed rotation, as illustrated in FIG. 43, the technique where a disc-like reinforcing ring 290 with rigidity higher than the synthetic resin of the cage 284 is embedded in the main part 285 has been proposed (e.g., see Japanese Patent Laid-Open No. 2000-161365). Several holes 291 are formed in the reinforcing ring 290 in a circumferential direction, and the synthetic resin arranged on both sides of an axial direction of the reinforcing ring 290 is integrally bonded through the openings 291. This enhances the rigidity of the cage 284, and thus prevents the elastic piece 286 from deforming outward in a radial direction because of the centrifugal force. In addition, FIG. 44 shows an example of embedding a cylindrical reinforcing ring 292 near an outer periphery part of the cage 284, and FIG. 45 shows an example of embedding the cylindrical reinforcing ring 292 near an inner periphery part of the cage 284.

It is to be noted that, in recent years, operating conditions of the ball bearings have become increasingly severer because of the improved efficiency and miniaturization of various rotating equipment on a car, a machine tool, or the like. For example, the operating conditions have been changed drastically by the increased revolution speed, reduced setting space, and tendency of increasing the operating temperature. Therefore, the thermal deformation of a cage is readily caused by a centrifugal force, the temperature readily rises at the time of the high speed rotation, and the oscillatory deformation of the cage caused by a disturbance readily occur. However, since the cages described in the above-mentioned two patent publications have a structure of merely bonding the reinforcing ring with the main part of the cage mechanically, it is difficult to fully enhance the torsional rigidity of the main part. Therefore, when the bearing is driven at a high speed under the environment of high temperature, a tip edge of an elastic piece of the cage might be displaced outward in a radial direction to interfere with an inner peripheral surface of an outer ring.

The present invention has been made in order to solve such inconvenience, and its object is to provide a snap cage for a ball bearing, which can improve the rigidity of a cage and which can suppress deformation caused by the centrifugal force or heat and oscillatory deformation caused by a disturbance at the time of high speed driving under the environment of high temperature, a manufacturing method of the snap cage for a ball bearing, and a ball bearing.

The above-mentioned object of the present invention is achieved by the following construction.

(1) A synthetic resin snap cage for a ball bearing which comprises a circular main part and a plurality of elastic pieces arranged in predetermined intervals in a circumferential direction in an axial end face of the main part, and protrudes axially, and in which pocket portions holding a rolling body rotatably between the elastic pieces are formed, the snap cage for a ball bearing being characterized in that a reinforcing ring made of a metal plate more rigid than the synthetic resin snap cage for a ball bearing is embedded in the snap cage for a ball bearing, and the reinforcing ring comprises a circular disc part embedded approximately in parallel to an axial end face of the main part, and a cylindrical part extendedly installed in the protruding direction of the elastic pieces from the outer peripheral part or inner peripheral edge of the circular disc part.

(2) A snap cage for a ball bearing which is described in (1) and is characterized by providing circumferentially at least three protruding portions extending in a direction reverse to a protruding direction of the elastic pieces in the circular disc part.

(3) A snap cage for a ball bearing which is described in (1) or (2), and is characterized by bonding a synthetic resin and a reinforcing ring of the snap cage for a ball bearing with an adhesive.

(4) A synthetic resin snap cage for a ball bearing which comprises a circular main part and a plurality of elastic pieces arranged in predetermined intervals in a circumferential direction in an axial end face of the main part, and protrudes axially, and in which pocket portions holding a rolling body rotatably between the elastic pieces are formed, the snap cage for a ball bearing being characterized in that a reinforcing ring constructed of a circular metal plate more rigid than a synthetic resin of the snap cage for a ball bearing is fixed to the axial end face of the main part through an adhesive.

(5) A synthetic resin snap cage for a ball bearing which comprises a circular main part and a plurality of elastic pieces arranged in predetermined intervals in a circumferential direction in an axial end face of the main part, and protrudes axially, and in which pocket portions holding a rolling body rotatably between the elastic pieces are formed, the snap cage for a ball bearing being characterized in that a reinforcing ring constructed of a circular metal plate more rigid than a synthetic resin of the snap cage for a ball bearing is embedded in the main part of the snap cage for a ball bearing, and the synthetic resin of the snap cage for a ball bearing and the reinforcing ring are bonded with an adhesive.

(6) A snap cage for a ball bearing which is described in any of (3) to (5), and is characterized by containing at least one of a phenol resin adhesive and an epoxy resin adhesive.

(7) A manufacturing method of a snap cage for a ball bearing described in any of (3) to (6), the manufacturing method of the snap cage for a ball bearing being characterized by comprising a step of injecting a synthetic resin around the circular metal plate where the adhesive has been baked in a half cured condition to perform insert molding.

(8) A manufacturing method of a snap cage for a ball bearing described in any of (3) to (6), the manufacturing method of the snap cage for a ball bearing being characterized by comprising a step of injecting a synthetic resin around the circular metal plate where the adhesive is baked in a half cured condition and performing insert molding, and a step of curing the above-mentioned adhesive by secondary heating.

(9) A ball bearing where a plurality of balls are arranged rotatably between an outer ring and an inner ring in a circumferential direction through a circular cage, the ball bearing being characterized by using the snap cage for a ball bearing described in any of (1) to (6) as a cage.

According to the snap cage for a ball bearing and the ball bearing in accordance with the present invention, since a reinforcing ring made of a metal plate more rigid than the synthetic resin snap cage for a ball bearing is embedded in the snap cage for a ball bearing, and the reinforcing ring comprises a circular disc part embedded approximately in parallel to an axial end face of the main part, and a cylindrical part extendedly installed in the protruding direction of the elastic pieces from the outer peripheral part or inner peripheral edge of the circular disc part, it is possible to improve the rigidity of a snap cage for a ball bearing, and in particular, the flexural rigidity and torsional rigidity of the main part by a reinforcing ring with an approximately L-shaped section. Thereby, also in the case where high speed driving of a ball bearing is performed under the environment of high temperature, since it is possible to suppress the deformation of a snap cage for a ball bearing by a centrifugal force or heat, and the oscillatory deformation of the snap cage for a ball bearing by a disturbance, it is possible to avoid the snap cage for a ball bearing being damaged by an elastic piece of the snap cage for a ball bearing interfering with an inner peripheral surface of an outer ring, and it is possible to maintain performance of the ball bearing, and further, performance of rotating equipment favorably.

According to the snap cage for a ball bearing and the ball bearing in accordance with the present invention, since at least three protruding portions extending in a direction opposite to the protrusion direction of the elastic pieces are provided in a circumferential direction in the circular disc part, it is possible to secure a space between the circular disc part and a molding die surface at the time of injection molding, and hence, it is possible to embed the reinforcing ring under the snap cage for a ball bearing easily.

Furthermore, according to the snap cage for a ball bearing and the ball bearing in accordance with the present invention, since the synthetic resin of the snap cage for a ball bearing and the reinforcing ring are bonded with an adhesive, it is possible to improve bond strength between the synthetic resin of the snap cage for a ball bearing and the reinforcing ring which have different coefficients of linear expansion and moduli of elasticity, and hence, it is possible to improve the rigidity of the snap cage for a ball bearing, and in particular, the flexural rigidity and torsional rigidity of the main part. Thereby, also in the case where high speed driving of a ball bearing is performed under the environment of high temperature, since it is possible to suppress the deformation of a snap cage for a ball bearing by a centrifugal force or heat, and the oscillatory deformation of the snap cage for a ball bearing by a disturbance, it is possible to avoid the snap cage for a ball bearing being damaged by an elastic piece of the snap cage for a ball bearing interfering with an inner peripheral surface of an outer ring, and it is possible to maintain performance of the ball bearing, and further, performance of rotating equipment favorably.

Hereafter, embodiments of a snap cage for a ball bearing and a ball bearing according to a second invention of the present application will be described respectively in detail with reference to drawings.

First Embodiment

First, with reference to FIGS. 11 to 15, a first embodiment of the snap cage for a ball bearing and the ball bearing according to the present application will be described.

Figure 11:
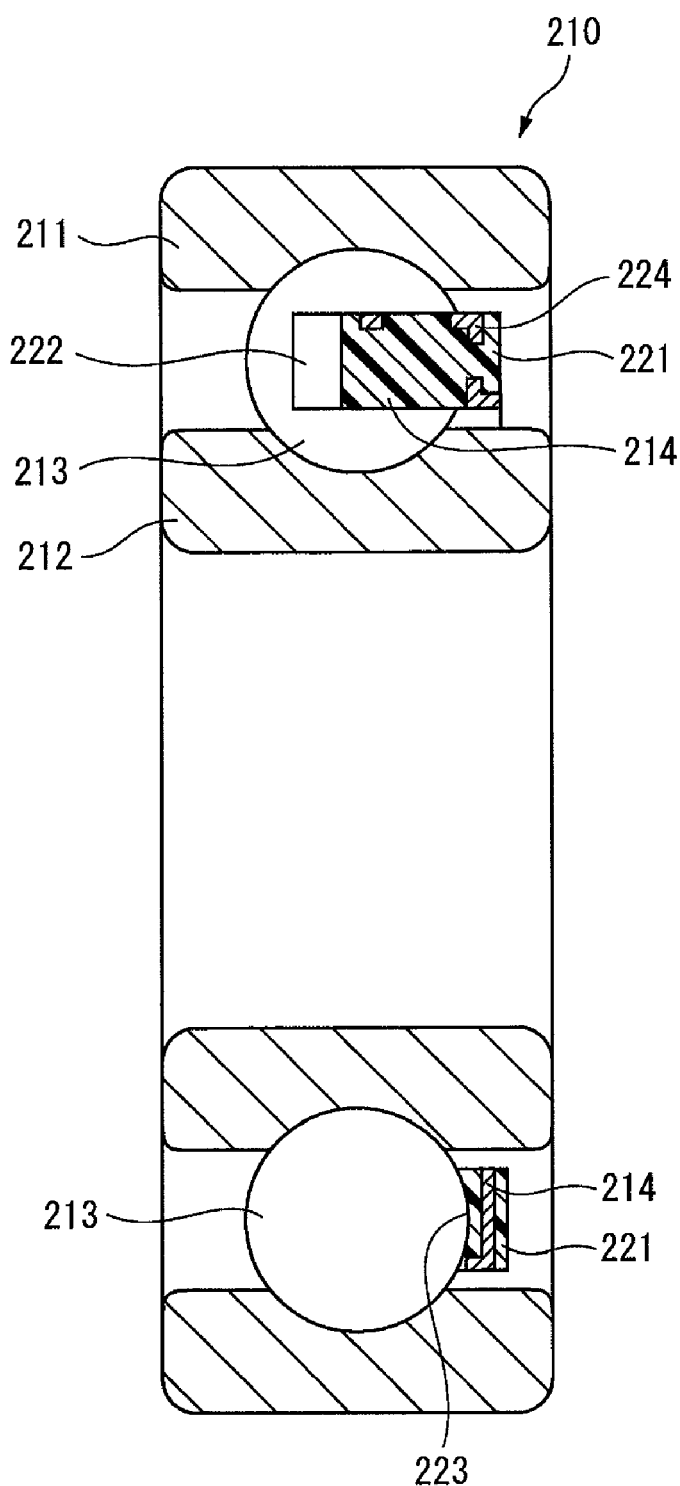
FIG. 11 is a sectional view for describing a first embodiment of a snap cage for a ball bearing, and a ball bearing according to a second invention of the present application.
Figure 13:
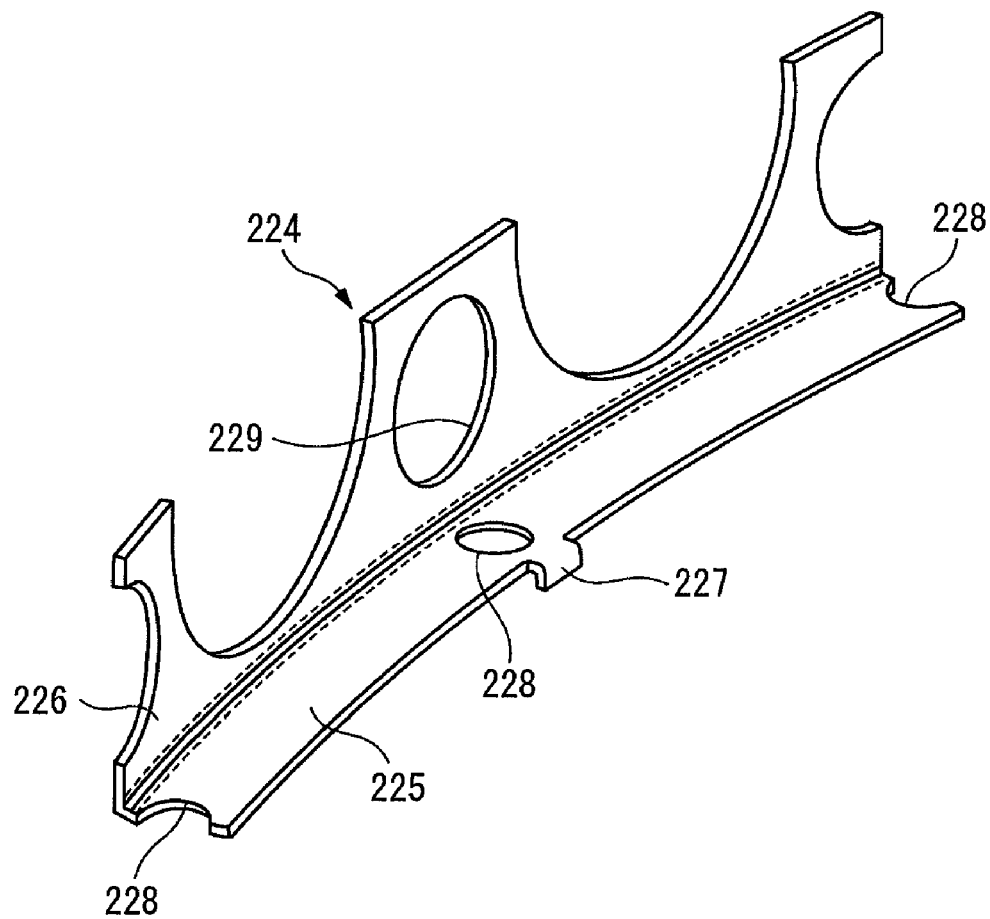
FIG. 13 is an enlarged perspective view, of a substantial part, illustrating a circumferential part of a reinforcing ring which is embedded in the snap cage for a ball bearing illustrated in FIG. 12.

FIG. 11 is a sectional view for describing the first embodiment of the snap cage for a ball bearing and the ball bearing according to the present application. FIG. 12 is an enlarged perspective view, of a substantial part, illustrating a circumferential part of the snap cage for a ball bearing illustrated in FIG. 11. FIG. 13 is an enlarged perspective view, of a substantial part, illustrating a circumferential part of a reinforcing ring which is embedded in the snap cage for a ball bearing illustrated in FIG. 12. FIG. 14 is a enlarged perspective view, of a substantial part, for describing the modified example of the reinforcing ring illustrated in FIG. 13. FIG. 15 is a sectional view of the reinforcing ring illustrated in FIG. 14.

A ball bearing 210 in accordance with this embodiment is a deep groove ball bearing where a plurality of balls 213 as rolling elements are arranged between an outer ring 211 and an inner ring 212 as illustrated in FIG. 11, and the plurality of balls 213 are held rotatably in a circumferential direction, with substantially equally spacing apart from each other, through the snap cage 214 for a ball bearing in accordance with this embodiment.

The snap cage 214 for the ball bearing made of a synthetic resin, and comprises a circular main part 221, and a plurality of elastic pieces 222 arranged in predetermined intervals in a circumferential direction in an axial end face of the main part 221, and protrudes axially as illustrated in FIG. 12. A pocket portion 223 which rotatably holds the ball 213, which is a rolling body, is formed between the elastic pieces 222. Then, a reinforcing ring 224 is embedded in the main part 221 of the snap cage 214 for a ball bearing. In addition, the reinforcing ring 224 is inserted into a molding die at the time of the injection molding of a synthetic resin (e.g., a nylon 46 and the like).

The reinforcing ring 224 is made of a metal plate (e.g., SPCC: 0.25 mm or less of nominal thickness) with the rigidity higher than a synthetic resin of the snap cage 214 for a ball bearing, and comprises: a circular disc part 225 embedded approximately in parallel to an axial end face of the main part 221; and a cylindrical part 226 which extends in a protruding direction of the elastic pieces 222 from an outer peripheral part of the circular disc part 225 and which is embedded in a part except each of the pocket portions 223, as illustrated in FIG. 13. In addition, three protruding portions 227 extending in a direction opposite to the protrusion direction of the elastic pieces 222, from an inner peripheral portion thereof, are provided in a circumferential direction in the circular disc part 225. Furthermore, the cylindrical part 226 has the axial width varying along the shape of the main part 221 and that of the pocket portions 223 of the cage 220.

In addition, there are formed in the circular disc part 225 in predetermined intervals in a circumferential direction two or more communication openings 228 for bonding the synthetic resin of the snap cage 214 for a ball bearing, provided on both sides of an axial direction of the circular disc part 225. The synthetic resin of the snap cage 214 for the ball bearing is filled in the cylindrical part 226 at the time of the injection molding. After molding, there are formed in predetermined intervals in a circumferential direction two or more coupling openings 229 bonded with the synthetic resin. Then, the synthetic resin and the reinforcing ring 224 of the snap cage 214 for a ball bearing are integrally bonded by the communication openings 228 and the coupling openings 229.

Then, in this embodiment, at the time of the injection molding, after performing dip coating of a phenol adhesive (e.g., Meta-Lock (registered trademark) N-15 or the like) diluted four times with methyl ethyl ketone to the reinforcing ring 224 and baking them at 140° C. for 20 minutes, the synthetic resin is injected after the reinforcing ring 224 is inserted into a molding die with a temperature of 150° C. Thus, the snap cage 214 for a ball bearing is formed such that the synthetic resin and the reinforcing ring 224 of the snap cage 214 for a ball bearing are bonded with the adhesive.

Hence, with the snap cage 214 for a ball bearing and the ball bearing 210 of this embodiment, the reinforcing ring 224 made of a metal plate more rigid than the synthetic resin of the snap cage 214 for a ball bearing is embedded in the snap cage for a ball bearing. The reinforcing ring 224 comprises the circular disc part 225 embedded approximately in parallel to an axial end face of the main part 221, and the cylindrical part 226 extendedly installed in the protruding direction of the elastic pieces 222 from the outer peripheral part of the circular disc part 225. It is therefore possible to improve the rigidity of the snap cage 214 for a ball bearing. In particular, the flexural rigidity and torsional rigidity of the main part 221 can be improved by the reinforcing ring 224 with an approximately L-shaped section. Accordingly, also in the case where the high speed driving is performed under the environment of high temperature, it is possible to suppress the deformation, of the snap cage 214 for a ball bearing, caused by a centrifugal force or heat, and it is also possible to suppress the oscillatory deformation, of the snap cage 214 for a ball bearing, caused by a disturbance. This allows the prevention of the snap cage 214 for a ball bearing from being damaged by an elastic piece 222 of the snap cage 214 for a ball bearing interfering with an inner peripheral surface of the outer ring 211, thereby allowing the performance of the ball bearing 210 to be maintained favorably, and further, the performance of the rotating equipment favorably.

In addition, with the snap cage 214 for a ball bearing and the ball bearing 210 in accordance with this embodiment, there are provided at least three protruding portions 227 extending in a direction opposite to the protrusion direction of the elastic pieces 222 in a circumferential direction in the circular disc part 225. This allows securing a space between the circular disc part 225 and a molding die surface at the time of injection molding. Hence, the reinforcing ring 224 can be readily embedded in the snap cage 214 for a ball bearing.

In addition, with the snap cage 214 for a ball bearing and the ball bearing 210 of this embodiment, the reinforcing ring 224 has an approximately L-shaped section. Even a thin metal plate ensures high rigidity, thereby reducing the weight of the snap cage 214 for a ball bearing.

Furthermore, with the snap cage 214 or a ball bearing and the ball bearing 210 of this embodiment, the synthetic resin of the snap cage 214 for a ball bearing and the reinforcing ring 224 are bonded with an adhesive. This improves the bond strength between the synthetic resin of the snap cage 214 for a ball bearing and the reinforcing ring 224, which have different coefficients of linear expansion and different moduli of elasticity.

Accordingly, it is possible to further improve the rigidity of the snap cage 214 for a ball bearing.

In addition, as a modified example of this embodiment, the reinforcing ring 224 may include a rib 230 provided between the circular disc part 225, which is a bending portion of the reinforcing ring 224, and the cylindrical part 226, as illustrated in FIGS. 14 and 15. Hence, it is possible to suppress any spring back of the circular disc part 225 and the cylindrical part 226, and at the same time, it is possible to enhance the strength of a bending portion. In addition, a synthetic resin flows into a cavity 230a in a back side of the rib 230 at the time of the injection molding. This further improves the bond strength between the synthetic resin of the snap cage 214 for a ball bearing and the reinforcing ring 224.

Second Embodiment

Next, with reference to FIGS. 16 to 19, a second embodiment of a snap cage for a ball bearing and a ball bearing according to the present invention will be described. In addition, about the same parts as or equivalent parts to those of the first embodiment, the same symbols are assigned in drawings, and their descriptions will be omitted or simplified.

FIG. 16 is a sectional view for describing a second embodiment of the snap cage for a ball bearing and the ball bearing according to the present invention. FIG. 17 is an enlarged perspective view, of a substantial part, illustrating a circumferential part of the snap cage for a ball bearing illustrated in FIG. 16. FIG. 18 is an enlarged perspective view, of a substantial part, illustrating a circumferential part of a reinforcing ring which is embedded in the snap cage for a ball bearing illustrated in FIG. 17. FIG. 19 is an enlarged perspective view, of a substantial part, for describing a modified example of the reinforcing ring illustrated in FIG. 18.

A snap cage 240 for a ball bearing in accordance with this embodiment has recessed portions 241 in the main part 221 between respective pocket portions 223 adjacently arranged in a circumferential direction, as illustrated in FIGS. 16 and 17. The recessed portion 241 is defined in an axial end portion opposite to the position where each elastic piece 222 of the main part 221 is formed. The recessed portion 241 is defined in an approximately trapezoidal shape so as to have a uniform thickness between the inner peripheral surface of each pocket portion 223 and the recessed portion 241.

In addition, the recessed portion 241 is provided so that the thicknesses of respective parts of the cage are made nearly equal so as to suppress the deformation due to uneven resin thickness at the time of resin molding, and so that the weight of the cage is reduced.

Furthermore, the snap cage 240 for a ball bearing comprises the main part 221 and the reinforcing ring 244 embedded in a lower portion of the pocket portion 223. The reinforcing ring 244 comprises: a circular disc part 245 embedded approximately in parallel to an axial end face of the main part 221; and a cylindrical part 246 which extends in the protruding direction of the elastic pieces 222 from an outer peripheral part of the circular disc part 245 and which is embedded in a lower position of the pocket portion 223, as illustrated in FIG. 18. In the circular disc part 245, its radial width changes in a circumferential direction so as to avoid the recessed portion 241 of the main part 221. In the cylindrical part 246, its axial width is made approximately constant in a circumferential direction.

Other constructions and operation and effects are the same as those of the above-mentioned first embodiment.

In addition, as a modified example of this embodiment, in the reinforcing ring 244, a rib 250 may be provided between the circular disc part 245, which is a bending portion of the reinforcing ring 244, and the cylindrical part 246, as illustrated in FIG. 19. This makes it possible to suppress the spring back of the circular disc part 245 and the cylindrical part 246. At the same time, this also makes it possible to enhance the strength of a bending portion. In addition, since a synthetic resin flows into a cavity 230a (see FIG. 15) in a back side of the rib 250 at the time of injection molding, it is possible to further improve the bond strength between the synthetic resin of the snap cage 240 for a ball bearing and the reinforcing ring 244.

In addition, the case that a cylindrical part extends from an outer peripheral part of a circular disc part to a protruding direction of elastic pieces has been exemplified in the above-mentioned first and second embodiments. Instead, the cylindrical part may extend from an inner periphery edge of the circular disc part to the protruding direction of the elastic pieces.

Third Embodiment

Next, with reference to FIGS. 20 to 29, a third embodiment of a snap cage for a ball bearing and a ball bearing according to the present invention will be described. In addition, about the same parts as or equivalent parts to those of the first embodiment, the same symbols are assigned in drawings, and their descriptions will be omitted or simplified.

Figure 20:
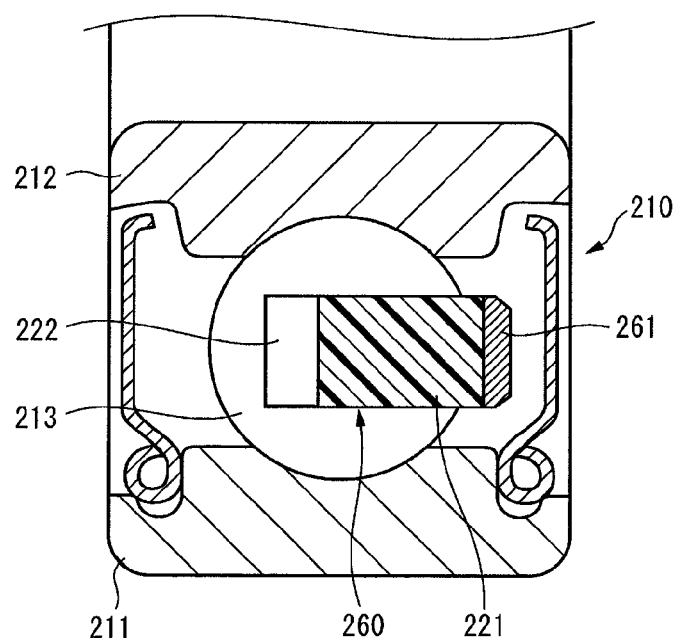
FIG. 20 is a sectional view, of a substantial part, for describing a third embodiment of a snap cage for a ball bearing, and a ball bearing according to the second invention of the present application.
Figure 21:
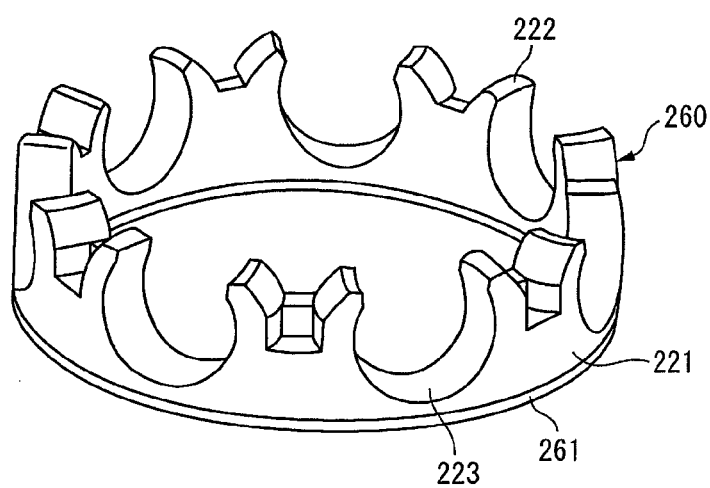
FIG. 21 is a whole perspective view illustrating the snap cage for a ball bearing illustrated in FIG. 20.
Figure 22:
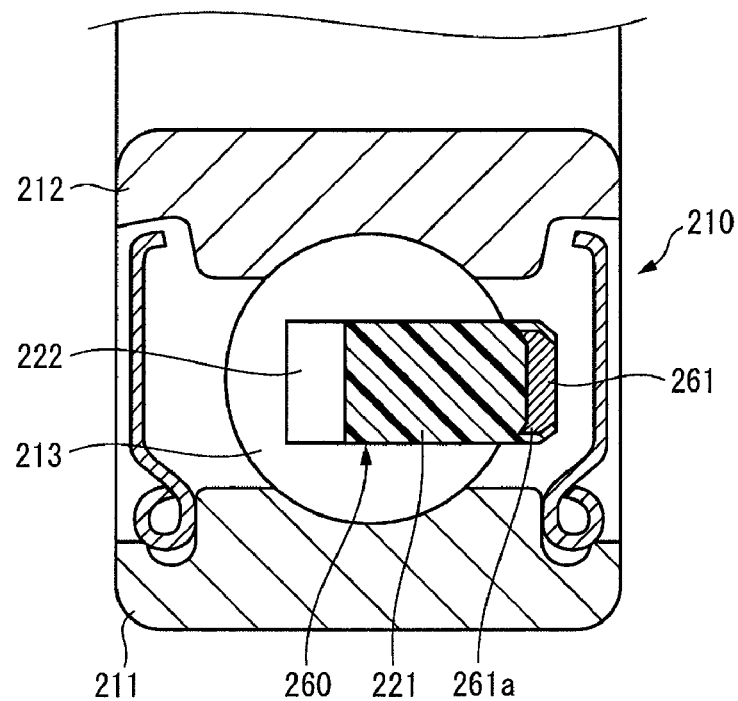
FIG. 22 is a sectional view, of a substantial part, illustrating a first modified example of a reinforcing ring which is fixed to the snap cage for a ball bearing illustrated in FIG. 21.
Figure 23:
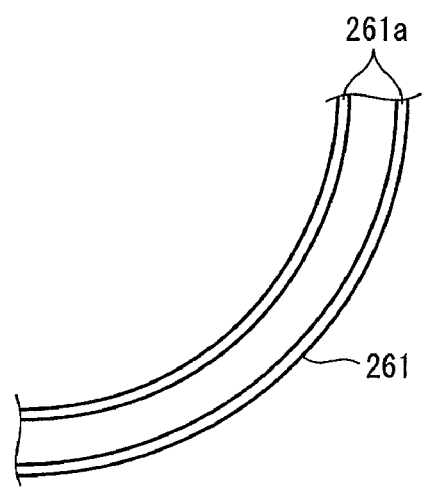
FIG. 23 is a drawing illustrating a circumferential part of the reinforcing ring illustrated in FIG. 22.
Figure 24:
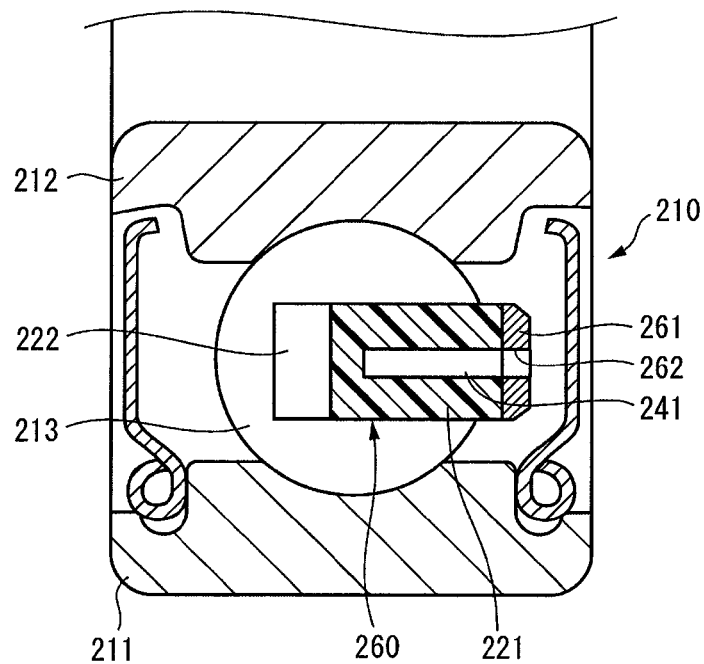
FIG. 24 is a sectional view, of a substantial part, illustrating a second modified example of a reinforcing ring which is fixed to the snap cage for a ball bearing illustrated in FIG. 21.
Figure 25:
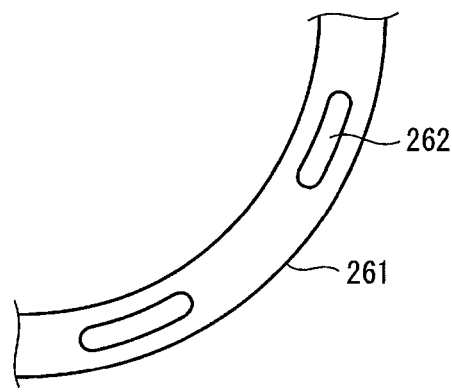
FIG. 25 is a drawing illustrating a circumferential part of the reinforcing ring illustrated in FIG. 24.
Figure 26:
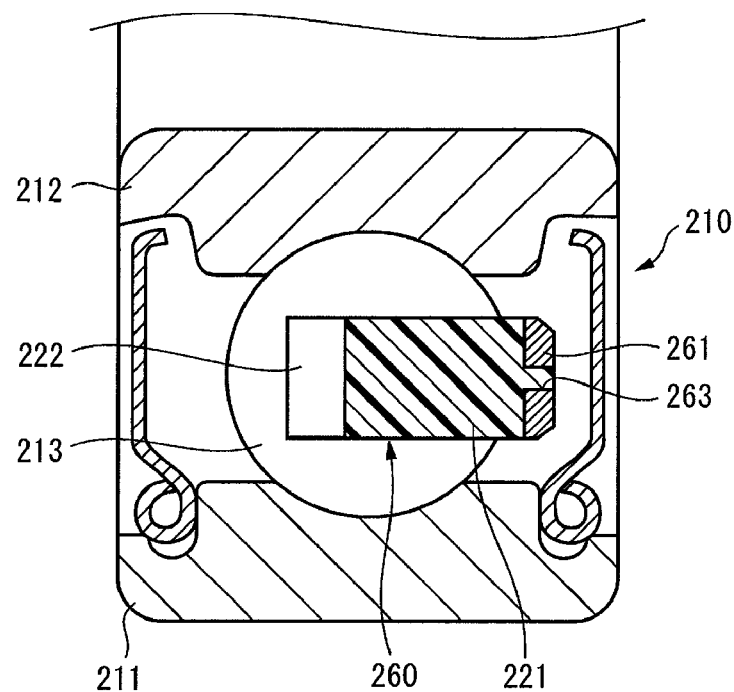
FIG. 26 is a sectional view, of a substantial part, illustrating a third modified example of a reinforcing ring which is fixed to the snap cage for a ball bearing illustrated in FIG. 21.
Figure 27:
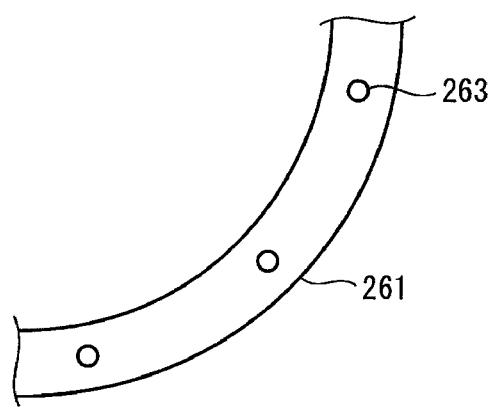
FIG. 27 is a drawing illustrating a circumferential part of the reinforcing ring illustrated in FIG. 26.

FIG. 20 is a sectional view, of a substantial part, for describing a third embodiment of the snap cage for a ball bearing and the ball bearing according to the present invention. FIG. 21 is a whole perspective view illustrating the snap cage for a ball bearing illustrated in FIG. 20. In addition, FIG. 22 is a sectional view, of a substantial part, illustrating a first modified example of a reinforcing ring which is fixed to the snap cage for a ball bearing illustrated in FIG. 21. FIG. 23 is a drawing illustrating a circumferential part of the reinforcing ring illustrated in FIG. 22. FIG. 24 is a sectional view, of a substantial part, illustrating a second modified example of the reinforcing ring which is fixed to the snap cage for a ball bearing illustrated in FIG. 21. FIG. 25 is a drawing illustrating a circumferential part of the reinforcing ring illustrated in FIG. 24. FIG. 26 is a sectional view, of a substantial part, illustrating a third modified example of the reinforcing ring which is fixed to the snap cage for a ball bearing illustrated in FIG. 21. FIG. 27 is a drawing illustrating a circumferential part of the reinforcing ring illustrated in FIG. 26. FIG. 28 is a sectional view, of a substantial part, illustrating a fourth modified example of a reinforcing ring which is fixed to the snap cage for a ball bearing illustrated in FIG. 21. FIG. 29 is a drawing illustrating a circumferential part of the reinforcing ring illustrated in FIG. 28.

In the snap cage 260 for a ball bearing in accordance with this embodiment, a reinforcing ring 261, constructed of a circular metal plate more rigid than the synthetic resin of the snap cage 260 for a ball bearing, is fixed by an adhesive to an axial end face opposite to positions of the elastic pieces 222 of the main part 221, as illustrated in FIGS. 20 and 21.

In addition, in the snap cage 260 for a ball bearing in accordance with this embodiment, the reinforcing ring 261 is not embedded in the main part 221 of the snap cage 260 for a ball bearing. When adopting such structure, it becomes possible to increase the thickness of the reinforcing ring 261 more than the case of embedding the reinforcing ring 261 in the main part 221. This is because, when embedding the reinforcing ring 261 in the main part 221, a space (thickness of a synthetic resin part in the main part 221) equal to or more than fixed thickness is necessary for a melting resin to flow at the time of insert molding on both sides of an axial direction of the reinforcing ring 261. However, in this embodiment, the space is needed only for one side (bonded side) of the axial direction of the reinforcing ring 261. Hence, when the same-sized snap cages for a ball bearing are compared, the snap cage 260 for a ball bearing in accordance with this embodiment has the reinforcing ring thicker by the difference of the space than that with the structure of embedding the reinforcing ring. This increases the torsional rigidity of the main part 221.

Hence, according to the snap cage 260 for a ball bearing and the ball bearing 210 in accordance with this embodiment, since the reinforcing ring 261 is bonded through an adhesive in the axial end face opposite to the formation positions of the elastic pieces 222 of the main part 221, it is possible to improve the bond strength between the synthetic resin of the snap cage 260 for a ball bearing and the reinforcing ring 261 which have different coefficients of linear expansion and moduli of elasticity, and the rigidity of the snap cage 260 for a ball bearing, and in particular, the flexural rigidity and the torsional rigidity of the main part 221. Therefore, also in the case where the high speed driving of the ball bearing 210 is performed under the environment of high temperature, it is possible to suppress the deformation of the snap cage 260 for a ball bearing by a centrifugal force or heat, and it is also suppress the oscillatory deformation of the snap cage 260 for a ball bearing by a disturbance. This prevents the snap cage 260 for a ball bearing from being damaged by the elastic piece 222 of the snap cage 260 for a ball bearing interfering with an inner peripheral surface of the outer ring 211, and allows the maintenance of high performance of the ball bearing 210 and also allows high performance of the rotating equipment favorably.

Other constructions and operation and effects are the same as those of the above-mentioned first embodiment.

In addition, as a first modified example in accordance with this embodiment, as illustrated in FIGS. 22 and 23, it is sufficient to further enhance the rigidity of the cage 260 by bending both inside and outside peripheral parts of the reinforcing ring 261 in an axial direction to form a bending part 261a. In this case, since the radial width of the reinforcing ring 261 becomes narrow, it is possible to enhance reliability of an adhesive joint of the snap cage 260 for a ball bearing and the reinforcing ring 261 more by making the synthetic resin of the snap cage 260 for a ball bearing round the both inside and outside peripheral parts of the reinforcing ring 261.

In addition, as a second modified example in accordance with this embodiment, as illustrated in FIG. 24, in the main part 221 between respective pocket portions 223 adjacently arranged in a circumferential direction of the snap cage 260 for a ball bearing, the recessed portions 241 may be respectively provided in axial end portions opposite to the positions of the elastic pieces 222 of the main part 221. As illustrated in FIGS. 24 and 25, two or more openings 262 which make protruding portions provided in a mold for formation of the recessed portions 241 penetrate through may be provided circumferentially in approximately equal intervals in the reinforcing ring 261. In addition, the openings 262 function to fix (position) the reinforcing ring 261 using the protruding portions provided in the mold, at the time of insert molding. In addition, each recessed portion 241 is formed in an approximately trapezoidal shape so as to have an uniform thickness between with the inner peripheral surface of each pocket portion 223. The recessed portions 241 are provided because of making thickness of respective parts of the cage nearly equal so as to suppress deformation due to resin thickness inequality at the time of insert molding, and weight saving of the cage, and the like.

In addition, as a third modified example of this embodiment, as illustrated in FIGS. 26 and 27, two or more openings 263 into which the synthetic resin of the snap cage 260 for a ball bearing enters may be provided circumferentially in the reinforcing ring 261 in approximately equal intervals. By adopting such structure, mechanical coupling effected by the synthetic resin entering into the openings 263 is combined with chemical bonding between the synthetic resin of the snap cage 260 for a ball bearing and the reinforcing ring 261 by the adhesive. This further enhances the reliability of the adhesive joint between the synthetic resin of the snap cage 260 for a ball bearing and the reinforcing ring 261.

Furthermore, as a fourth modified example of this embodiment, as illustrated in FIGS. 28 and 29, the first modified example to third modified example of this embodiment may be combined. That is, the both inside and outside peripheral parts of the reinforcing ring 261 to an axial direction to form the bending part 261a are bended. Two or more openings 262 which make the protruding portions provided in a mold for formation of the recessed portions 241 penetrate through may be provided circumferentially in approximately equal intervals in the reinforcing ring 261. Two or more openings 263 into which the synthetic resin of the snap cage 260 for a ball bearing enters are provided circumferentially in the reinforcing ring 261 in approximately equal intervals.

Fourth Embodiment

Next, with reference to FIGS. 30 to 39, a fourth embodiment of a snap cage for a ball bearing and a ball bearing according to the present invention will be described. In addition, about the same parts as or equivalent parts to those of the first embodiment, the same symbols are assigned in drawings, and their descriptions will be omitted or simplified.

Figure 30:
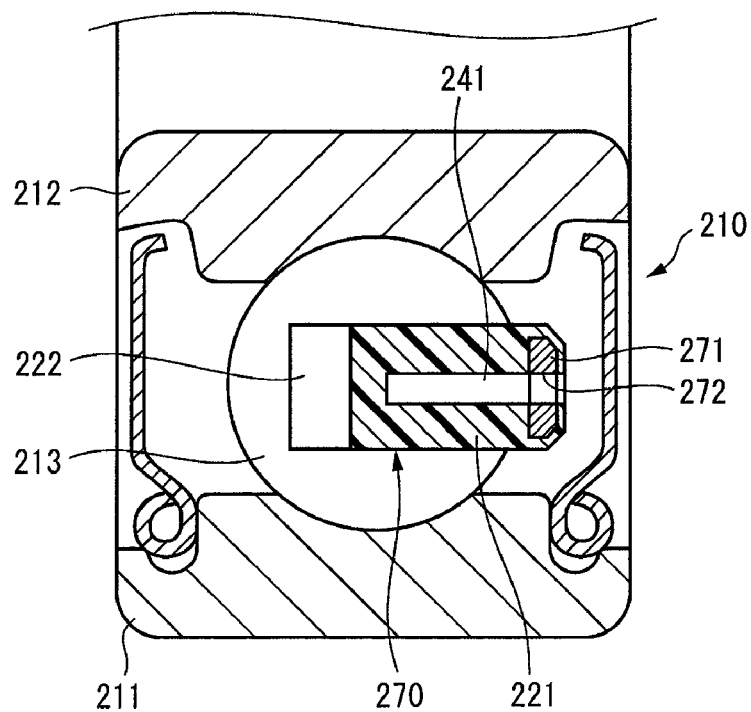
FIG. 30 is a sectional view, of a substantial part, for describing a fourth embodiment of a snap cage for a ball bearing, and a ball bearing according to the second invention of the present application.
Figure 31:
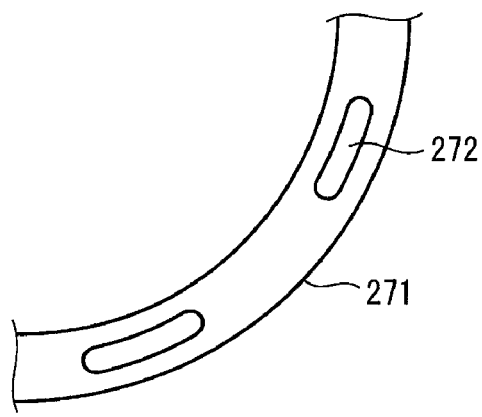
FIG. 31 is a drawing illustrating a circumferential part of the reinforcing ring which is embedded in the snap cage for a ball bearing illustrated in FIG. 30.
Figure 32:
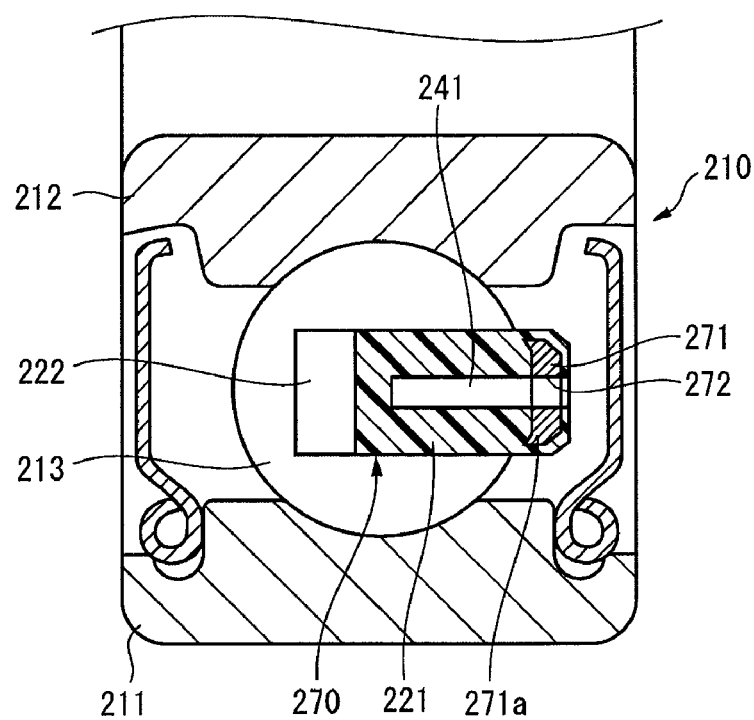
FIG. 32 is a sectional view, of a substantial part, illustrating a first modified example of the reinforcing ring which is fixed to the snap cage for a ball bearing illustrated in FIG. 30.
Figure 33:
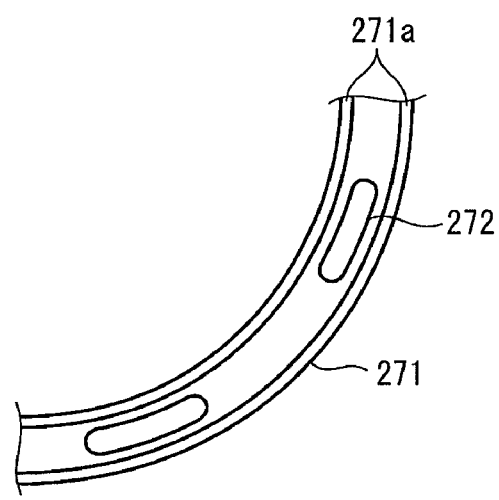
FIG. 33 is a drawing illustrating a circumferential part of the reinforcing ring illustrated in FIG. 32.
Figure 34:
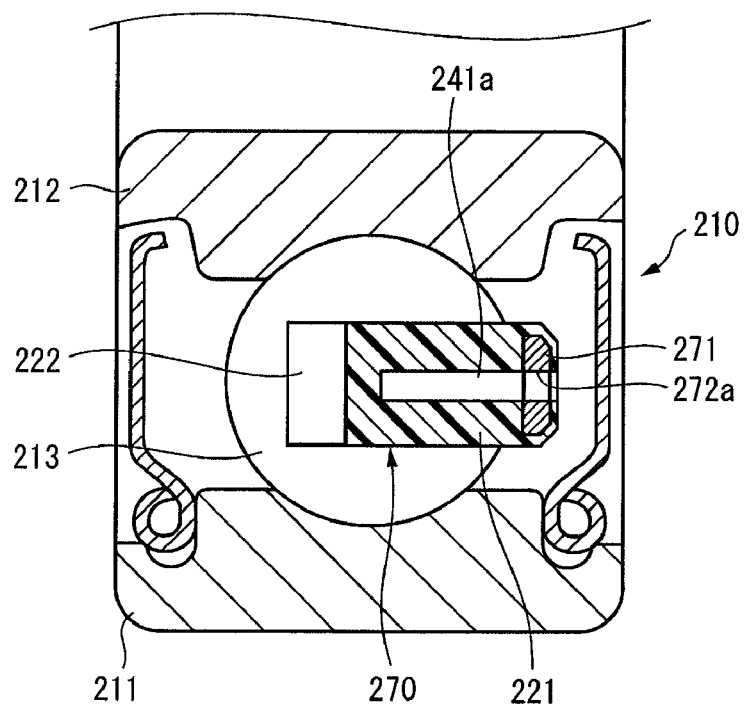
FIG. 34 is a sectional view, of a substantial part, illustrating a second modified example of the reinforcing ring which is fixed to the snap cage for a ball bearing illustrated in FIG. 30.
Figure 35:
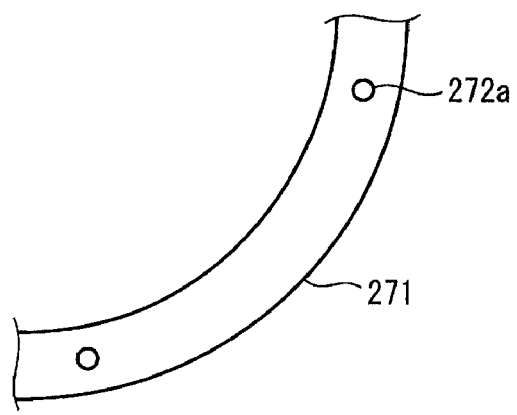
FIG. 35 is a drawing illustrating a circumferential part of the reinforcing ring illustrated in FIG. 34.
Figure 36:
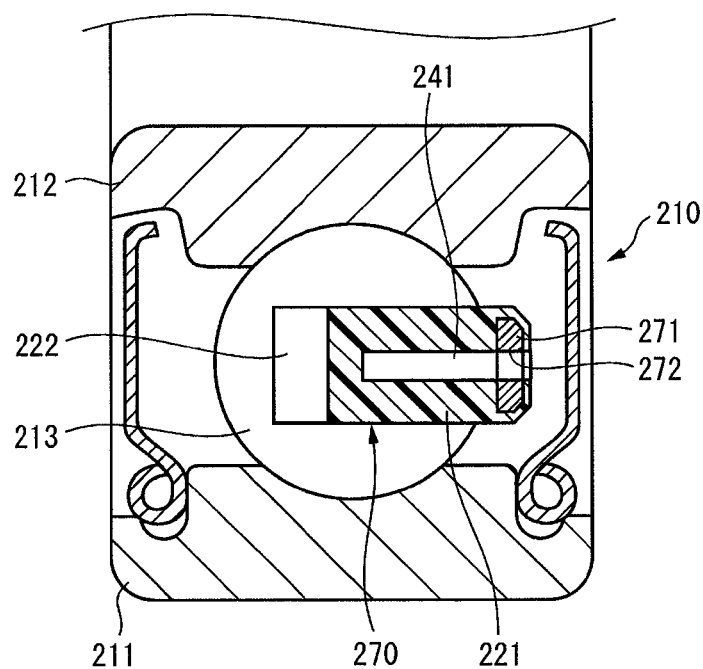
FIG. 36 is a sectional view, of a substantial part, illustrating a third modified example of the reinforcing ring which is fixed to the snap cage for a ball bearing illustrated in FIG. 30.
Figure 37:
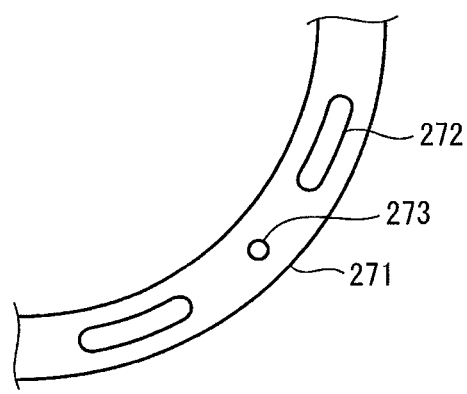
FIG. 37 is a drawing illustrating a circumferential part of the reinforcing ring illustrated in FIG. 36.
Figure 38:
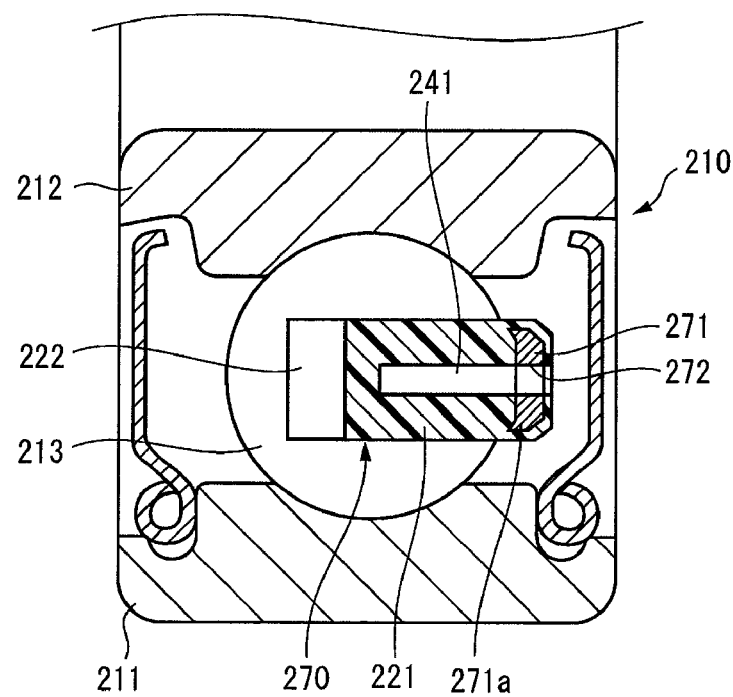
FIG. 38 is a sectional view, of a substantial part, illustrating a fourth modified example of the reinforcing ring which is fixed to the snap cage for a ball bearing illustrated in FIG. 30.
Figure 39:
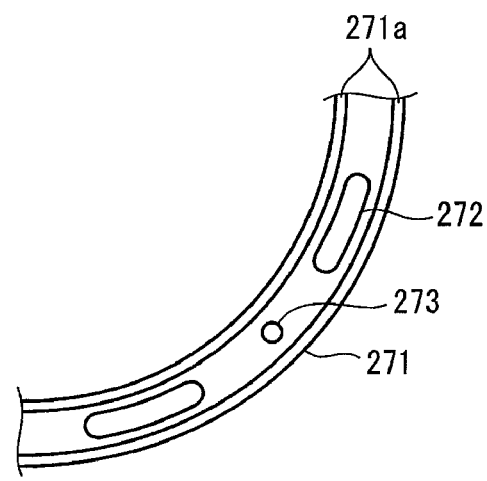
FIG. 39 is a drawing illustrating a circumferential part of the reinforcing ring illustrated in FIG. 38.

FIG. 30 is a main part sectional view for describing a fourth embodiment of the snap cage for a ball bearing and the ball bearing according to the present invention, and FIG. 31 is a drawing illustrating a circumferential part of a reinforcing ring which is embedded in the snap cage for a ball bearing illustrated in FIG. 30. In addition, FIG. 32 is a main part sectional view illustrating a first modified example of a reinforcing ring which is embedded in the snap cage for a ball bearing illustrated in FIG. 30, and FIG. 33 is a drawing illustrating a circumferential part of the reinforcing ring illustrated in FIG. 32. Furthermore, FIG. 34 is a main part sectional view illustrating a second modified example of a reinforcing ring which is embedded in the snap cage for a ball bearing illustrated in FIG. 30, and FIG. 35 is a drawing illustrating a circumferential part of the reinforcing ring illustrated in FIG. 34. Furthermore, FIG. 36 is a main part sectional view illustrating a third modified example of a reinforcing ring which is embedded in the snap cage for a ball bearing illustrated in FIG. 30, and FIG. 37 is a drawing illustrating a circumferential part of the reinforcing ring illustrated in FIG. 36. Furthermore, FIG. 38 is a main part sectional view illustrating a fourth modified example of a reinforcing ring which is embedded in the snap cage for a ball bearing illustrated in FIG. 30, and FIG. 39 is a drawing illustrating a circumferential part of the reinforcing ring illustrated in FIG. 38.

A snap cage 270 for a ball bearing of this embodiment has respective recessed portions 241 in an axial end portion opposite to the positions of the elastic pieces 222 of this main part 221, between respective pocket portions 223 adjacently provided circumferentially, as illustrated in FIGS. 30 and 31. This recessed portion 241 is formed in an approximately trapezoidal shape so as to be uniform thickness between with the inner peripheral surface of each pocket portion 223. In addition, the recessed portion 241 is provided because of making thickness of respective parts of the cage nearly equal so as to suppress deformation due to resin thickness inequality at the time of resin molding, and weight saving of the cage, and the like.

In addition, in the snap cage 270 for a ball bearing of this embodiment, a reinforcing ring 271 constructed of a circular metal plate more rigid than a synthetic resin of the snap cage 270 for a ball bearing is embedded in an axial end part opposite to formation positions of the elastic pieces 222 of the main part 221, and the synthetic resin of the snap cage 270 for a ball bearing and the reinforcing ring 271 are bonded with an adhesive.

Furthermore, two or more openings 272 which make protruding portions provided in a mold for formation of the recessed portions 241 pass may be provided circumferentially in approximately equal intervals in the reinforcing ring 271, and these openings 272 function also in order to fix (position) the reinforcing ring 271 using the protruding portions, provided in the mold, at the time of insert molding.

In the snap cage 270 for a ball bearing of this embodiment, although the reinforcing ring 271 is embedded in the main part 221 of the snap cage 270 for a ball bearing, this is for enhancing the reliability of the adhesion of the snap cage 270 for a ball bearing and the reinforcing ring 271. Although a phenomenon of deterioration of an adhesive is a phenomenon which is not avoided in essence on actual use, it is possible to make its progress slow by controlling degrees of incidence of external factors, such as heat, water content, chemicals (grease, lubricating oil, and the like), and oxygen. Thus, by embedding the reinforcing ring 271 in the main part 221 of the snap cage 270 for a ball bearing, external influences leading to deterioration progress become difficult to extend to an adhesive layer formed on a surface of the reinforcing ring 271, and hence, it becomes possible to maintain a favorable adhesion state over a longer period of time.

Hence, according to the snap cage 270 for a ball bearing and the ball bearing 210 of this embodiment, the reinforcing ring 271 constructed of a circular metal plate more rigid than a synthetic resin of the snap cage 270 for a ball bearing is embedded in an axial end part opposite to formation positions of the elastic pieces 222 of the main part 221, and the synthetic resin of the snap cage 270 for a ball bearing and the reinforcing ring 271 are bonded with an adhesive. Therefore, it is possible to improve bond strength between the synthetic resin of the snap cage 270 for a ball bearing and the reinforcing ring 271 which have different coefficients of linear expansion and moduli of elasticity, and the rigidity of the snap cage 270 for a ball bearing, and in particular, the flexural rigidity and torsional rigidity of the main part 221. Thereby, also in the case where high speed driving of the ball bearing 210 is performed under the environment of high temperature, since it is possible to suppress the deformation of the snap cage 270 for a ball bearing by a centrifugal force or heat, and the oscillatory deformation of the snap cage 270 for a ball bearing by a disturbance, it is possible to avoid the snap cage 270 for a ball bearing being damaged by the elastic pieces 222 of the snap cage 270 for a ball bearing interfering with an inner peripheral surface of the outer ring 211, and it is possible to maintain performance of the ball bearing 210, and further, performance of rotating equipment favorably.

Other constructions and operation and effects are the same as those of the above-mentioned first embodiment.

In addition, as a first modified example of this embodiment, as shown in FIGS. 32 and 33, it is sufficient to enhance further the rigidity of the cage 270 by bending both inside and outside peripheral parts of the reinforcing ring 271 in an axial direction to form a bending part 271a.

Furthermore, as a second modified example of this embodiment, as illustrated in FIGS. 34 and 35, while providing a recessed portion 241a which is round instead of the long hole-shaped recessed portion 241 in the main part 221, a round opening 272a which makes a protruding portion, provided in a mold for formation of the recessed portion 241a, pass may be provided in the reinforcing ring 271 instead of the long hole-shaped opening 272.

In addition, as a third modified example of this embodiment, as illustrated in FIGS. 36 and 37, two or more openings 272 which make protruding portions provided in a mold for formation of the recessed portions 241 pass may be provided circumferentially in approximately equal intervals in the reinforcing ring 271, and two or more openings 273 into which the synthetic resin of the snap cage 270 for a ball bearing enters may be provided circumferentially in approximately equal intervals. Thereby, it is possible to further enhance the reliability of the adhesive joint of the synthetic resin of the snap cage 270 for a ball bearing and the reinforcing ring 271.

Furthermore, as a fourth modified example of this embodiment, as illustrated in FIGS. 38 and 39, the first modified example to third modified example of this embodiment may be combined. That is, while bending both inside and outside peripheral parts of the reinforcing ring 271 to an axial direction to form the bending part 271a, two or more openings 272 which make protruding portions provided in a mold for formation of the recessed portions 241 pass may be provided circumferentially in approximately equal intervals in the reinforcing ring 271, and two or more openings 273 into which the synthetic resin of the snap cage 270 for a ball bearing enters may be provided circumferentially in the reinforcing ring 271 in approximately equal intervals.

(Manufacturing Method of Snap Cage for Ball Bearing)

Next, a manufacturing method of the snap cage for a ball bearing of the first to fourth embodiments mentioned above will be described.

The snap cage for a ball bearing of this embodiment is manufactured by performing insert molding of a synthetic resin of the snap cage for a ball bearing by using as a core a reinforcing ring (metal plate) on which an adhesive has been baked in a half cured state, and thereafter curing the adhesive completely by a secondary heating to integrally form an adhesive bond between the reinforcing ring and the main part of the snap cage for the ball bearing. In addition, the material of the reinforcing ring is not limited particularly. Examples are a carbon steel plate (SPCC, SECC: the like), a stainless steel plate, various kinds of galvanized steel sheets, a surface treated steel sheet, and the like. When rust prevention of an adhesive is not sufficient, when being exposed to an environment where it is easy to rust at the time of performing thermal refining treatment or the like, or when consideration to rust is necessary for various conveniences, it is preferable to use a stainless steel plate, a galvanized steel sheet, and a surface treated steel sheet. In addition, in the production method of this embodiment, although the adhesive is cured by secondary heating, the adhesive may be cured only with the step of performing insert molding of a synthetic resin of the snap cage for a ball bearing with making the reinforcing ring, on which the adhesive is baked in the half cured condition, as a core, without performing secondary heating.

In addition, it is preferable to provide fine projections and dents in an adhesive joint object face of a reinforcing ring in order to enhance an adhesion with an adhesive. This is because, when projections and dents are provided in an adhesive joint object face of a reinforcing ring, an adhesive enters into these projections and dents and junction becomes firm because of an anchor effect. Furthermore, a method of providing concavities and convexities in an adhesive joint object face of a reinforcing ring is not limited particularly, but, for example, a mechanical treatment method (blasting and the like), a chemical treatment method (phosphate conversion treatment and the like), and the like can be exemplified.

The adhesive becomes in a half cured condition to the extent which is not desorbed and spilt out with a high-pressure synthetic resin, which melts, at the time of insert molding, and it becomes in a cured state completely by heat from the melting resin, or secondary heating after molding in addition to it. As an available adhesive, a phenol resin adhesive, an epoxy resin adhesive, or the like that dilution with a solvent is possible and a cure reaction near two phases advances is preferable in consideration of heat resistance, chemical resistance, and handling ability. Moreover, the half cured condition is achieved by, for example, applying heat to an adhesive coated to a reinforcing ring to advance a certain amount of cure reaction.

It is preferable that an adhesive layer thickness is 1 to 40 μm, and it is more preferable that it is 2 to 30 μm. When adhesive thickness is too thin, it becomes hard to secure a sufficient adhesion stably on a function. On the other hand, when adhesive layer thickness is too thick, it becomes hard to secure an extent of half cured condition, which does not flow out at the time of insert molding, and a functionally sufficient adhesion simultaneously.

In addition, as for the adhesive layer thickness, it is possible to obtain desired thickness by adjusting a concentration, a coating method, and the number of times of coating of an adhesive component dispersion liquid to be used. About the coating method, it is not limit particularly so long as it is possible at least to coat it on an adhesive joint object face of a reinforcing ring, but it is suitably selectable from coating methods, such as dipping, brush coating, and spraying.

It is preferable to coat an adhesive on a whole adhesive joint object face of a reinforcing ring so as to secure adhesive strength of the synthetic resin of the snap cage for a ball bearing and the reinforcing ring. Nevertheless, when adhesive strength is fully maintained, it is also good to adopt such construction in which partial coating is performed only on a necessary part in consideration of working efficiency, cost, and the like of an adhesive application. On the other hand, when an adhesive is coated on a whole surface of a reinforcing ring, it is possible to obtain advantageous effects that an adhesive layer formed on the surface suppresses oxidation and corrosion of a metal plate.

As a synthetic resin of the snap cage for a ball bearing, what injection molding is possible and what has heat resistance because of an operating environment are preferable, for example, single substances or mixtures of aliphatic polyamide resins such as polyamide 6, polyamide 66, polyamide 46, polyamide 11, polyamide 12, polyamide 610, and polyamide 612, aromatic polyamide resins such as polyamide 9T, polyamide 6T, and polyamide MXD6, and an amorphous polyamide resins having a cyclic ring (let all the above be generically called polyamide resins), a polyphenylene sulfide resin, a polyether ether ketone resin, and the like can be exemplified, but, in consideration of reactivity with an adhesive and cost, a polyamide resin is preferable.

In addition, in order to enhance strength of a snap cage for a ball bearing, it is preferable to add fibrous fillers, such as a glass fiber, a carbon fiber, and a whisker, and spherical fillers, such as calcium carbonate, to a synthetic resin to be used. As to a filling amount, it is preferable to be 10 to 60 wt %, and it is further preferable to be 20 to 50 wt %. When a filling amount of a filler is too small, a satisfactory reinforcing effect cannot be obtained. On the other hand, when a filling amount of a filler is too large, it is inferior to formability.

Examples

Next, although the present application is further described with citing examples, the present application is not limited at all by this.

A bearing rotation test was performed using the snap cages for a ball bearing of Examples 1, 2, 3 and 4, and Comparative examples 1 and 2.

First, manufacturing of the ball bearing snap cages will be described.

As to an adhesive which bonds each snap cage for a ball bearing and each reinforcing ring in Examples 1 to 4, a phenol resin adhesive (Meta-Lock (registered trademark) N-15 by TOYO CHEMICAL LABORATORIES INC.) containing 30 wt % of solid contents whose main component was a novolac type phenol resin was further diluted suitably with methyl ethyl ketone so as to obtain an adhesive layer with desired thickness was used. Then, after coating the adhesive all over the reinforcing ring (SECC: 0.5 mm in thickness), which is made of a circular metal plate, with dipping, it was dried at room temperature for 30 to 60 minutes in order to evaporate a solvent. In addition, in a state that drying was completed, adhesive layer thickness measured by an electromagnetic thickness tester was about 6 to 10 μm.

Thereafter, the reinforcing ring was left alone in a 120° C. thermostatic oven for 30 minutes until the coated adhesive became in a half cured condition to the extent of not flowing out at the time of insert molding. Next, the reinforcing ring with the adhesive on the half cured condition was set on a mold, and insert molding of the synthetic resin was performed by making it as a core. Then, in order to cure completely the adhesive of a taken-out molding product, it was left alone in a 150° C. thermostatic oven for 1 hour, and the snap cage for a ball bearing was obtained.

On the other hand, in the first and second comparative examples, each snap cage for a ball bearing was obtained without using an adhesive by setting in a mold the reinforcing ring (SECC: 0.5 mm in thickness), which is made of a circular metal plate, as it is, and performing insert molding of the synthetic resin by making it as a core.

The snap cage for a ball bearing of Example 1 was made to have the same structure as that in FIGS. 20 and 21, and the snap cages for a ball bearing of Example 2 and Comparative example 1 were made to have the same structure as that in FIGS. 28 and 29. In addition, the snap cage for a ball bearing of Example 3 was made to have the same structure as that in FIGS. 30 and 31, and the snap cages for a ball bearing of Example 4 and Comparative example 2 were made to have the same structure as that in FIGS. 38 and 39. In addition, Examples 1 to 4 and Comparative examples 1 and 2 are respective snap cages for a deep groove ball bearing, outer diameter×inside diameter×width of which is all 90 mm×50 mm×20 mm. In addition, all of Examples 1 to 4 and Comparative examples 1 and 2 used polyamide 46 containing 25 wt % of glass fiber as a synthetic resin of a snap cage for a ball bearing.

The bearing rotation test was performed with grease lubrication with applying a load (radial load: 980 N, axial load: 980 N) to a deep groove ball bearing embedding each of the snap cages for a ball bearing of Examples 1 to 4 and Comparative examples 1 and 2. The test was made as a 20-hours continuous rotation test in fixed rotational speed, the snap cage was detached from the deep groove ball bearing the rotation test of which had been completed, and presence of a contact of an end part outer periphery of elastic pieces of the snap cage and an outer ring inner peripheral surface was verified. When the contact was not found, a new deep groove ball bearing for a test was prepared, rotational speed was increased, and the same rotation test was performed. This was repeated with increasing the rotational speed successively until the contact of the end part outer periphery of the elastic pieces of the snap cage and the outer ring inner peripheral surface was found.

Test results are shown in Table 1 and Table 2. In addition, in Table 1, in Examples 1 and 2 and Comparative example 1, maximum rotational speed at the time of the contact of the end part outer periphery of elastic pieces of the snap cage and the bearing outer ring inner peripheral surface did not occur is relatively expressed in ratios (maximum rotational speed ratios) with letting rotational speed in Comparative example 1 be 1. In addition, in Table 2, in Examples 3 and 4 and Comparative example 2, maximum rotational speed at the time of the contact of the end part outer periphery of elastic pieces of the snap cage and the bearing outer ring inner peripheral surface did not occur is relatively expressed in ratios (maximum rotational speed ratios) with letting rotational speed in Comparative example 2 be 1.

TABLE 1

|  | Example 1 | Example 2 | Comparative example 1 |
|---|---|---|---|
| Maximum rotational speed ratio at which contact of cage and outer ring is not generated in bearing rotation test (Comparative example 1 = 1.0) | 2.0 | 2.6 | 1.0 |

TABLE 2

|  | Example 3 | Example 4 | Comparative example 2 |
|---|---|---|---|
| Maximum rotational speed ratio at which contact of cage and outer ring is not generated in bearing rotation test (Comparative example 2 = 1.0) | 2.2 | 2.7 | 1.0 |

Apparently from Table 1 and Table 2, it turns out that the deep groove ball bearings embedding the snap cages of Examples 1 to 4 in each of which the reinforcing ring and the snap cage for a ball bearing were bonded through the adhesive are rotatable without generating a contact of the end part outer periphery of the elastic pieces of the snap cage, and the outer ring inner peripheral surface even if it operates at high rotational speed in comparison with the deep groove ball bearings embedding the snap cages of comparative examples 1 and 2 in each of which the reinforcing ring and the snap cage for a ball bearing were not bonded through the adhesive.

From the above evaluation results, it turns out that, according to the snap cage for a ball bearing and its manufacturing method of the present invention, since the cage main part and the reinforcing ring made of a circular metal plate are firmly bonded with the adhesive, even if a ball bearing is used under a severe environment, it is possible to prevent deformation of the snap cage by a centrifugal force applied with operation, and it is possible to rotate at high speed the ball bearing embedding this snap cage.

Embodiment of Third Invention

A third invention of the present application relates to a snap cage which holds rotatably a plurality of balls which construct a ball bearing, and its manufacturing method.

Figure 48:
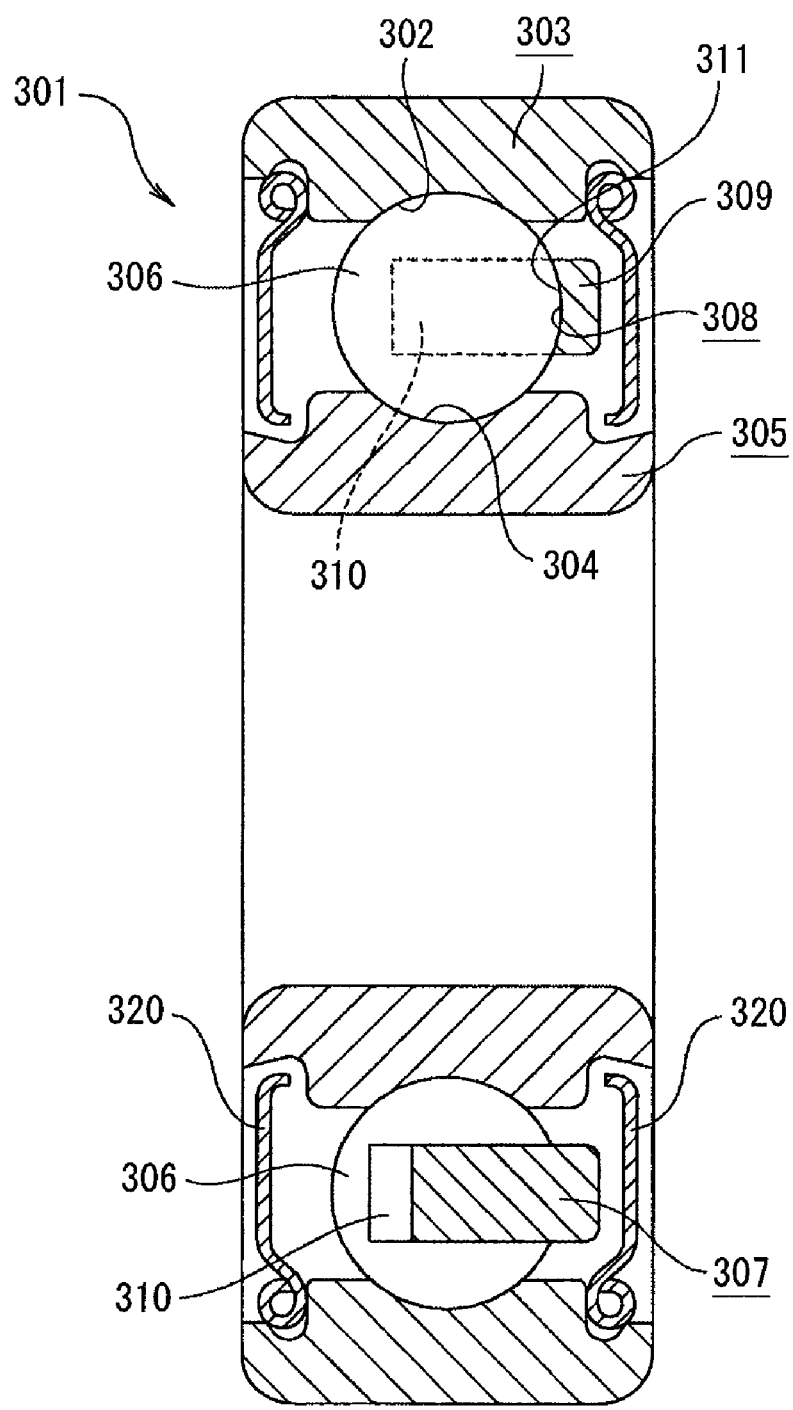
FIG. 48 is a sectional view illustrating an example of a ball bearing equipped with a snap cage.

In order to support various rotating parts, for example, a ball bearing 301 as illustrated in FIG. 48 is used widely. The ball bearing 301 illustrated is constructed by arranging an outer ring 303 which has an outer ring raceway 302 in an inner peripheral surface, and an inner ring 305 which has an inner ring raceway 304 in an outer peripheral surface concentrically, and providing balls 306 and 306, which are two or more rolling elements, rotatably with a cage 307 between these outer ring raceways 302 and the inner ring raceway 304. In addition, locking peripheral lines of respective ring-like shields 320 and 320 on both end inner peripheral surfaces of the outer ring 304 prevents leakage of grease, which exists in installed parts of the balls 306 and 306, outside by both the shields 320 and 320, and invasion of dust, which floats outside, into these installed parts.

In addition, the cage 307 is called a snap cage, and is formed in one piece by injection-molding a synthetic resin or a synthetic resin containing reinforcing fiber, such as a glass fiber, and a carbon fiber. Although polyamide 66 is generally used as a synthetic resin, polyamide 46 which is excellent in heat resistance in an application that operating temperature exceeds 160° C. is general. In addition, a polyphenylene sulfide resin, a polyether ether ketone resin, and the like may be used.

Figure 49:
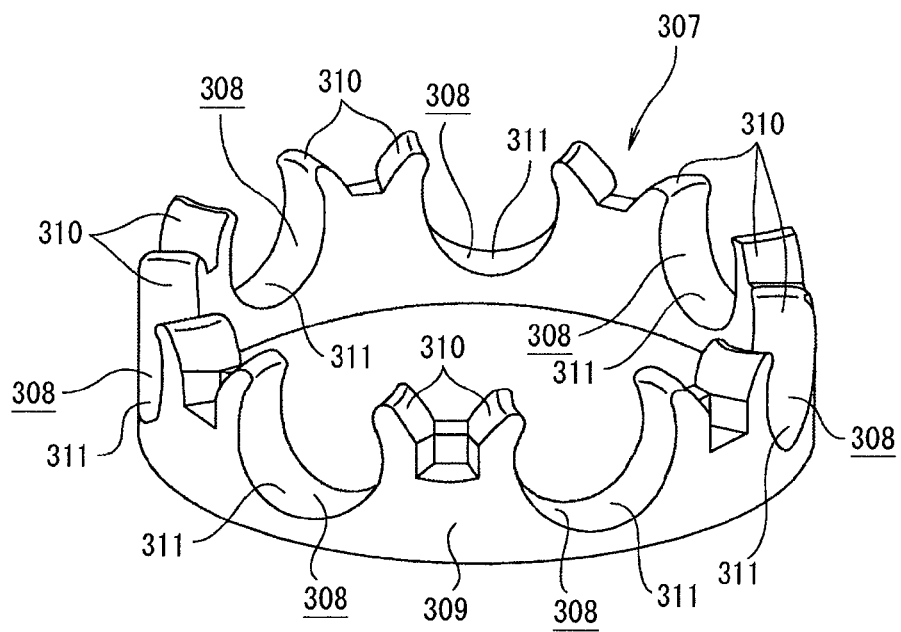
FIG. 49 is a whole perspective view illustrating an example of a conventional snap cage.

Although the whole perspective view is illustrated in FIG. 49, this snap cage 307 comprises: a circular main part 309; and pockets 308 and 308, which hold balls rotatably. Two or more locations are provided circumferentially in axial (vertical direction in the drawing) one face (top face in the drawing) of this main part 309. Each of the pockets 308 and 308 is constructed of one side of a pair of elastic pieces 310 and 310 which is arranged with keeping a space mutually in an axial one side of the main part 309, and spherical concave surface portions 311 and 311 provided between this pair of elastic pieces 310 and 310 in an axial one side of the main part 309. Inner surfaces of the concave surface portions 311 and 311, and circumferential side faces of respective elastic pieces 310 and 310 which stretch in these concave surface portions 311 and 311 are made to be partially spherical convex surfaces which have a single center of curvature, and whose radius of curvature is made slightly larger than a radius of the raceway surface of a ball 306, and they are made to be able to hold the ball 306 rotatably in the respective pockets 308 and 308. In addition, each face may be made into a cylindrical face.

When the ball bearing 301 is assembled, while expanding resiliently the space of tip edges of the pair of elastic pieces 310 and 310 which construct each of the pockets 308 and 308, each of the balls 306 and 306 is pushed in between this pair of elastic pieces 310 and 310. Thus, the snap cage 307 holds each of the balls 306 and 306 rotatably between the inner ring raceway 304, and the outer ring raceway 302 by embracing the balls 306 and 306 in the respective pockets 308 and 308.

At the time of using the ball bearing 301 comprising such the snap cage 307, relative rotation between the outer ring 303 and the inner ring 305 is made free in connection with a rolling motion of the balls 306 and 306. At this time, the balls 306 and 306 revolve around the inner ring 305 with rotating on its axis. In addition, the snap cage 307 rotates around the inner ring 305 at the same speed as the revolution speed of the balls 306 and 306.

However, recently, performance of various rotating equipment embedding the ball bearing 301 has improved, and the relative rotation speed between the outer ring 303 and the inner ring 305, that is, the rotational speed of the snap cage 307 has become high. In consequence, a centrifugal force applied to the snap cage 307 has become large, and it has become impossible to disregard elastic deformation of the elastic pieces 310 and 310 which construct the snap cage 307. Thus, since these respective elastic pieces 310 and 310 are supported by an axial one face of the circular main part 309 in a cantilever type, when rotational speed of the snap cage 307 becomes high and a centrifugal force becomes large, elastic deformation that tips of the respective elastic pieces 310 and 310 are displaced outside in a radial direction is caused. At the time of this elastic deformation, not only the respective elastic pieces 310 and 310, but also the main part 309 is elastically deformed in a twisted manner.

Then, the consequence of such elastic deformation, end part outer periphery of each of the elastic pieces 310 and 310 interferes (rubs) with a part of an inner peripheral surface of the outer ring 303, a torque necessary for relative rotation of the outer ring 303 and the inner ring 305 increases, temperature rise and abnormal noise based on heat generated with operation further become remarkable, and in the extreme case, it becomes also a cause of a malfunction such as burn-in, or the like. In particular, in the case of that rotating equipment is used under the condition of high temperature such as an engine room of an automobile (e.g., an auxiliary machine, such as an AC dynamo), each of the elastic pieces 310 and 310 becomes easy to be elastically deformed, and the above inconvenience becomes remarkable.

Figure 50:
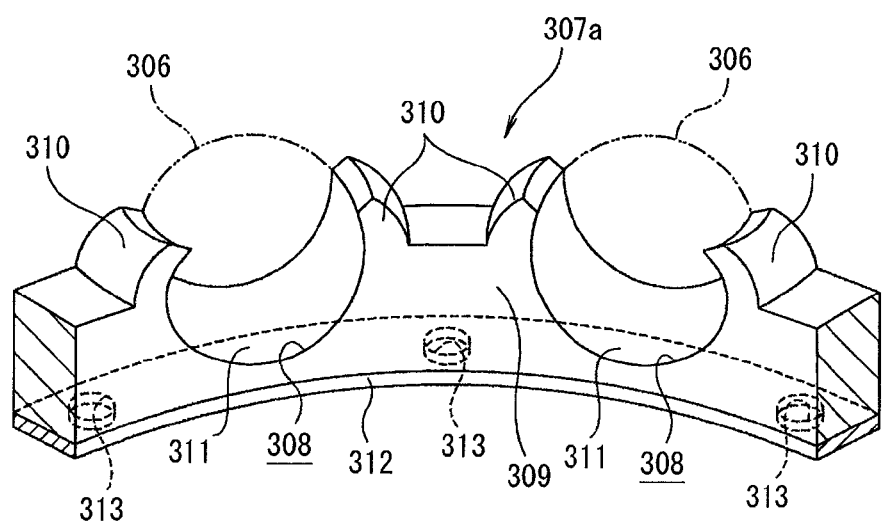
FIG. 50 is a whole perspective view illustrating an example of a conventional and the present invention's snap cages.

In order to dissolve such a malfunction, as illustrated in FIG. 50, a snap cage 307a in which a reinforcing ring 312 which is made of a circular metal plate is bonded in a face (bottom face) opposite to a face where the pocket 308 of the main part 309 is formed is developed. In this snap cage 307a, the reinforcing ring 312 enhances the swing rigidity of the main part 309 to suppress the end parts of the elastic pieces 310 and 310 displacing by a centrifugal force outside in a radial direction (See Japanese Patent Laid-Open No. H8-145061 and Japanese Patent Laid-Open No. 2000-161365). In addition, round openings 313 and 313 are formed in locations, which are equivalent to midpoints between pairs of elastic pieces 310 and 310, in the reinforcing ring 312, and by insert-molding the synthetic resin using this reinforcing ring 312 as a core, the reinforcing ring 312 is firmly bonded to the bottom face of the main part 309.

In addition, in order to enhance further reliability of junction of the main part 309 and the reinforcing ring 312, the applicant proposed previously a snap cage that the main part 309 and the reinforcing ring 312 were chemically bonded with an adhesive (Japanese Patent Application No. 2006-143098 specification).

Nevertheless, in the snap cage 307a that the reinforcing rings 312 is bonded as the above, since the reinforcing ring 312 is made from metal and the main part 309 is made from a synthetic resin, difference between both coefficients of thermal expansion is large, and hence, while being repeatedly exposed to low temperature and high temperature, a jointing condition of the main part 309 and the reinforcing ring 312 deteriorates gradually because of difference between stretching amounts. Although carbon steel such as SPCC or SECC is generally used from reasons such as cost, workability, and easy procurement for the reinforcing ring 312, a coefficient of linear expansion of carbon steel is small, that is, 1.1 to 1.2×10−5K−1 among metallic materials, and hence, there is a worry that, while a high speed rotation tendency advances, deterioration of a jointing condition with the main part 309 is further promoted.

Then, the present invention has been made in view of such the present circumstances, and aims at making it possible to maintain the jointing condition of the main part 309 and the reinforcing ring 312 favorably even in an environment, where it is repeatedly exposed to low temperature and high temperature, in the snap cage 307a with construction of bonding the main part 309 and the reinforcing ring 312.

In order to achieve the above-mentioned object, the present invention provides the snap cage and its manufacturing method which are shown below.

(1) A snap cage which comprises a resin-made circular main part, a plurality of pockets formed integrally in one axial face of the above-mentioned main part and holds rotatably each one ball between a pair of elastic pieces arranged with keeping intervals mutually over a circumferential direction, and a metal plate is bonded to an axially opposite face of the above-mentioned main part with an adhesive, being characterized in that the above-mentioned metal plate is made of a metallic material which has a coefficient of linear expansion exceeding that of carbon steel.

(2) A snap cage described in the above-mentioned (1), being characterized in that the above-mentioned adhesive is at least one type which is selected from a phenol resin adhesive and an epoxy resin adhesive.

(3) A manufacturing method of the snap cage described in the above-mentioned (1) or (2), the manufacturing method of the snap cage being characterized by comprising a step of injecting a synthetic resin around the circular metal plate where the adhesive is baked in a half cured condition and performing insert molding.

(4) A manufacturing method of the snap cage described in the above-mentioned (1) or (2), the manufacturing method of the snap cage being characterized by comprising a step of injecting a synthetic resin around the circular metal plate where the adhesive is baked in a half cured condition and performing insert molding, and a step of curing the adhesive by secondary heating.

In the snap cage according to the present invention, the reinforcing ring is formed with a metallic material with a coefficient of linear expansion greater than that of a carbon steel. Therefore, the difference with the coefficient of thermal expansion of a synthetic resin which constitutes the main part becomes smaller than the case where the reinforcing ring made of a carbon steel is used. Hence, even if the snap cage is used under the environment where it is repeatedly exposed to low temperature and high temperature, the bonding state of the main part and the reinforcing ring is maintained favorably.

Hereafter, a third invention of the present invention will be described in detail with referring to drawings.

The snap cage of the present invention is made by bonding with an adhesive the main part, which is made of a synthetic resin, and a reinforcing ring.

Although there is no restriction in the synthetic resin which forms the main part, what can be injection-molded is preferable in view of productivity, and further, what has heat resistance is preferable. Specifically, aliphatic polyamide resins such as polyamide 6, polyamide 66, polyamide 46, polyamide 11, polyamide 12, polyamide 610, and polyamide 612, aromatic polyamide resins such as polyamide 9T, polyamide 6T, and polyamide MXD6, an amorphous polyamide resin having a cyclic ring (let all the above be generically called polyamide resins) or mixtures thereof, a polyphenylene sulfide resin, a polyether ether ketone resin, and the like can be used. Among them, the polyamide resin is preferable in view of reactivity with an adhesive and cost.

In addition, in order to enhance strength, it is possible to combine fibrous fillers, such as a glass fiber, a carbon fiber, and a whisker, and granular fillers, such as calcium carbonate, to the synthetic resin. It is preferable that blending quantity of a filler is 10 to 60 wt % of the whole, and more preferably, 20 to 50 wt %. A reinforcing effect is not sufficient when the blending quantity of a filler is less than 10 wt %, formability degrades when it exceeds 60 wt %, and in particular, fluidity suitable for injection molding cannot be obtained.

The reinforcing ring is made of a metallic material which has a coefficient of linear expansion exceeding a coefficient of linear expansion of carbon steel. Although the coefficient of linear expansion of carbon steel is 1.1 to $1.2 \times 10-5K-1$ and there is no restriction in particular so long as it is a metallic material which has a coefficient of linear expansion exceeding this, for example, SUS304 (coefficient of linear expansion: $1.7 \times 10-5K-1$) of austenitic stainless steels, an aluminum alloy (coefficient of linear expansion: $2.3 \times 10-5K-1$), and a magnesium alloy (coefficient of linear expansion: $2.6 \times 10-5K-1$) can be used suitably. In particular, an aluminum alloy and a magnesium alloy have more than twofold the coefficient of linear expansion of carbon steel, and hence, are preferable.

The snap cage of the present invention is manufactured by making a reinforcing ring, in which an adhesive is baked on a contact surface with a main part on a half cured condition, as a core, insert-molding a synthetic resin, and completely curing the adhesive with heat from the melting synthetic resin, or secondary heating. For that, although it is necessary that the adhesive is in a half cured condition to the extent which is not desorbed and spilt out with a high-pressure synthetic resin, which melts, at the time of insert molding, what is necessary in order to make it into such a half cured condition is just to perform heating at temperature lower than curing temperature for predetermined time, after coating then adhesive to the reinforcing ring. Alternatively, short-time heating at curing temperature may be performed. In addition, as for the adhesive, what can be diluted with a solvent is preferable in view of coating property.

As described above, a suitable adhesive in the present invention is an adhesive of two-phase cure type which can be diluted with a solvent, and which is not cured at normal temperature, maintains a moderate half cured condition, and is completely cured with heat from a melting synthetic resin, or secondary heating, and specifically, a phenol resin adhesive and an epoxy resin adhesive can be cited. In addition, the phenol resin adhesive and epoxy resin system adhesive also have an advantage of excelling also in heat resistance and chemical resistance.

In addition, as for application quantity of an adhesive, it is preferable to be 1 to 40 μm in thickness in a dry state before becoming in a half cured condition, and more preferably, 2 to 30 μm. When the application quantity of the adhesive is 1 μm or less, it becomes hard to secure a sufficient adhesion stably on a function, and when thickening it to more than 40 μm, it becomes hard to secure an extent of half cured condition, which does not flow out at the time of insert molding, and a functionally sufficient adhesion simultaneously.

There is no restriction in a coating method of the adhesive, dipping, brush coating, spraying, or the like can be selected suitably according to a concentration of an adhesive solution or an adhesive dispersion liquid, viscosity, or the like, and coating is performed so as to become the above-mentioned application quantity by adjusting the number of times of coating and the like. In addition, it is preferable to coat the adhesive all over a contact surface of the reinforcing ring. Since the reinforcing ring is metal, an advantageous effect that oxidation and corrosion are suppressed is also obtained by coating the adhesive all over a bonding surface and covering it with an adhesive layer. Nevertheless, when adhesive strength can be fully secured and maintained, it is also good to partially coat the adhesive only on a necessary part in consideration of working efficiency, cost, and the like of an adhesive application. On the other hand, as for the contact surface of the reinforcing ring, it is preferable that concavo-convex processing or roughing are performed, and then, the adhesive enters a recessed portion and a groove and junction becomes more firm by an anchor effect. As the concavo-convex processing or roughing, mechanical methods, such as blasting, and chemical treatment, such as phosphate conversion treatment can be exemplified.

In addition, in the present invention, as long as the reinforcing ring is made of a metallic material which has a coefficient of linear expansion exceeding carbon steel and can be bonded to the main part through the adhesive, there is no restriction in each form and structure of the main part and reinforcing ring. For example, as shown in FIG. 50, it is possible to make a snap cage 307 having construction of bonding the reinforcing ring 312 which has the round opening 313, and the main part 309 which has the pocket 308 formed with the pair of elastic pieces 310 and 310.

Figure 46A:
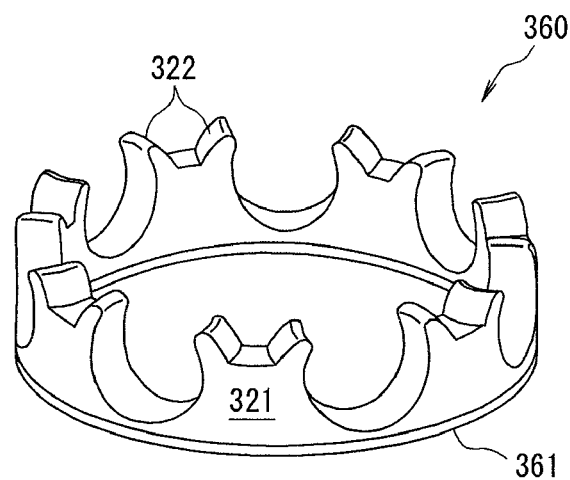
FIG. 46(a) is a whole perspective view illustrating the snap cage.
Figure 46B:
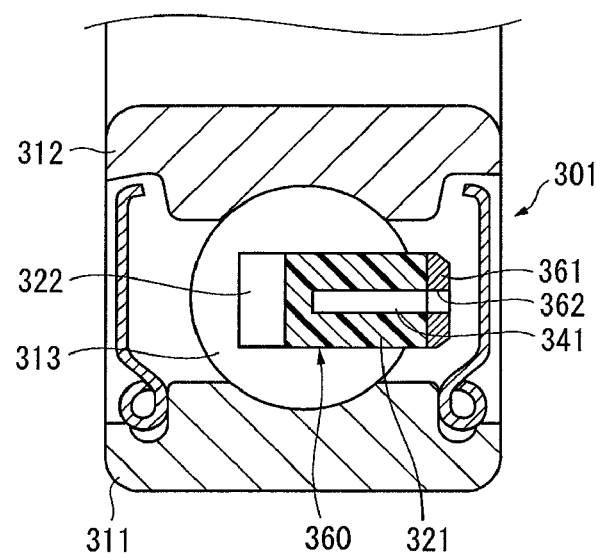
FIG. 46(b) is a main part sectional view illustrating a state of being embedded into a ball bearing according to FIG. 48.
Figure 46C:
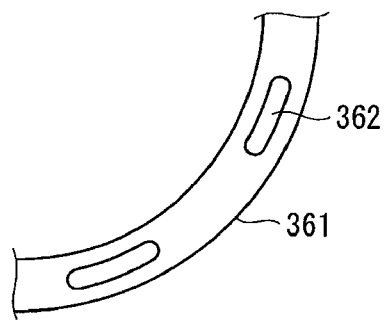
FIG. 46(c) is a top view illustrating a part of a reinforcing ring.

In addition, it is also possible to make snap cages illustrated in FIGS. 46 and 47. In addition, in FIGS. 46 and 47, (a) is a whole perspective view illustrating the snap cage, (b) is a main part sectional view illustrating a state of being embedded into a ball bearing according to FIG. 48, and (c) is a top view illustrating a part of a reinforcing ring.

In the snap cage 360 illustrated in FIG. 46, as illustrated in FIG. 46(*a*), pairs of elastic pieces 322 and 322 are formed in two or more locations circumferentially in an axially single side in a circular main part 321, and, as illustrated in FIG. 46(*b*), a pocket is formed with each pair of elastic pieces 322 and 322, and a ball 313 is held rotatably. In addition, a form and size of each section of the elastic pieces 322 and 322, and pocket can comply with the snap cage 307 illustrated in FIG. 49, and hence, descriptions will be omitted here.

The reinforcing ring 361 is a circular flat plate, and a long opening 362 is formed so as to be located in a position in which the round opening 313 of the reinforcing ring 312 of the snap cage 307 illustrated in FIG. 50 is formed, that is, a middle between adjacent pockets. This long opening 362 is for forming a blank (reference numeral 341 in FIG. 46(*b*)) called a "lightening recessed portion" inside the middle between adjacent pockets of the main part 321. In injection molding of a resin, it is known that, when a portion with large thickness exists in a molded product to be obtained, shrinkage due to temperature drop after the injection molding becomes large in this portion, a concavity called "sink mark" arises, and deformation around it is induced, and when such deformation occurs in a snap cage, a contact state between a pocket inner surface and a surface of a rolling element becomes poor. Then, by forming the lightening recessed portion 341, thickness becomes thin and it is possible to prevent the "sink mark" from arising.

In order to produce the snap cage 360 which has such the lightening recessed portion 341 in the main part 321, although the reinforcing ring 361 is used as a core and insert molding of the synthetic resin is performed, at that time, a core protrusion corresponding to the form of the lightening recessed portion 341 is inserted into the long opening 362 of the reinforcing ring 361. By forming the core protrusion in one piece with a mold, and making it insert into the long opening 341 of the reinforcing ring 361, a position of the reinforcing ring 361 is restricted, and the main part 321 and reinforcing ring 361 are formed with good accuracy. In addition, although a form of the lightening recessed portion 341 is omitted on illustration, it is preferable to make it as a form of an approximately crest shape that circumferential length tapers as it goes to an elastic piece side from a long opening side.

In a snap cage 370 illustrated in FIG. 47, as illustrated in FIG. 47(a), the main part 321 is the same as that of the snap cage 360 illustrated in FIG. 46, and has construction of holding the ball 313 rotatably in a pocket formed with a pair of elastic piece 322 (see FIG. 47(b)).

On the other hand, as illustrated in FIG. 47(c), a reinforcing ring 371 comprises a bent portion 371a which is made by bending both of inner and outer peripheral edges of a circular flat plate part toward the main part (upper part in the drawing) of the cage, and, further in a plane part, the same long opening 372 as that in the reinforcing ring 361 illustrated in FIG. 46 is formed, and a round opening 373 is formed in a way point between adjacent long openings 372, that is, a position corresponding to directly under a deepest portion of a pocket. In addition, width of a flat plate part and a degree of angle of bend of the bent portion 371a are suitably set according to thickness of the main part 321 so as not to protrude from the main part 321.

Similarly to the snap cage 360 illustrated in FIG. 46, the snap cage 370 is produced by insert-molding the synthetic resin with making the reinforcing ring 371 as a core using a mold comprising a core protrusion, but the reinforcing ring 371 obtained is bonded in a state of being embedded in a bottom of the main part 321. In addition, the lightening recessed portion 341 is similarly formed in the main part 321, and the round opening 373 is located directly under the deepest portion of a pocket, that is, is located in an axially thinnest portion of the main part 321. For this reason, since a synthetic resin easily and fully flows also into this thinnest portion through the round opening 373, it is possible to prevent a defect from arising. In addition, bonding strength with the reinforcing ring 371 increases by the synthetic resin flowing into the round opening 373.

The snap cage 370 comprising such the reinforcing ring 371 has higher rigidity by the bent portion 371a of the reinforcing ring 371 in comparison with the reinforcing ring 361 which is a flat plate and is illustrated in FIG. 46. Hence, when comparing them in the same rigidity, it is possible to thin plate thickness of the reinforcing ring 371, and to achieve miniaturization and weight reduction of the snap cage 370. In addition, since the reinforcing ring 371 is embedded, it is possible to arrange it closely to a seal, and to perform miniaturization and weight reduction also as the whole bearing. Furthermore, since the reinforcing ring 371 is embedded, it is not separated from the main part 321.

In the above-mentioned snap cage according to the present invention, since the reinforcing ring is formed with a metallic material with a coefficient of linear expansion larger than that of carbon steel, difference between with a coefficient of thermal expansion of a synthetic resin which forms a main part becomes smaller than the case that the reinforcing ring which is made of carbon steel is used, and hence, even if it is used in an environment where it is repeatedly exposed to low temperature and high temperature, a jointing condition of the main part and the reinforcing ring is maintained favorably.

Examples

The present invention will be further described below with using samples and comparative examples.

Examples 11 to 13 and Comparative Example 11

In both of examples and a Comparative example, snap cages which were for deep groove ball bearings with an outer diameter of 90 mm, an inside diameter of 50 mm, and width of 20 mm, and were made by bonding a reinforcing ring which has the long opening illustrated in FIG. 46, and the main part made of a synthetic resin through the adhesive were produced.

In Example 11, 0.5 mm-thick SUS304 (coefficient of linear expansion: $1.7 \times 10-5K-1$) was worked into a prescribed shape, and the reinforcing ring was produced. Then, by dipping the reinforcing ring in an adhesive liquid made by diluting with methyl ethyl ketone an adhesive ("Meta-Lock N-15" by TOYO CHEMICAL LABORATORIES INC.) containing 30 wt % of solid contents whose main component was a novolac type phenol resin and drying it for 60 minutes at room temperature and evaporating methyl ethyl ketone, a 9 to 10-μm-thick adhesive layer was formed. In addition, adhesive layer thickness was measured with an electromagnetic thickness tester.

Next, the reinforcing ring on which the adhesive layer was formed was left alone for 30 minutes in a thermostatic oven at 120° C., and the adhesive layer was made into a half cured condition. Then, after insert-molding polyamide 46 containing 25 wt % of glass fibers using the reinforcing ring as a core, by taking out it from a mold, and leaving it alone for 60 minutes in a thermostatic oven at 150° C., the adhesive was completely cured.

In addition, an aluminum alloy (coefficient of linear expansion: $2.3 \times 10-5K-1$) was used as a reinforcing ring material in Example 12, a magnesium alloy (coefficient of linear expansion: $2.6 \times 10-5K-1$) was used as a reinforcing ring material in Example 13, SECC (coefficient of linear expansion: $1.1 \times 10-5K-1$) was used as a reinforcing ring material in Comparative example 1, and the snap cages each were produced similarly to Example 11.

Bonding durability was evaluated about the produced respective snap cages. That is, each snap cage was mounted in a thermal shock testing machine, "WINTECH NT510" made by Kusumoto Chemicals Co. Ltd., a thermal load whose one cycle was to hold it at −50° C. for 15 minutes, and thereafter, to hold at 150° C. for 15 minutes was repeatedly given, the snap cage was taken out for every constant cycle, and bonding strength of the reinforcing ring and main part was measured. Then, the cycle number at the time when bonding strength is halved from initial bonding strength was found. The results are illustrated in Table 3 in relative values with Comparative example 11.

TABLE 3

|  | Example 11 | Example 12 | Example 13 | Comparative example 11 |
| --- | --- | --- | --- | --- |
| Cycle number at the time when bonding strength reduces by half from initial bonding strength (Relative value with Comparative example 11) | 2.0 | 4.1 | 4.3 | 1.0 |

As shown in Table 3, it turns out that the snap cage of each Example according to the present invention is distinctly excellent on bonding durability in comparison with the snap cage of Comparative example 11 comprising the reinforcing ring which is made of carbon steel.

Embodiment of Fourth Invention

A fourth invention of the present application relates to a bearing for an automobile and a rolling bearing which constructs a rotation support portion of various rotating equipment such as a machine tool.

The bearing for an automobile and the rolling bearing which constructs a rotation support portion of various rotating equipment such as a machine tool are severely requested to advance high speed rotation. Until now, angular contact ball bearings have been used abundantly in high speed rotation applications. Since an angular contact ball bearing has a contact angle, it is possible to support a radial load and a one-directional angular load simultaneously, and hence, it is also possible to support bi-directional loads by selecting combination suitably. Nevertheless, assembly property is poor, a preload changes in an environment where temperature changes, and seizure may be generated.

Figure 57:
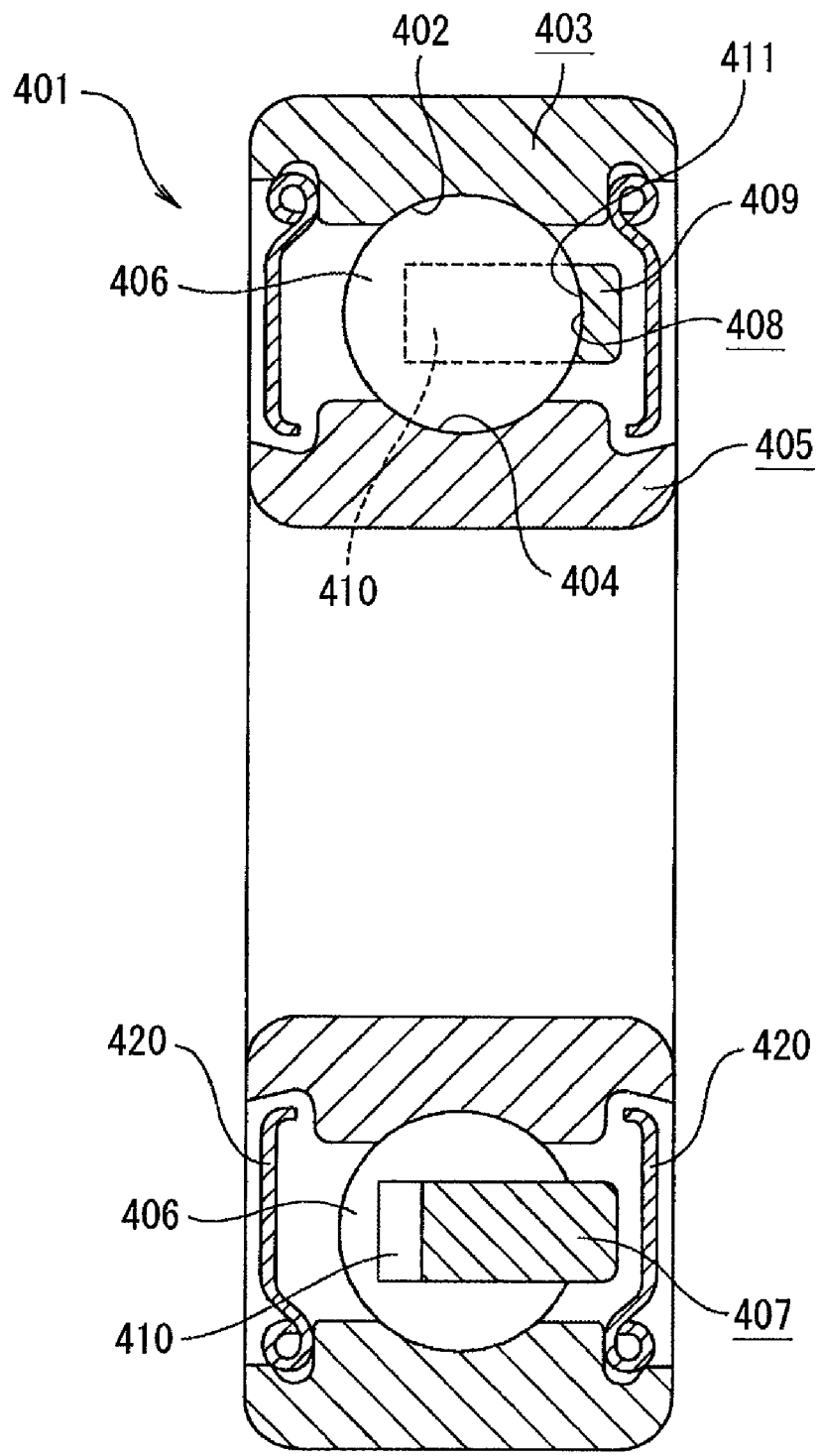
FIG. 57 is a sectional view illustrating an example of a deep groove ball bearing.

In addition, although a deep groove ball bearing is also used as rolling bearing, it has favorable assembly property, but a temperature rise is large under high speed rotation, and hence, there is a certain degree of restriction in operating rotation speed. Although FIG. 57 is a sectional view illustrating an example of a deep groove ball bearing, a deep groove ball bearing 401 illustrated is constructed by arranging an outer ring 403 which has an outer ring raceway 402 in an inner peripheral surface, and an inner ring 405 which has an inner ring raceway 404 in an outer peripheral surface concentrically, providing balls 406 and 406, which are two or more rolling elements, rotatably with a cage 407 between these outer ring raceways 402 and the inner ring raceway 404, further filling grease (not illustrated) for lubrication, and sealing it with a seal 420.

Figure 58:
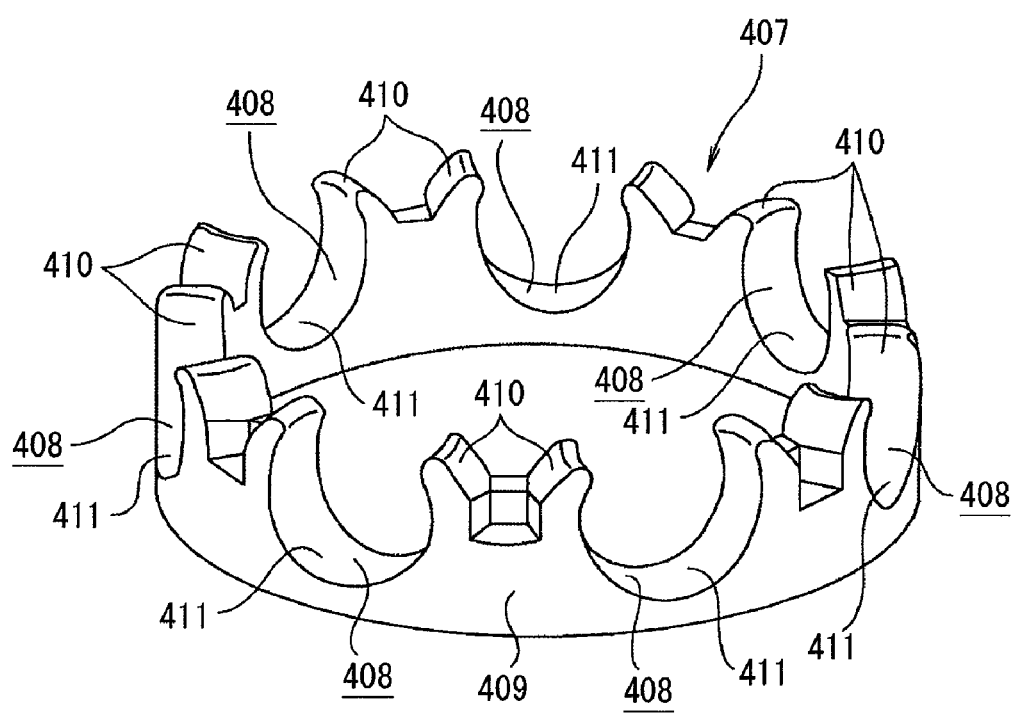
FIG. 58 is a whole perspective view illustrating an example of a conventional synthetic resin snap cage.
Figure 59:
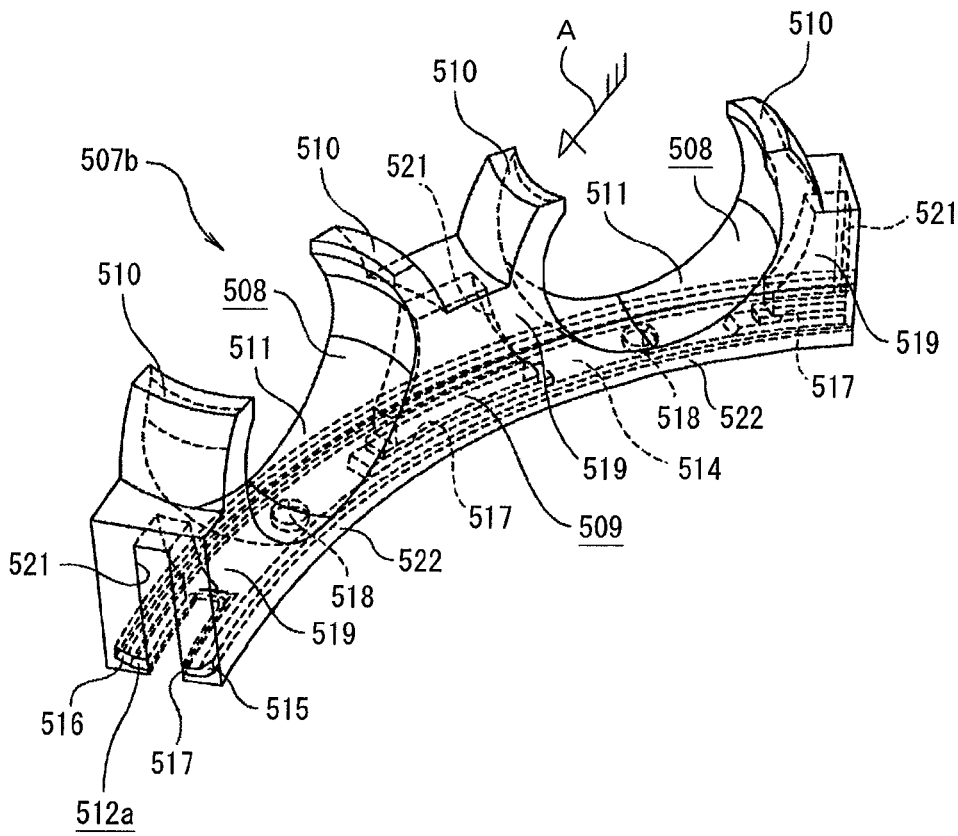
FIG. 59 is a partial perspective view of a cage illustrating one example of an embodiment of a fifth invention of the present application.
Figure 60:
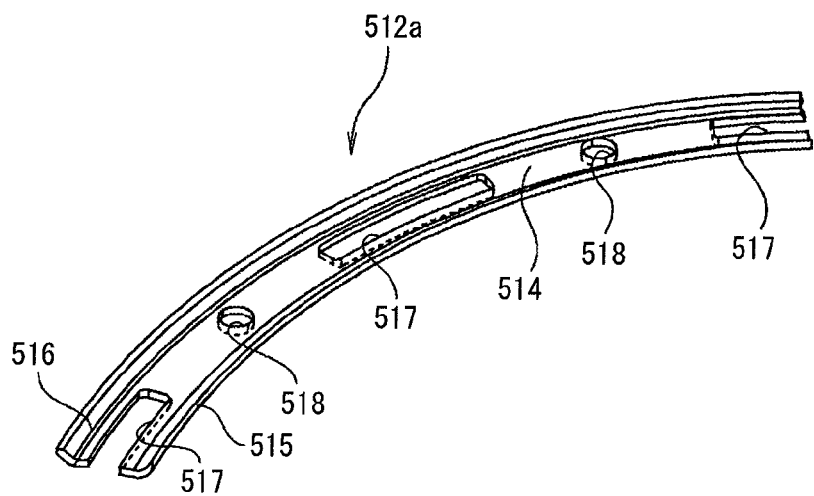
FIG. 60 is a partial perspective view of a reinforcing ring which is embedded in this cage.
Figure 61:
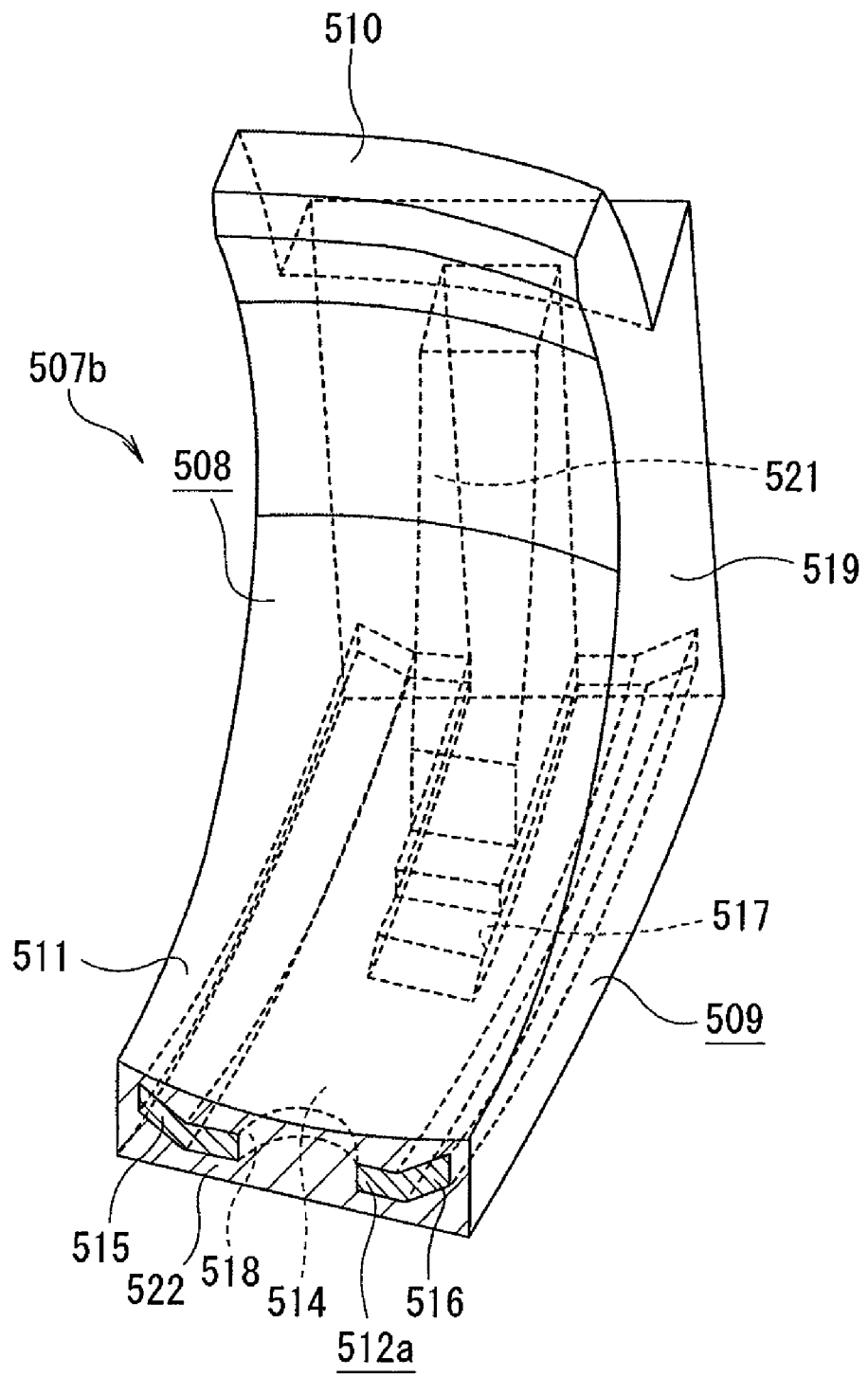
FIG. 61 is a partially enlarged perspective view with an upper right end part of FIG. 59 being cut when viewed from arrow A.
Figure 63:
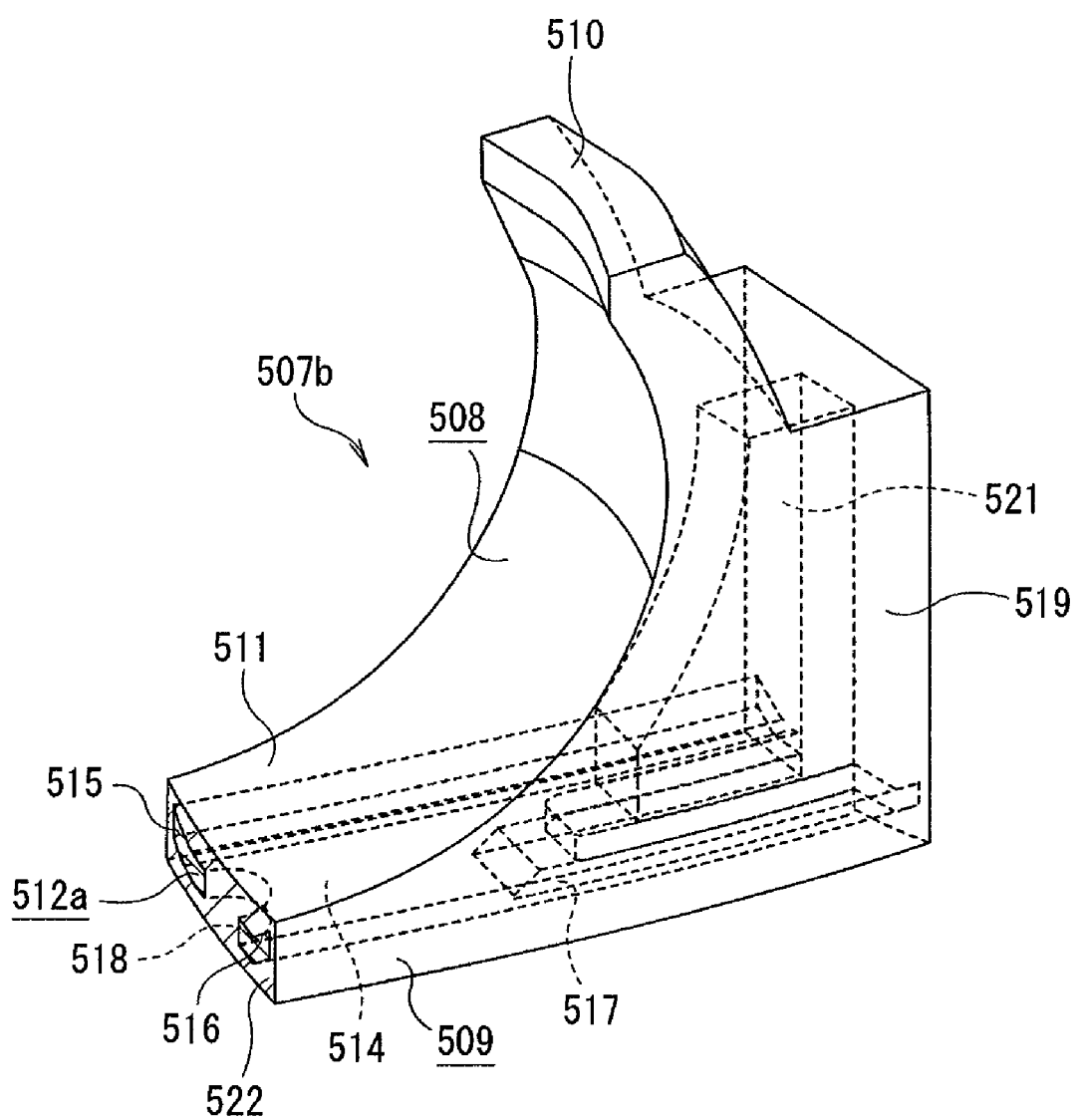
FIG. 63 is a partially enlarged perspective view when viewed from a right side of FIG. 61.

In addition, both of the outer ring raceway 402 and the inner ring raceway 404 are made deep groove types. In addition, the cage 407 is called a snap cage, it is obtained by injection-molding a synthetic resin or a synthetic resin containing a reinforcing fiber, such as a glass fiber, or a carbon fiber, and, as shown in FIG. 58, it comprises pockets 408 and 408 which hold balls 406 and 406 rotatably in two or more circumferential locations of a circular main part 409. Each of the pockets 408 and 408 is constructed of one sides of a pair of elastic pieces 410 and 410 which is arranged protrudently with keeping a space mutually in an axially (vertical direction in the drawing) upper side of the main part 409, and spherical concave surface portions 411 and 411 provided between the pair of elastic pieces 410 and 410 in an axially upper side of the main part 409.

Each inner surface of these concave surface portions 411 and 411 is made into a form which can hold each of the balls 406 and 406 rotatably by making its radius of curvature be slightly larger than a radius of curvature of a rolling contact surface of each ball 406. However, since the cage 407 is a product made of a synthetic resin, or a product made of a synthetic resin containing a reinforcing fiber, when a bearing is rotated at high speed, a centrifugal force is applied largely, a tip of the elastic piece 410, or the main part 409 may be also deformed outside in a radial direction according to circumstances, it contacts an outer ring groove shoulder to cause torque increase and remarkable temperature rise, and hence, seizure is caused.

In order to deal with such a malfunction, this applicant has previously proposed to make a peripheral side face of the elastic piece 410 of the cage 407 incline inward in a radial direction toward the tip thereof, and to additionally install a metal reinforcing material to the cage 407, so as to suppress deformation by a centrifugal force (see Japanese Patent Laid-Open No. 2000-161365). However, there is concern of heat generation or wear generation to further high speed rotation.

In addition, in the deep groove ball bearing 407, although a metal ribbon pressed cage may also be used, there are problems of the ribbon pressed cage restraining the ball 406 by a centrifugal force under high speed rotation to generate heat by contact wi Then, the present invention has been made in view of such circumstances, and aims at providing a rolling bearing which can be used sufficiently at high speed rotation, and which is also excellent in assembling property.

In order to achieve the above object, the present invention provides a rolling bearing which rotatably holds a plurality of rolling elements through a cage between an inner ring and an outer ring, and the rolling elements are made of are made of ceramics. In addition, a reinforcing ring, having a circular shape as a whole, made of a metallic plate is embedded in the inside the cage or bonded to the bottom of the cage.

In the rolling bearing according to the present invention, since the rolling body is made of ceramics that wear is few and heating value is also small, and the synthetic resin snap cage is also reinforced with the metal reinforcing ring to improve rigidity, and hence, to suppress deformation, heat generation by contact with the rolling body is suppressed also in high speed rotation, and wear also decreases. In addition, assembly property is also favorable.

Hereafter, a fourth invention of the present application will be described in detail with referring to drawings.

A rolling bearing in accordance with the present invention has no restriction as long as a rolling element is made from ceramics and a synthetic resin snap cage reinforced with a reinforcing ring is provided, for example, in a ball bearing 401 having construction illustrated in FIG. 57, it is possible to make a synthetic resin cage 407a product in which balls 406 and 406 are made from ceramics, and which has construction of a metal reinforcing ring reinforcing it.

Although a type of ceramics which forms a rolling element is not limited particularly, silicon nitride-, silicon carbide-, alumina-, aluminum nitride-, boron carbide-, titanium boride-, boron nitride-, titanium carbide-, titanium nitride-, and partially stabilized zirconia-based ceramics, or complex ceramics made by combining two or more types of these are suitable.

In order to produce a rolling element made by ceramics, an ambient atmosphere sintering method or an atmospheric sintering process is performed. First of all, ceramic powder and a sintering additive are ground, for example, into mean particle diameter of 1.0 micrometer or less and are mixed, an adequate solvent is added and mixed, and they are granulated into mean particle diameter of 100 to 150 μm. Here, a sintering additive is selected according to a type of ceramic powder, and for example, for silicon nitride-based ceramics, a metal oxide such as Al2O3, MgO, or CeO, or a rare earth oxide such as Y2O3, Yb2O3, or La2O3 can be added as a sintering additive with making 20 wt % to a whole sintered compact as a upper limit. Subsequently, a mold is filled with the obtained granulation powder, a compact is made by pressing, and sintering process is performed after degreasing. Sintering is performed at 1450 to 1700° C. for about 0.5 to 5 hours in a nitrogen gas atmosphere at below 10 atmospheres in an atmosphere pressure sintering method, or in a nitrogen gas atmosphere at below an atmospheric pressure in an atmospheric pressure sintering process. Then, an obtained sintered compact is given barrel finishing and the like with its form being shaped and its being given mirror finishing.

In addition, there is no restriction also in a resin material which forms the synthetic resin snap cage, and, for example, polyamide 46, polyamide 66, polyphenylene sulfide (PPS), polytetra fluoroethylene (PTFE), polyether ether ketone (PEEK), and the like can be used. Furthermore, a resin composite containing a reinforcing fiber made by making reinforcing fibers such as a glass fiber and a carbon fiber contained into these resin materials to the extent of about 10 to 40 wt % is also preferable.

In the present invention, the synthetic resin snap cage is reinforced by bonding a circular metal reinforcing ring in its bottom face, or embedding it inside to prevent the main part 409 from deforming by a centrifugal force at the time of high speed rotation. As a material of the reinforcing ring, carbon steel (SPCC), stainless steel, iron, an aluminum alloy, and the like are suitable. Then, by insert-molding the above-mentioned resin material or a resin composite containing a reinforcing fiber with using this reinforcing ring as a core, or bonding a reinforcing ring on a bottom face of a main part using an adequate adhesive, it is possible to obtain the synthetic resin snap cage where the reinforcing ring is united. Specific examples of the synthetic resin snap cage reinforced with such a reinforcing ring will be exemplified hereinafter.

In a synthetic resin snap cage 407a illustrated in FIG. 51, a reinforcing ring 412 is made of a circular metal plate, and a plurality of round openings 413 and 413 are formed in the same pitch as pockets 408 and 408 circumferentially. Then, the reinforcing ring 412 is bonded to a bottom face of the main part 409 in one piece by using this reinforcing ring 412 as a core, and insert-molding the above-mentioned synthetic resin. At this time, positioning is performed so that a round opening 413 may be positioned in a middle between adjacent pockets 408 and 408, and it is arranged in a mold. In addition, as for the round openings 413 and 413, by making a smaller diameter a side (top opening in the drawing) which contacts a bottom face of a base 409 into a small diameter, and making an opposite side thereof (bottom opening in the drawing) into a larger diameter, it is possible to prevent slip and displacement of the reinforcing ring 412.

Alternatively, the synthetic resin snap cage 407a and the reinforcing ring 412 may be produced separately, and the reinforcing ring 412 may be bonded to the bottom face of the synthetic resin snap cage 407a using an adequate adhesive. In addition, a convex portion with the same shape as the round opening 413 of the reinforcing ring 412 is defined in the bottom face of the synthetic resin snap cage 407a.

In addition, a synthetic resin cage 407b illustrated in FIGS. 52 to 56 may be employed. In the synthetic resin cage 407b illustrated, the reinforcing ring 412a comprises: a circular flat plate part 414; an inside diameter side bent portion 415; and an outer diameter side bent portion 416. The bent portions are manufactured by bending both the inner and outer peripheries of the flat plate part 414 toward the main part (upper part in the drawing) of the cage. In addition, the width of the flat plate part 414 and bending angles of the inside diameter side bent portion 415 and the outer diameter side bent portion 416 are suitably set according to thickness of the main part 409 so as not to protrude from the main part 409. Furthermore, in two or more circumferential locations of the flat plate part 414, long openings 417 and 417 which extend in the circumferential direction and round openings 418 and 418 are alternately arranged in the circumferential direction at the same pitch as the pockets 408 and 408.

Furthermore, lightening recessed portions 421 and 421 which continue from each long opening 417 of the reinforcing ring 412a are formed inside intermediate portions 419 and 419 between adjacent pockets 408 and 408 of the main part 409. These lightening recessed portions 421 and 421 taper for their circumferential length as they go toward an elastic piece from a long opening side, and they present a form of an approximately crest shape whose inclined planes are faces facing the concave surface portions 411 of the pockets 408 and 408.

In order to produce such the synthetic resin snap cage 407b, similarly, insert molding of the above-mentioned synthetic resin is performed with using the reinforcing ring 412a as a core. Thereby, the reinforcing ring 412a is embedded in the bottom of the main part 409. At this time, the reinforcing ring 412a is positioned so that the long openings 417 and 417 may be positioned in intermediate portions between the pockets 408 and 408 of the main part 409, and is arranged in a mold. In addition, core protrusions corresponding to forms of the lightening recessed portions 421 and 421 are inserted into the long openings 417 and 417 of the reinforcing ring 412a.

In injection molding of a resin, it is known that, when a portion with large thickness exists in a molded product to be obtained, shrinkage due to temperature drop after the injection molding becomes large in this portion, a concavity called a "sink mark" arises, and deformation around it is induced, and in the case of a synthetic resin snap cage, a friction condition between a pocket inner surface and a surface of a rolling body becomes bad. On the contrary, by forming the lightening recessed portions 421 and 421, thickness becomes thin and it is possible to prevent the "sink mark" from arising.

In addition, the round openings 418 and 418 are located in a thinnest portion 422 in an axial direction of the main part 409 directly under deepest portions of the pockets 408 and 408. For this reason, since the above-mentioned synthetic resin easily and fully flows also into this thinnest portion 422 through the round openings 418 and 418, it is possible to prevent a defect from arising.

The synthetic resin snap cage 407b comprising such the reinforcing ring 412a has higher rigidity by both the bent portions 415 and 416 of the reinforcing ring 412a in comparison with the reinforcing ring 412a which is a flat plate and is illustrated in FIG. 51. Hence, when comparing them in the same rigidity, it is possible to thin plate thickness of the reinforcing ring 412a, and to achieve miniaturization and weight reduction of the synthetic resin snap cage 407b. In addition, since the reinforcing ring 412a is embedded, it is possible to arrange it closely to the seal 420, and to perform miniaturization and weight reduction also as the whole rolling bearing. Furthermore, since the reinforcing ring 412a is embedded, it is not separated from the main part 409.

Furthermore, in the rolling bearing in accordance with the present invention, a lubricant can be filled into, for example, a bearing space, formed with an inner ring, an outer ring, and a rolling element, for lubrication. There is no restriction in a lubricant, but all of publicly-known lubricating oil and grease can be used.

Examples

The present invention will be further described below with using examples and comparative examples.

Example 21 and Comparative Examples 21 and 22

As a 50-mm-inside diameter×90-mm-outer diameter×20-mm-width deep groove ball bearing with a non-contact rubber seal was prepared and as shown in Table 4, test bearings were produced with changing rolling elements and cages. In addition, as illustrated in FIG. 52, a synthetic resin snap cage with a reinforcing ring used in a test bearing of Example 21 has long openings and round openings formed in a flat plate part, and embeds a reinforcing ring which has bent portions, and further has lightening recessed portions formed in a main part. In addition, grease whose quantity becomes 20% of a bearing space volume, the grease which is made by using ester oil, whose kinematic viscosity in 40° C. was 20 mm2/s, as a base oil and using a urea compound as a putting agent was enclosed into every test bearing.

Then, each test bearing was continuously rotated under the following conditions for 2 hours, and a temperature rise value at that time was measured. In addition, an amount of iron powder (an amount of iron worn powder) mixed in enclosed grease by wear following rotation was measured. Results are put down in Table 4.

Inner ring rotational speed: 18000 min-1 (dmn value: 1,260,000)
Ambient temperature: Room temperature
Axial load: 980 N

TABLE 4

|  | Example 21 | Comparative example 21 | Comparative example 22 |
|---|---|---|---|
| Type of cage | Synthetic resin snap cage | Synthetic resin snap cage | Waveform pressed cage |
| Material of cage | Polyamide 46 | Polyamide 46 | SPCC |
| Presence of reinforcing ring | Yes | No | No |
| Material of reinforcing ring | SPCC | — | — |
| Material of inner and outer rings | SUJ2 | SUJ2 | SUJ2 |
| Material of rolling element | Si3N4 | SUJ2 | SUJ2 |
| Temperature rise value (° C.) | 50 | 90 | 60 |
| Amount of iron worn powder (wt %) | 0.01 | 0.02 | 0.18 |

As shown in Table 4, in Example 21 using rolling elements made from ceramics and a synthetic resin snap cage, which comprises a reinforcing ring, and in which a lightening part is formed, according to the present invention, even if a dmn value is 1,260,000 which exceeds 1,200,000, temperature rise is suppressed greatly and wear is also little. On the other hand, when using a synthetic resin snap cage, which does not have a reinforcing ring, and metal rolling elements such as Comparative example 21, heat generation due to deformation by rigidity insufficiency of a cage is large and abrasion loss also increases. In addition, when using a metal ribbon pressed cage and metal rolling elements as Comparative example 22, because of the cage restraining the rolling elements, heat generation becomes large a little, and abrasion loss increases most.

Embodiment of Fifth Invention

A fifth invention of the present application relates to improvement of a radial ball bearing which constructs a rotation support portion of various rotating equipment, such as an auxiliary machine for an automobile, and a machine tool, and a synthetic resin snap cage which constructs this radial ball bearing.

In particular, the present invention is devised with aiming at preventing a part of as cage and an inner peripheral surface of an outer ring from rubbing by suppressing deformation of the cage even when high speed driving is performed under the environment of high temperature, and making rotating equipment embedding the above-mentioned radial ball bearing operate in a stable state.

Figure 64:
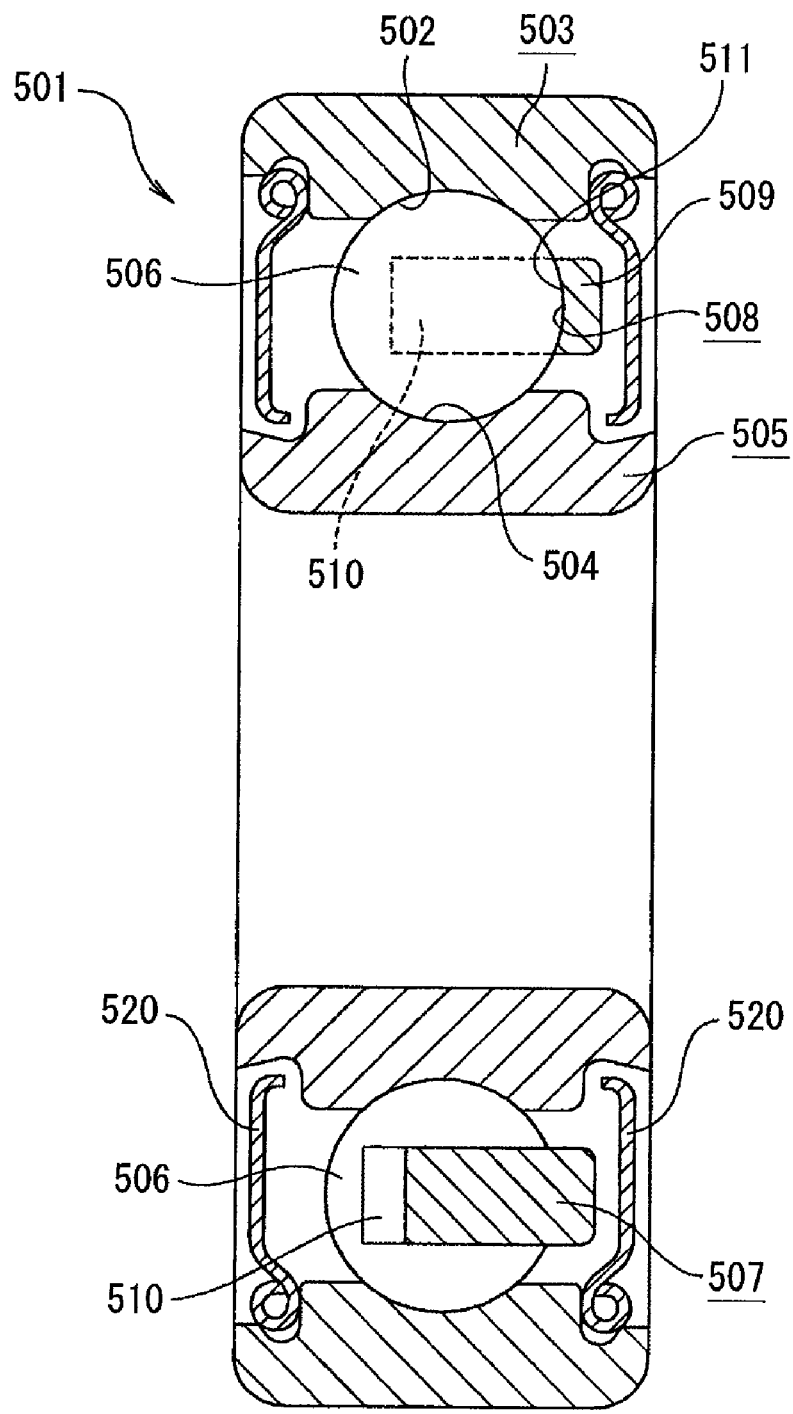
FIG. 64 is a sectional view of a radial ball bearing embedding a synthetic resin snap cage which is a subject of the present application.

As a radial ball bearing which supports each rotating part, such as a bearing of various rotating equipment as mentioned above, for example, a ball bearing 501 as illustrated in FIG. 64 is used widely. This ball bearing 501 is constructed by arranging an outer ring 503 which has an outer ring raceway 502 in an inner peripheral surface, and an inner ring 505 which has an inner ring raceway 504 in an outer peripheral surface concentrically, and providing two or more balls 506 and 506 rotatably between these outer ring raceways 502 and the inner ring raceway 504. In the case of the illustrated example, both the above-mentioned outer ring raceway 502 and the inner ring raceway 504 are made as deep groove types. Moreover, above-mentioned two or more balls 506 and 506 are held rotatably in pockets 508 provided in the cage 507.

Figure 65:
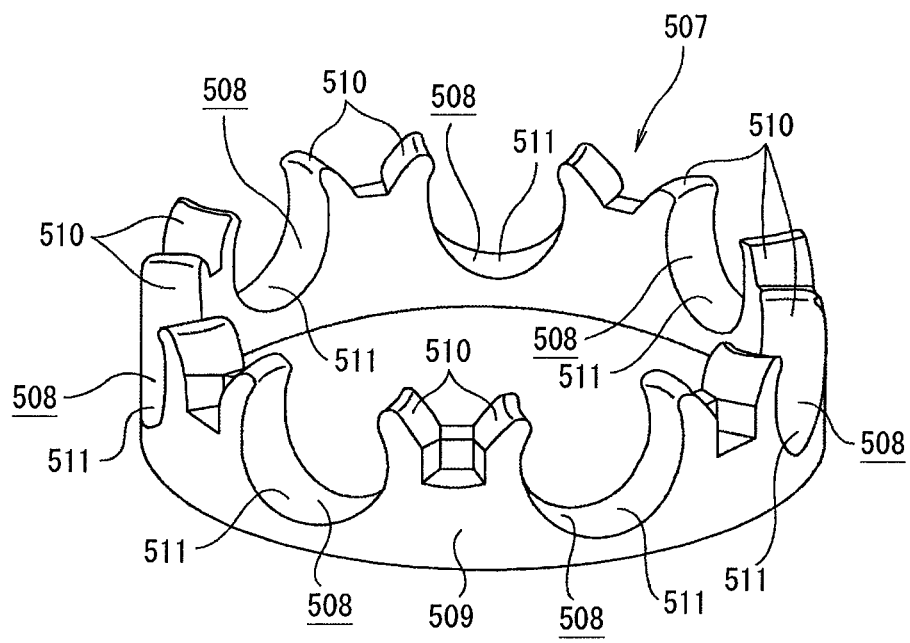
FIG. 65 is a perspective view illustrating a first example of a synthetic resin snap cage conventionally known.

This cage 507 is called a snap cage, and by injection-molding a synthetic resin, as shown in FIG. 65, the whole is made in one piece. As this synthetic resin, polyamide 66 is generally used, and polyamide 46, which is excellent in heat resistance, is used when operating temperature exceeds 160° C., in a state where reinforcing materials, such as a glass fiber, are made to be contained respectively. Polyphenylene sulfide may be used. When using any material, in the case of the above-mentioned snap cage 507, the pockets 508 and 508 which hold balls 506 and 506 (see FIG. 64) rotatably are provided circumferentially in a plurality of places of the circular main part 509.

In the case of such the snap cage 507, the above-described respective pockets 508 and 508 are constructed of one sides of a pair of elastic pieces 510 and 510 which is arranged with keeping an interval mutually in an axial one side of the above-mentioned main part 509, and spherical recessed surface portions 511 and 511 provided in a intermediate portion between this pair of elastic pieces 510 and 510 in an axial (vertical direction in FIG. 65) one side (top face of FIG. 65) of the above-mentioned main part 509. Each inner surface of these recessed surface portions 511 and 511, and each circumferential side face of the above-described elastic pieces 510 and 510 which continue these convex surface portions 511 and 511 are made into each partially spherical convex surface which is a form which can retain each of the above-mentioned balls 506 and 506 rotatably by enlarging its radius of curvature a little than a radius of curvature of a rolling contact surface of the above-mentioned ball 506, and which have a single center of curvature.

When the ball bearing 501 is assembled, while expanding resiliently the space of tip edges of the pair of elastic pieces 510 and 510 which construct each of the pockets 508 and 508, each of the above-mentioned balls 506 and 506 is pushed in between this pair of elastic pieces 510 and 510. Thus, the above-mentioned snap cage 507 holds each of the balls 506 and 506 rotatably between the above-mentioned inner ring raceway 504 and the outer ring raceway 502 (see FIG. 64) by embracing the balls 506 and 506 in the respective pockets 508 and 508.

At the time of using the ball bearing 501 comprising such the snap cage 507, relative rotation between the above-mentioned outer ring 503 and the inner ring 505 is made free in connection with a rolling motion of the above-mentioned two or more balls 506 and 506. At this time, the above-mentioned two or more balls 506 and 506 revolve around the above-mentioned inner ring 505 with rotating on its axis. In addition, the above-mentioned snap cage 507 rotates around the above-mentioned inner ring 505 at the same speed as the revolution speed of the above-mentioned balls 506 and 506.

Recently, performance of various rotating equipment embedding the ball bearing 501 has improved, and the relative rotation speed between the outer ring 503 and the inner ring 505, that is, the rotational speed of the snap cage 507 has become high. In consequence, a centrifugal force applied to the snap cage 507 has become large, and there arises a possibility that it has become impossible to disregard elastic deformation of the elastic pieces 510 and 510 which construct this cage 507. Thus, since these respective elastic pieces 510 and 510 are supported respectively by an axial one face of the circular main part 509 in a cantilever mode. In other words, each end portion of the above-described elastic pieces 510 and 510 is made as a free edge which can be displaced without being bonded with other portions.

In consequence, when rotational speed of the above-mentioned cage 507 becomes high, and hence, the above-mentioned centrifugal force becomes large, each of the above-described elastic pieces 510 and 510 perform elastic deformation in a direction in which a tip (left end in FIG. 64) is displaced outside in a radial direction. At the time of this elastic deformation, not only the respective elastic pieces 510 and 510, but also the main part 509 is elastically deformed in a twisted manner. Then, the consequence of such elastic deformation, end part outer periphery of each of the above-mentioned elastic pieces 510 and 510 interferes (rubs) with a part of an inner peripheral surface of the above-mentioned outer ring 503, not only a torque necessary for relative rotation of the above-mentioned outer ring 503 and the inner ring 505 increases, but also temperature rise, based on heat generated with operation, and abnormal noise further become remarkable, and in the extreme case, it may become also a cause of a malfunction such as seizing, or the like. In particular, in the case of the above-mentioned rotating equipment is used under the condition of high temperature such as an engine room of an automobile (e.g., an auxiliary machine, such as an AC dynamo), each of the elastic pieces 510 and 510 becomes easy to be elastically deformed, and inconvenience as mentioned above becomes remarkable.

Figure 66:
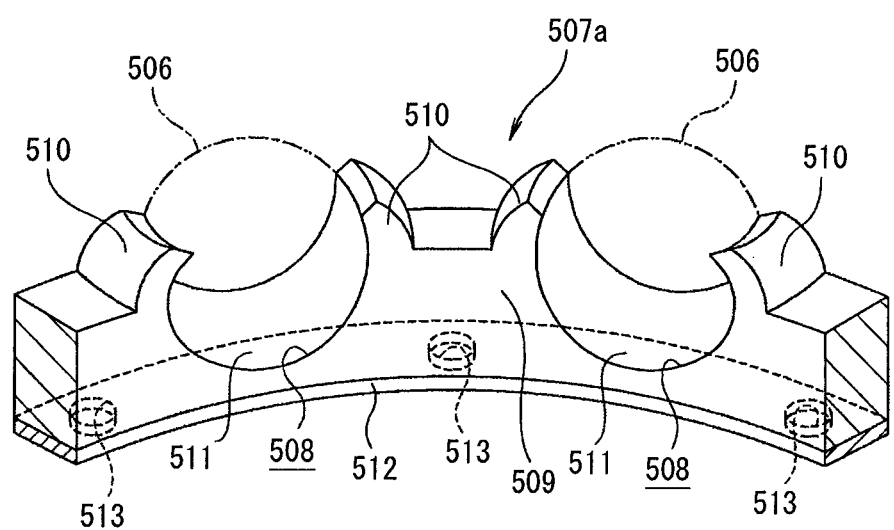
FIG. 66 is a partially perspective view illustrating a second example of a synthetic resin snap cage conventionally known.

As techniques which dissolve such inconvenience, what were described in Japanese Patent Laid-Open No. H8-145061 and Japanese Patent Laid-Open No. 2000-161365 are known. In the conventional techniques described in both of these official gazettes, as illustrated in FIG. 66, a circular metal-plate reinforcing ring 512 is fixedly connected to the main part 509 which constructs the synthetic resin snap cage 507a. Through-holes 513 and 513 are formed in a part of this reinforcing ring 512, and the above-mentioned main part 509 and the above-mentioned reinforcing ring 512 are firmly bonded with a synthetic resin which advances into the above-described respective through-holes 513 and 513 and is solidified when injection-molding the above-mentioned cage 507a. Since the torsional rigidity of the above-mentioned main part 509 is improved by presence of the above-mentioned reinforcing ring 512, it is suppressed that an end portion of each of the elastic pieces 510 and 510 is displaced outside in a radial direction because of a centrifugal force.

By adopting structure which was described in both of the above-described official gazettes, it is possible to suppress displacement outside in a radial direction of the above-mentioned elastic pieces 510 and 510 at the time of high speed driving to prevent to a certain extent each tip edges of the elastic pieces 510 and 510 and a partial inner peripheral surface of the outer ring 503 from rubbing each other. On the other hand, recently, the operating condition of the ball bearing becomes increasingly severer by the improved efficiency and miniaturization of various rotating equipment such as an auxiliary machine for a car and a machine tool. Specifically, a decrease in an installation space and an increase of a rotational speed and a temperature rise at the time of use become remarkable. Among these, the decrease in an installation space leads to a rigidity decrease following thinning of a cage, the increase of a rotational speed leads to ease of deforming following an increase of a centrifugal force, and the temperature rise leads to ease of deforming following softening of a synthetic resin.

For this reason, there arises a possibility that structure of just bonding the flat reinforcing ring 512 with the main part 509 as shown in FIG. 66 described above cannot always enhance torsional rigidity of this main part 509. For this reason, when it operates under the above-mentioned severe operating conditions, because of a large centrifugal force following high speed rotation, and softening of a synthetic resin following a temperature rise, each tip edge of the above-described elastic pieces 510 and 510 may be displaced outside radially, and this tip edge and the partial inner peripheral surface of the outer ring 503 (see FIG. 64) may rub each other.

The present invention is devised in view of such a situation so as to achieve a synthetic resin snap cage which enhances torsional rigidity of a cage more than the structure described in both of the official gazettes mentioned above, and hardly generates deformation based on a centrifugal force and vibration which are applied with operation, and a radial ball bearing embedding this cage.

A synthetic resin snap cage for a radial ball bearing of a fifth invention of the present application is made by injection-molding a synthetic resin, and comprises a circular main part, a plurality of elastic pieces, and a plurality of pockets.

Then, the above-described respective elastic pieces are formed in a state of protruding axially with keeping an interval mutually circumferentially in one axial face of the above-mentioned main part.

In addition, each of the above-mentioned pockets is a part surrounded by mutually opposite faces of a pair of elastic pieces which adjoins each other circumferentially, and a part sandwiched by these both elastic pieces in the one axial face of the above-mentioned main part, and has each inner surface which is a partially spherical convex surface The above construction is the same as that of the synthetic resin snap cage for a radial ball bearing generally known up to now.

In particular, the synthetic resin snap cage for a radial ball bearing in accordance with the present invention is constructed by embedding a reinforcing ring inside the above-mentioned main part at the time of injection molding.

Moreover, the above-mentioned reinforcing ring is a product made from a metal plate which has sufficient rigidity, such as a carbon steel plate or a stainless steel plate, and the whole shape is made in a circle (a ring shape), and its radial center portion is made into a flat plate part which exists in a direction orthogonal to an axial direction. Moreover, an inside diameter side portion is made into an inside diameter side bent portion bent toward the above-mentioned one axial face side. Furthermore, an outer diameter side portion is made into an outer diameter side bent portion bent toward the above-mentioned one axial face side.

Moreover, structure that the above-mentioned reinforcing ring is a product made from a metal plate which has sufficient rigidity, such as a carbon steel plate or a stainless steel plate, and the whole is made in a circle (a ring shape), and each communication opening may be formed in a portion aligned with each of the above-mentioned pockets with respect to an axial direction of the above-mentioned main part may be used.

In addition, it is preferable that each communication opening is formed in a portion which is a part of the reinforcing ring and which is aligned with each pocket with respect to an axial direction of the main part.

Furthermore, it is preferable that each circumferentially long opening is formed in a portion which is a part of the above-mentioned reinforcing ring and which is aligned with an intermediate portion between the pockets adjoining mutually in a circumferential direction including a base portion of each elastic piece with respect to an axial direction of the main part, and a lightening recessed portion is formed through this opening inside the above-described intermediate portion.

Furthermore, the radial ball bearing of the fifth invention of the present application comprises an outer ring having an outer ring raceway in an inner peripheral surface, an inner ring having an inner ring raceway in an outer peripheral surface, two or more balls provided rotatably between these outer ring raceway and inner ring raceway, and a cage holding these respective balls.

In particular, in the radial ball bearing of the present invention, the above synthetic resin snap cages for a radial ball bearing is used as this cage.

According to such the synthetic resin snap cage for a radial ball bearing in accordance with the present invention, it is possible to enhance the torsional rigidity of the cage more than the structure described in both the official gazettes mentioned above. Then, it is possible to achieve a synthetic resin snap cage that the deformation based on a centrifugal force, which is applied with operation, or vibration is not generated easily, and it is possible to enable the miniaturization and high speed driving of a radial ball bearing embedding this cage.

That is, in the synthetic resin snap cage for a radial ball bearing in accordance with the present invention, the reinforcing ring embedded in the main part made of a synthetic resin forms both of inside diameter side and outer diameter side bent portions in both radial sides of the flat plate part. A section modulus of the reinforcing ring (sectional shape is bent) comprising such both bent portions is larger than a section modulus of a mere tabular reinforcing ring like conventional structure illustrated in FIG. 66 mentioned above, and its torsional rigidity is large. For this reason, even if an end portion of each elastic piece softened in connection with a temperature rise is apt to be displaced outside in a radial direction and a main part is apt to be deformed in a twisted direction in connection with this, the above-mentioned reinforcing ring fully suppresses the deformation of this main part.

The bent directions of both outer diameter side and inside diameter side bent portions of the above-mentioned reinforcing ring coincide with a curving direction of an inner surface of each pocket. Hence, even if a thickness dimension of a metal plate which constructs this reinforcing ring is secured so as to secure rigidity of the above-mentioned reinforcing ring, it never occurs that a part of this reinforcing ring is exposed in a part of an inner surface of the each pocket described above, or it is exposed in a part of the axial other side face (a side face opposite to these respective pockets) of the main part. In other words, the above-mentioned reinforcing ring can be completely embedded inside the above-mentioned main part.

This is advantageous in view of aiming at rigidity improvement of the above-mentioned reinforcing ring with suppressing an increase of a thickness dimension with respect to an axial direction of this main part to prevent upsizing of a synthetic resin snap cage for a radial ball bearing. Conversely, when rigidity needed is the same, miniaturization and weight reduction of the synthetic resin snap cage for a radial ball bearing which embeds this reinforcing ring can be achieved by reduction of the thickness dimension of the metal plate which constructs this reinforcing ring. In addition, anyway, since the whole is embedded inside the above-mentioned synthetic resin main part, the above-mentioned reinforcing ring is not separated from this main part under a severe operating condition over a long period of time, and the above-mentioned operation and advantageous effect can be obtained stably over a long period of time.

In addition, when each communication opening is formed in a portion which is a part of the above-mentioned reinforcing ring and which is aligned with each pocket with respect to an axial direction of the main part, irrespective of presence of this reinforcing ring, it is possible to spread a synthetic resin uniformly over a portion where the thickness dimension with respect to an axial direction becomes the smallest within the above-mentioned main part. Then, it is possible to prevent effectively malfunctions, such as a defect, from arising in this portion.

In addition, the operation and advantageous effect by forming the above-mentioned through-holes can be obtained not only when it is performed by combining the present invention, but also when it is performed separately from the present invention (with a tabular reinforcing ring).

Furthermore, each circumferentially long opening is formed in a portion which is a part of the above-mentioned reinforcing ring, and which is aligned with an intermediate portion between the pockets adjoining mutually in a circumferential direction including a base portion of each elastic piece with respect to the axial direction of the main part, and when forming a lightening recessed portion inside the above-described intermediate portion through this opening, it is possible to prevent effectively a malfunction, called a sink mark, from arising in this intermediate portion. Thus, as widely known in a field of injection molding of a synthetic resin, when a portion where a thickness becomes large exists in a product obtained by injection-molding a synthetic resin, shrinkage based on a temperature drop after the injection molding becomes remarkable in the portion concerned, and a concavity called a sink mark is generated.

The sink mark which generates such a concavity becomes a cause of distorting a form of not only the portion concerned but also an adjacent part, and when it is caused in a synthetic resin snap cage for a radial ball bearing, it becomes a cause that a friction state between an inner surface of each of the above-described pockets and a rolling contact surface of the ball becomes defective. On the other hand, when forming the above lightening recessed portions, a thickness of the above-described intermediate portion is suppressed thinly, it is possible to prevent the above sink marks from arising, and to keep a friction state between the inner surface of each of the respective pockets and the rolling contact surface of the ball favorably.

Hereafter, a fifth invention of the present application will be described in detail with referring to drawings.

FIGS. 59 to 63 illustrate one example of an embodiment of the present invention. In addition, a characteristic of the present invention is the structure for preventing peripheral side faces of a plurality of elastic pieces 510 and 510, which constructs a cage 507*b*, and a part of inner peripheral surface of the above-mentioned outer ring 503 from interfering also in the case of performing relative rotation between the outer ring 503 and the inner ring 505 (see FIG. 64) which construct the ball bearing 501 at high speed. Since the construction and the operation of other portions are the same as those of a case of conventional structure illustrated in FIGS. 64 to 66 mentioned above, descriptions with respect to equivalent portions will be omitted or simplified, and hereafter, characteristic portions of the present invention will be described centrally.

In this example, a metal reinforcing ring 512a, such as a carbon steel plate (e.g., SPCC), a stainless steel plate which are metal-plate reinforcing materials more highly rigid than a synthetic resin, is embedded and supported over all the circumference in the main part 509 which constructs a cage 507b. This reinforcing ring 512a is formed circularly as a whole, and its sectional shape is made into a crest shape. That is, a radially center portion of this reinforcing ring 512a is made into a flat plate part 514 which exists in a direction which is orthogonal to an axial direction.

Moreover, the inside diameter side portion is made into an inside diameter side bent portion 515 bent toward one axial face side of the above-mentioned main part 509, that is, a side, in each of which of the pockets 508 and 508 exists, in a state of being embedded inside this main part 509. Furthermore, an outer diameter side portion is made into an outer diameter side bent portion 516 bent toward the above-mentioned one axial face side. Furthermore, long through holes 517 and 517 extending in a circumferential direction and round through-holes 518 and 518 are alternately defined in the circumferential direction at the same pitch as the pockets 508 and 508, in plural circumferential locations of the above-mentioned flat plate part 514.

When the above-mentioned reinforcing rings 512a is embedded and supported (inserted) inside the above-mentioned main part 509 at the time of injection-molding the above-mentioned cage 507b. For this reason, the above-mentioned reinforcing ring 512a is set in a predetermined position in a cavity of a mold for injection molding at the time of this injection molding. This predetermined position is a position where the above-mentioned main part 509 should be formed with respect to an axial direction, and is a position where the above-described respective holes 517 and 517 are aligned with intermediate portions 519 and 519 between the pockets 508 and 508 adjacently arranged in a circumferential direction, including base portions of respective elastic pieces 510 and 510, and the above-described respective through-holes 518 and 518 are aligned with portions which match the above-described respective pockets 508 and 508 and an axial thickness dimension of the above-mentioned main part 509 becomes the smallest, with respect to a circumferential direction. Furthermore, at the time of injection molding, a core protrusion protruded into the above-mentioned cavity from any mold is inserted into the above-described respective holes 517 and 517.

As mentioned above, when sending a melted synthetic resin in this cavity in a state of setting the above-mentioned reinforcing ring 512a in the above-mentioned cavity, the above-mentioned reinforcing ring 512a is embedded in the above-mentioned main part 509 which constructs this cage 507b at the same time when the above-mentioned cage 507b is injection-molded. Moreover, lightening recessed portions 521 and 521 (based on the above-mentioned core protrusion) are formed in portions which match the above-described respective holes 517 and 517 in the above-described respective intermediate portions 519 and 519. The cage 507b obtained in this way is took out from the mold after cooling solidification of the above-mentioned synthetic resin, and after that, it is embedded into a radial ball bearing as illustrated in FIG. 64 mentioned above.

A section modulus of the above-mentioned reinforcing ring 512a embedded in the synthetic resin main part 509 which constructs the cage 507b of the above-mentioned present example is large in connection with a bent sectional shape, and its torsional rigidity is large. For this reason, even if end portions of the above-described respective elastic pieces 510 and 510 softened in connection with a temperature rise are apt to be displaced outside in a radial direction due to a centrifugal force applied in connection with high speed driving and the above-mentioned main part 509 is apt to be deformed in a twisted direction in connection with this, the above-mentioned reinforcing ring 512a fully suppresses the deformation of this main part 509. For this reason, it is possible to prevent tip edges of the above-described respective elastic pieces 510 and 510 from rubbing against a partial inner peripheral surface of the above-mentioned outer ring 503.

In consequence, it is possible to prevent a torque, needed for relative rotation between this outer ring 503 and the above-mentioned inner ring 505, from increasing, or a temperature rise, based on heat generated with operation, and abnormal noise from becoming remarkable. Simultaneously, even when the above-mentioned main part 509 and a seal ring 520 (see FIG. 64) are closely arranged, it is possible to prevent an axial other side face of this main part 509 from rubbing against an internal surface of this seal ring 520. Hence, it becomes easy to achieve miniaturization and weight reduction by close arrangement of the above-mentioned main part 509 and the seal ring 520.

The bent directions of both outer diameter side and inside diameter side bent portions of the above-mentioned reinforcing ring 512a coincide with curving directions of inner surfaces of the above-mentioned respective pockets 508 and 508. Hence, when restricting properly bent angles of both the above-mentioned bent portions 515 and 516 to the above-mentioned flat plate part 514, even if a thickness dimension of a metal plate which constructs this reinforcing ring 512a is secured (even if it is thickened) so as to secure rigidity of the above-mentioned reinforcing ring 512a, a part of this reinforcing ring 512a is not exposed in parts of inner surfaces of the above-described respective pockets 508 and 508, or it is not exposed in parts of axial other side faces (opposite side faces of these respective pockets 508 and 508) of the above-mentioned main part 509. In other words, the above-mentioned reinforcing ring 512a can be completely embedded inside the above-mentioned main part 509 substantially (except peripheral portions of the above-described respective holes 517 and 517 parts of which are exposed in order to insert the above-mentioned core protrusion).

This is advantageous in view of aiming at rigidity improvement of the above-mentioned reinforcing ring 512a with suppressing an increase of a thickness dimension with respect to an axial direction of the above-mentioned main part 509 to prevent upsizing of the above-mentioned cage 507b. Conversely, when rigidity needed is the same, miniaturization and weight reduction of the above-mentioned cage 507b which embeds this reinforcing ring 512a can be achieved by reduction of the thickness dimension of the metal plate which constructs this reinforcing ring 512a. In addition, anyway, since the whole is embedded substantially inside the above-mentioned synthetic resin main part 509, the above-mentioned reinforcing ring 512a is not separated from this main part 509 under a severe operating condition over a long period of time, and the above-mentioned operation and advantageous effect can be obtained stably over a long period of time.

Moreover, in this example, since the above-described respective through-holes 518 and 518 are formed in portions which are parts of the above-mentioned reinforcing rings 512a and match the above-described respective pockets 508 and 508 with respect to an axial direction of the above-mentioned main part 509, irrespective of presence of the above-mentioned reinforcing ring 512a, it is possible to spread a synthetic resin uniformly over a portion 522 where the thickness dimension with respect to an axial direction becomes the smallest within the above-mentioned main part 509. Then, it is possible to prevent effectively malfunctions, such as a defect, from arising in this portion. That is, in the above-mentioned portion 522, since the above-mentioned reinforcing ring 512a is installed in a place where a thickness dimension is small from the first, it becomes difficult for a synthetic resin to spread as it is.

On the other hand, in this example, a synthetic resin circulates between both faces of the above-mentioned reinforcing ring 512a in the above-mentioned portion 522 by forming the above-described respective through-holes 518 and 518. Hence, since the synthetic resin which flows at least through one side of both the sides of this reinforcing ring 512a flows also into another through the above-described respective through-holes 518 and 518, it is possible to spread the synthetic resin over the above-mentioned portion 522 uniformly.

Furthermore, in this example, since the lightening recessed portions are formed inside these respective intermediate portions 519 and 519 through the holes 517 and 517 formed in the portions which are parts of the above-mentioned reinforcing rings 512a and match the above-described respective intermediate portions 519 and 519, it is possible to prevent effectively a malfunction, called a sink mark, from arising in these intermediate portions 519 and 519. That is, since the above-described respective lightening recessed portions 521 and 521 are formed and the thickness of the above-described respective intermediate portions 519 and 519 is suppressed small, it is possible to prevent the above-mentioned sink mark from arising, to suppress strain of a form based on the shrinkage opening, and to keep favorably a friction state between the inner surface of the above-described respective pockets 508 and 508 and the rolling contact surface of the ball.

Embodiment of Sixth Invention

A sixth invention of the present application relates to a synthetic resin cage and a rolling bearing which can suppress a running torque variation, an increase of torque, and heat generation of the bearing, and can reduce wear of the cage by suppressing deformation of the cage.

Figure 69:
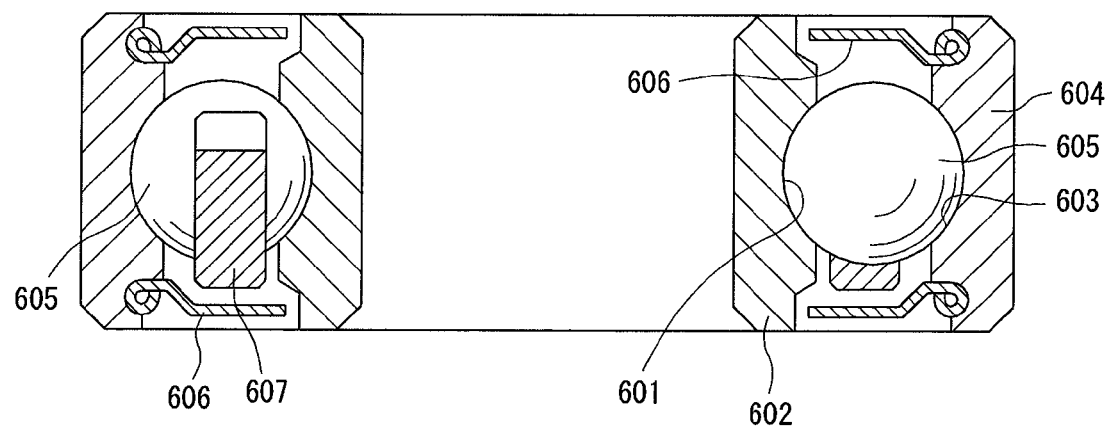
FIG. 69 is a sectional view of a rolling bearing according to a conventional example.

As illustrated in FIG. 69, a rolling bearing is generally constructed of an inner ring 602, an outer ring 604, a rolling element 605 which intervenes between the inner ring 602 and the outer ring 604, a cage 607 retaining a plurality of rolling elements 605, and a shield 606 which seals a lubricant within the bearing. In addition, reference numeral 601 denotes an inner ring raceway, and reference numeral 603 denotes an outer ring raceway.

Figure 70:
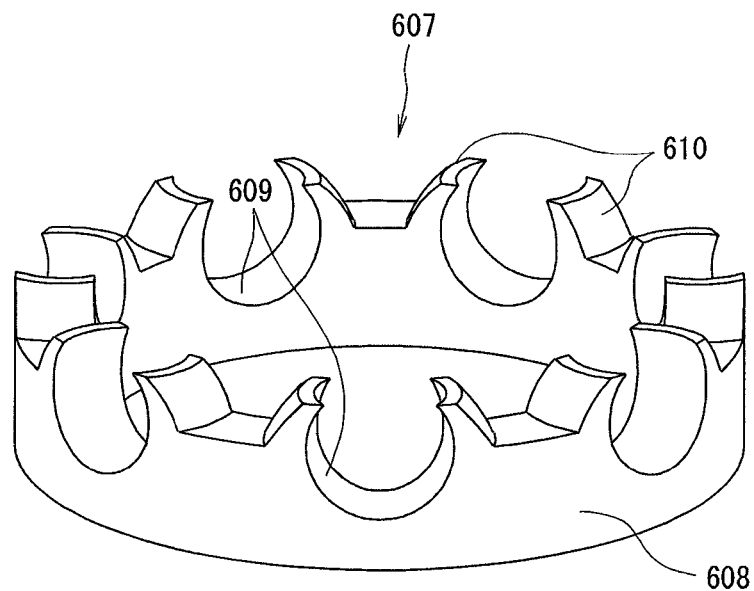
FIG. 70 is a perspective view of the synthetic resin snap cage which is mounted in the rolling bearing illustrated in FIG. 69.

As the cage 607, a snap cage 607 as illustrated in FIG. 70 is used abundantly, and this snap cage 607 is constructed of a circular base 608 and a plurality of pockets 609 arranged in equal intervals in a circumferential direction of this base 608. In addition, reference numeral 610 denotes an elastic piece which constructs a pocket 609, as mentioned later.

As a material of a cage 607, a synthetic resin is used in many cases for weight saving, and as a specific example, Nylon 46, Nylon 66, Nylon 9T, polyphenylele sulfide, and the like are cited as disclosed also in Japanese Patent Laid-Open No. 2002-122148.

In addition, in order to improve rigidity of the above-mentioned synthetic resin in high temperature, reinforcing fibers and reinforcing particles, such as a glass fiber, a carbon fiber, a silica particle, and a potassium titanate whisker are mixedly used by 10 to 40 wt % in many cases.

A rolling bearing using a synthetic resin snap cage may be embedded into, for example, a rotation support portion of an AC dynamo and may be used at high temperature and high speed (not less than 130° C., DmN>=600,000). Complicated forces including a centrifugal force oriented outside in a radial direction is applied to the cage 607 under such operating conditions. In particular, in the case of a conventional synthetic resin snap cage made only from a material made by reinforcing Nylon 46 and Nylon 66 with a glass fiber or a carbon fiber, since the cage 607 is deformed by an external force including a centrifugal force, a running torque of the bearing may vary, or heat generation may arise and it may rub against the outer ring 604 or seal 606 to wear out.

Figure 71:
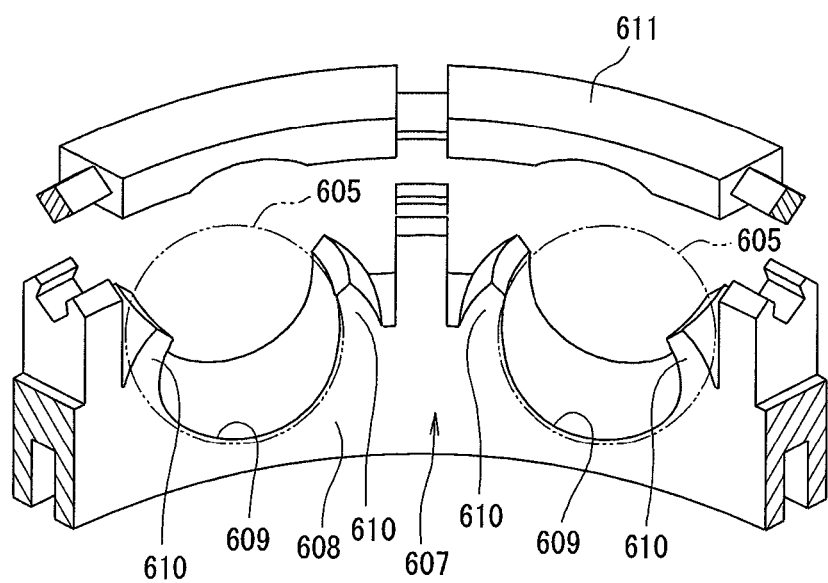
FIG. 71 is a partially exploded perspective view of a synthetic resin snap cage according to another conventional example.

In order to solve the above-mentioned tasks, for example, a synthetic resin snap cage 607 described in FIG. 71 is disclosed in Japanese Utility Model Laid-Open H6-1845. This cage 607 has a connected ring 611, and this connects freely end portions of each elastic piece 610 constructing a pocket 609.

Also when being used at high speed, this cage 607 suppresses displacement of an end portion of the elastic piece 610 by centrifugal force outside in a radial direction, and prevents an end portion outer peripheral surface of the elastic piece 610 and an outer ring raceway surface 603 from rubbing.

Figure 72:
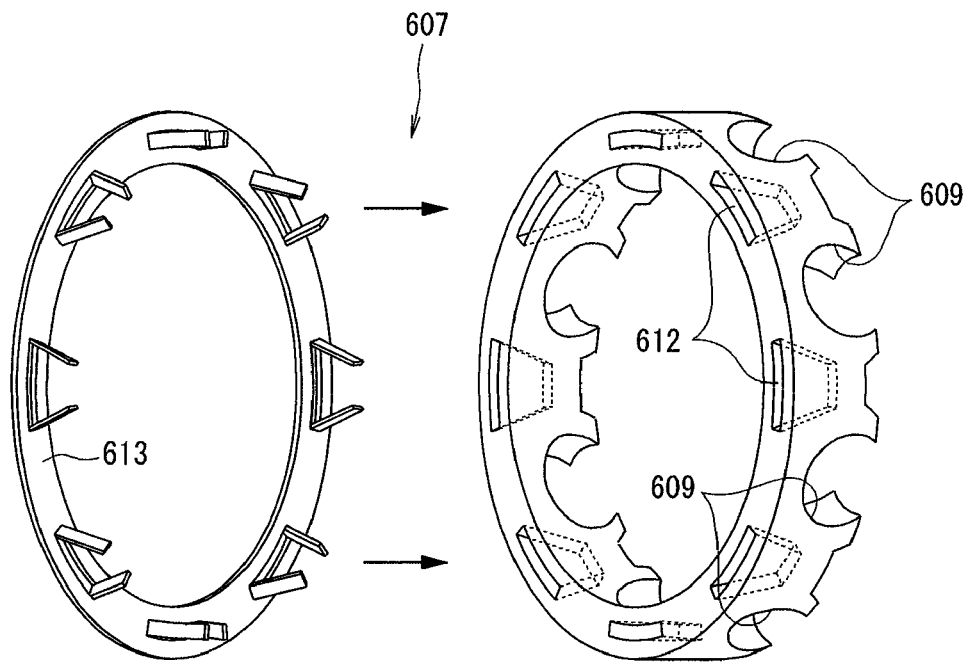
FIG. 72 is a partially exploded perspective view of a synthetic resin snap cage according to still another conventional example.
Figure 73:
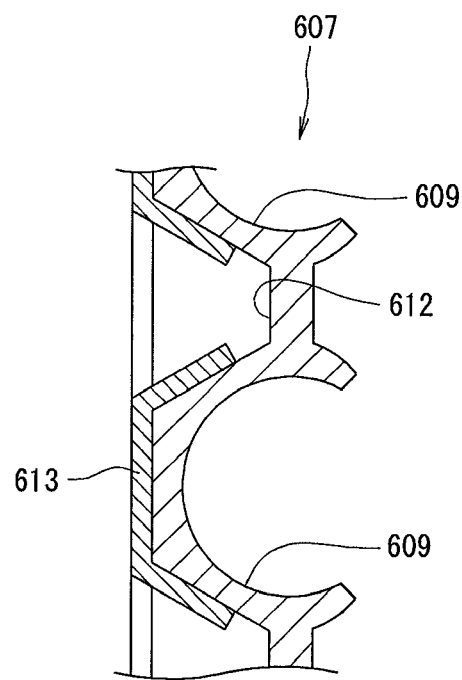
FIG. 73 is a partially enlarged sectional view of the synthetic resin snap cage illustrated in FIG. 72.

In addition, a synthetic resin snap cage 607 described in FIGS. 72 and 73 is disclosed in Japanese Utility Model Laid-Open H6-8821. This cage 607 not only aims at weight saving by forming a recessed portion 612 in an intermediate portion between adjacent pockets 609, but also aiming at prevention of the above-mentioned pocket 609 from deformation with a metal reinforcing plate 613.

In the case of the structure illustrated in FIG. 71 mentioned above, although it is possible to prevent an end portion of each of the above-described elastic pieces 610 from deforming outside in a radial direction, since the structure of the cage 607 is complicated, manufacturing cost is expensive and assembly operation also becomes troublesome.

In addition, in the case of the structure illustrated in FIGS. 72 and 73, a form of the reinforcing plate 613 is complicated, which leads to a cost hike in a similar manner. In addition, since using a metal plate as the reinforcing plate 613, it leads to an increase of weight of the cage. Furthermore, since the above-mentioned reinforcing plate 613 is locked to a base 608 only by elasticity of an elastic claw formed in this reinforcing plate 613, it is easy for the reinforcing plate 613 to separate from the base 608, and a reinforcing operation by this reinforcing plate 613 is weak.

The present invention has been made in view of a situation which is mentioned above and aims at providing a synthetic resin cage and a rolling bearing which can suppress deformation of a pocket, can prevent wear of the cage, and can be manufactured easily and can achieve weight saving.

In order to achieve the above-mentioned object, a synthetic resin cage according to a sixth invention of the present application comprises a synthetic resin circular base and two or more sets of pockets provided in an axial one side of the base concerned, and is a synthetic resin cage in each of which pocket retains rotatably each one rolling element between a pair of elastic pieces which is formed integrally with the above-mentioned base and is arranged with keeping intervals mutually over a circumferential direction, characterized by providing a reinforcing member molded circularly and made of a synthetic resin with a modulus of elasticity larger than the above-mentioned synthetic resin inseparably over whole circumference of the above-mentioned base by inserting it at the time of injection molding of the above-mentioned base and elastic pieces.

Preferably, the above-mentioned reinforcing member is formed tabularly in and is attached to an axial other face of the above-mentioned base inseparably over the whole circumference of the above-mentioned base. In addition, preferably, as to the contained amount of a reinforcing fiber and a reinforcing particle, the contained amount in the base plus the contained amount in the elastic pieces is smaller than the contained amount in the reinforcing member.

Furthermore, in the rolling bearing according to the sixth invention of the present application, the above synthetic resin cage is embedded.

According to the present invention, it is possible to suppress deformation of a cage to suppress a running torque variation and an increase of a torque of a bearing torque, and heat generation, to reduce wear of the cage, to perform manufacturing easily, and to achieve weight saving.

Hereafter, synthetic resin cages and rolling bearings according to embodiments of the sixth invention of the present application will be described with referring to drawings.

First Embodiment

FIG. 67 is a partial perspective view of a synthetic resin snap cage according to a first embodiment of the sixth invention of the present application.

A cage 620 comprises a synthetic resin circular base 608 and two or more sets of pockets 609 provided in an axial one side (upper face in FIG. 67) of this base 608.

These pockets 609 each retains rotatably one rolling element 605 between a pair of elastic pieces 610 formed integrally with the above-mentioned base 608 and arranged at intervals with each other over a circumferential direction.

Now, in this embodiment, a reinforcing member 621 molded into a circularly flat plate made of a synthetic resin material with a modulus of elasticity larger than the above-mentioned synthetic resin in an axial other face (lower face in FIG. 67) of the above-mentioned base 608 inseparably over whole circumference of the above-mentioned base 608 is provided by inserting it at the time of injection molding of the above-mentioned base 608 and elastic pieces 610.

In addition, Nylon 46 or Nylon 66 containing 20 or more wt % of glass fiber or carbon fiber is preferably used as two kinds of above-mentioned synthetic resins as what constructs the base 608 and the elastic piece 610 of the cage 620.

In addition, as what constructs the flat plate made from a highly rigid resin (reinforcing member 621), polyphenylene sulfide (PPS) or polyamideimide (PAI), given suitable heat treatment, which contain 20 or more wt % of glass fiber or carbon fiber is used.

It is desirable that upper limits of content of all are about 40 wt % similarly to Japanese Patent Laid-Open No. 2002-122148 mentioned above.

Strength and rigidity of the synthetic resin materials are set as follows:
Base 608 and Elastic piece 610<Reinforcing member 621

Contents of a reinforcing fiber and a reinforcing particle are preferably set as follows:
Base 608 and Elastic piece 610<Reinforcing member 621

That is, it is possible to increase the strength and rigidity of the reinforcing member 621 by making the reinforcing member 621 (flat plate) more than the base 608 and the elastic piece 610 for the contents of reinforcing fibers, such as a glass fiber or a carbon fiber, and reinforcing particles, such as a silica particle.

In the case of the synthetic resin snap cage according to this embodiment, the rigidity of the base 608 improves by providing the reinforcing member 621 molded into the circular flat plate, which is made from a synthetic resin material, with a modulus of elasticity larger than that of the synthetic resin which constructs the base 608 in an axial other face of the base 608. In consequence, also when receiving an external force, it becomes hard to deform this base 608.

For example, when an end portion of the elastic piece 610 which constructs the each pocket 609 deforms outside in a radial direction because of a centrifugal force, the above-mentioned base 608 deforms in a torsional direction. However, the above-mentioned flat plate made of a highly rigid resin (reinforcing member 621) becomes resistance to deformation of the base 608, and prevents the deformation as a result. For this reason, since it becomes hard that the end portion of the above-mentioned elastic piece 610 is displaced outside in a radial direction, it become difficult for this end portion and the outer ring raceway 603 (see FIG. 69) of the outer ring 604 (see FIG. 69) to rub.

In addition, since the rigidity of the above-mentioned base 608 improves with the above-mentioned flat plate made of the high rigidity resin (reinforcing member 621), it is possible to lessen a thickness dimension over an axial direction of this base 608 than the conventional, and to make a distance between the axial other face of this base 608 and the shield 606 (see FIG. 69), embedded in the bearing, large. In consequence, even if a gap between the inner surface of the above-mentioned pocket 609 and the rolling contact surface of the rolling element 605 becomes large to some extent, there is no possibility that the above-mentioned axial other face and the internal surface of the above-mentioned shield 606 (see FIG. 69) rub.

Since achieving such an advantageous effect using a synthetic resin with a large modulus of elasticity, it is possible to make the synthetic resin snap cage 620 light and highly rigid and it becomes hard for each part of the synthetic resin snap cage 620 to rub against a partner face, and hence, even if using it at high temperature and a high speed, it becomes difficult to generate a seizing due to rubbing of each part.

Furthermore, since a distance between the axial other face of the above-mentioned base 608 and an internal surface of the above-mentioned shield 606 (see FIG. 69) can be enlarged, agitating resistance of the grease which exists between these both faces can be made small. In consequence, it is possible not only to achieve a decrease of a running torque of the bearing, but also to suppress a temperature rise of grease, to suppress softening of this grease, and to maintain lubrication performance by grease.

Since the synthetic resin snap cage 620 of this embodiment is constructed and acts as described above, even when high speed rotation of the bearing is performed under a high temperature, there arises no rubbing of a part of cages 620 against a partner face, and hence, it is possible to maintain bearing performance stably over a long period of time. In other words, it is hard to generate a malfunction, such as seizing, also under severe conditions, and hence, it is possible to achieve enhancement in durability and reliability of a bearing embedding the synthetic resin snap cage 620, and further, various mechanical apparatuses embedding this bearing.

Second Embodiment

FIG. 68 is a partial perspective view of a synthetic resin snap cage according to a second embodiment of the present invention.

In this embodiment, in the construction of the first embodiment mentioned above, in an axial other face (lower face in FIG. 68) side of the above-mentioned base 8, a reinforcing member 621 molded into a circularly flat plate made of a synthetic resin material with a modulus of elasticity larger than the above-mentioned synthetic resin, constructing the base 608, in an axial other face (lower face in FIG. 68) of the above-mentioned base 608 over whole circumference of the above-mentioned base 608 is embedded by inserting it at the time of injection molding of the above-mentioned base 608 and elastic pieces 610.

Other constructions and operation and effects are the same as those of the above-mentioned first embodiment.

In addition, the present invention is not limited to the above-mentioned embodiments, but various modifications are possible.

Embodiment of Seventh Invention

A seventh invention of the present application relates to a resin cage embedded into a ball bearing. In addition, the seventh invention of the present application relates to a ball bearing in which a resin cage is embedded.

As a general resin cage for a ball bearing used widely up to now, there is, for example, Japanese Patent Laid-Open No. H8-145061 illustrated in FIGS. 5 and 6. Then, it becomes frequent that a ball bearing in which such a resin cage for a ball bearing is embedded is used under severe conditions, such as a high speed and a high temperature. Nevertheless, since being constructed by a resin with insufficient rigidity, when used under high speed and high temperature conditions (e.g., dmN value: 800,000 or more, temperature: not less than 80° C.), such a resin cage for a ball bearing had a problem that deformation (e.g., deformation outside in a radial direction) might arise because of heat and a centrifugal force. In addition, since heat creep arose, there was a problem that the above-mentioned deformation became larger under a high temperature condition.

In order to solve such a problem, a resin cage comprising a metal reinforcing member is proposed (e.g., the above-mentioned official gazette and Japanese Patent Laid-Open No. H9-79265). Since rigidity of the cage is improved by the metal reinforcing member, even if used under high speed and high temperature conditions, it is rare to generate the above deformation. In addition, refers to also Japanese Patent Laid-Open No. 2002-173667 about conventional techniques.

Nevertheless, the operating condition of the ball bearing is apt to become toward further high speed and high temperature, and hence, an operating environment is apt to become further severer. Therefore, a cage that rigidity is higher and deformation does not arise easily is desired.

Then, an object of the present invention is to provide a resin cage which solves the above-mentioned issues which the conventional techniques have, and hardly causes deformation even if it is used under high speed and high temperature conditions. In addition, another object of the present invention is to provide a ball bearing which can be used suitably under high speed and high temperature conditions.

In order to solve the above-mentioned tasks, the seventh invention of the present application has the following construction. That is, the cage for a ball bearing according to the present invention is a cage for a ball bearing which is constructed of a plurality of resin pocket members, which has each pocket which is constructed of a circular blank and retains a rolling body rotatably, being connected annularly, and which is manufactured by insert molding where a reinforcing member which is made of a metal or a resin which has elastic deformation capability higher than the above-mentioned resin is made an insert, and characterized in that the above-mentioned pocket members each have a pocket bottom at an end face side in the axial direction and a pocket top portion at the other end face in an axial direction which are circumferentially divided respectively, the divided portion of the above-mentioned pocket bottom is connected with the above-mentioned reinforcing member, and the divided portion of the above-mentioned pocket top portion can be opened and closed by elastic deformation of this reinforcing member.

In addition, a cage for a ball bearing according to the present invention is a cage for a ball bearing which is constructed of a plurality of resin pocket members, which has each pocket which is constructed of a circular blank and retains a rolling element rotatably, being connected annularly, and which is manufactured by insert molding where a reinforcing member which is made of a metal or a resin which has elastic deformation capability higher than the above-mentioned resin is made an insert, and such construction that, while the plurality of above-mentioned pocket members is connected with a part of the above-mentioned reinforcing member respectively, the above-mentioned pocket members each have a pocket bottom at an end face side in the axial direction and a pocket top portion at the other end face in an axial direction which are circumferentially divided respectively, and the divided portion of the above-mentioned pocket bottom is connected with another part of the above-mentioned reinforcing member, and by the part out of the above-mentioned reinforcing member which connects the above-mentioned pocket members, and the part which connects the divided portion of the above-mentioned pocket bottom performing elastic deformation, the divided portion of the above-mentioned pocket top portion can be opened and closed may be used.

Such the cage for a ball bearing may comprise coupling means of connecting the divided portion of the above-mentioned pocket top portion in a closed state. In addition, at least a part of the above-mentioned coupling means may be constructed of the above-mentioned reinforcing member.

Furthermore, a cage for a ball bearing according to the present invention is a cage for a ball bearing which is constructed of a plurality of resin pocket members which has each pocket which is constructed of a circular blank and holds a rolling element rotatably, and which is connected annularly, the cage for a ball bearing which may have construction that the above-mentioned pocket members each have a pocket bottom at an end face side in an axial direction, which is elastically deformable, and a pocket top portion at the other end face in an axial direction which is circumferentially divided, and the divided portion of the above-mentioned pocket top portion can be opened and closed by elastic deformation of the above-mentioned pocket bottom. Such the cage for a ball bearing may comprise coupling means of connecting the divided portion of the above-mentioned pocket top portion in a closed state.

Furthermore, a ball bearing according to the present invention is a ball bearing which comprises an inner ring, an outer ring, a plurality of balls arranged rotatably between the above-mentioned inner ring and the above-mentioned outer ring, and a cage which holds the above-mentioned balls between the above-mentioned inner ring and the above-mentioned outer ring, characterized by making the above-mentioned cage into the cage for a ball bearing as mentioned above.

Since rigidity is high, even if the cage for a ball bearing in accordance with the present invention is used under high speed and high temperature conditions, deformation does not arise easily. In addition, since comprising a highly rigid cage, the ball bearing in accordance with the present invention is suitably available under high speed and high temperature conditions.

Figure 74:
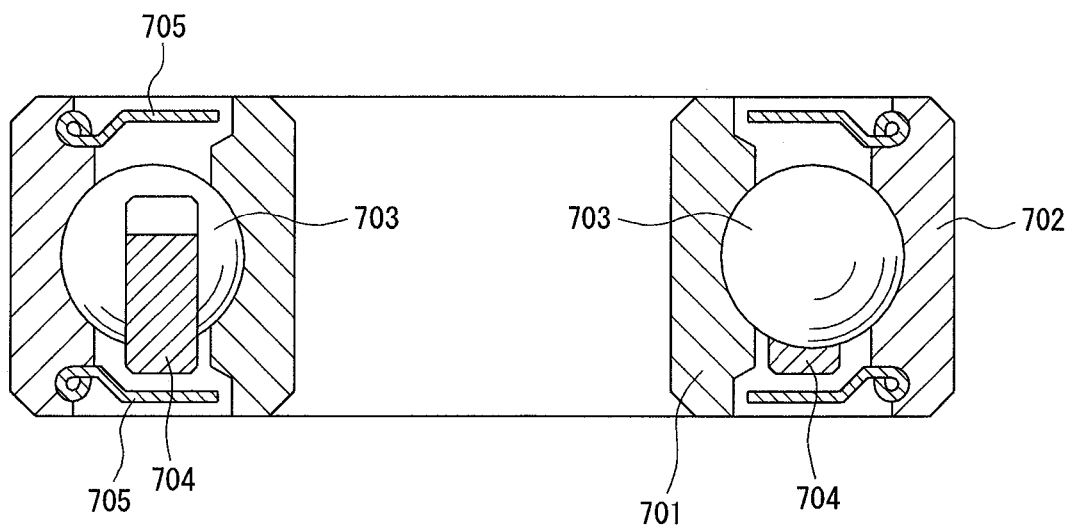
FIG. 74 is a longitudinal sectional view illustrating the structure of an embodiment of a ball bearing according to a seventh invention of the present application.

Embodiments of a cage for a ball bearing and a ball bearing according to a seventh invention of the present application will be described with reference to drawings. FIG. 74 is a vertical sectional view showing structure of the ball bearing of this embodiment. FIG. 75 is a perspective view of a cage used in this ball bearing. In addition, FIG. 76 is an exploded perspective view illustrating a pocket member and a reinforcing member, which construct the cage of FIG. 75, in an exploded manner.

The ball bearing in FIG. 74 comprises: an inner ring 701, an outer ring 702, a plurality of balls (rolling elements) 703 arranged rotatably between the inner ring 701 and outer ring 702, a cage 704 which retains two or more balls 703 between the inner ring 701 and outer ring 702, and shields 705 and 705.

In addition, a bearing space surrounded by the inner ring 701, outer ring 702, and shields 705 and 705 is filled with a lubricant (e.g., grease composition) which is not illustrated, and it is sealed by the shield 705 in the ball bearing. Then, lubrication of contact surfaces of raceway surfaces of the inner ring 701 and outer ring 702 and the ball 703 is performed by this lubricant. In addition, the shields 705 and 705 may not be provided.

Next, structure of the cage 704 will be described with reference to FIGS. 75 and 76. This cage 704 is constructed of a resin pocket member 710 (see FIG. 76(a)) which has a pocket 710a which retains rotatably the ball 703 which is a rolling element, and a circular reinforcing member 720 which is made from a metal or a resin which has elastic deformation capability higher than the above-mentioned resin which constructs the pocket member 710, and this reinforcing member 720 has a waveform that concave and convex shapes continue circumferentially by turns as illustrated (see FIG. 76(b)). Then, a plurality of pocket members 710 annularly located is formed with the reinforcing member 720 in one piece by insert molding using the reinforcing member 720 as an insert.

Although a pocket bottom portion 711 is formed at one end face in an axial direction of the cage 704 in the pocket member 710 and a pocket top portion 712 is formed in the other end face in the axial direction. The pocket member 710 is separated circumferentially in the pocket bottom portion 711 and pocket top portion 712. That is, each of the pocket members 710 is constructed of two approximately U-shaped members arranged with facing concave surfaces each other, and defines a circular opening constituting the pocket 710a with the two concave surfaces facing each other.

As for the reinforcing member 720, the whole is not surrounded by a resin (that is, the whole is not arranged inside the pocket member 710), but a part is completely exposed. That is, in the connecting portion (intermediate portion between pocket members 710) of a plurality of pocket members 710 annularly located, and the divided portions (intermediate portion between two approximately U-shaped members) of the pocket bottom portion 711 of the pocket member 710, the reinforcing member 720 is completely exposed.

Then, the reinforcing member 720 can be elastically deformed (bent) in these two exposed portions, the divided portion of the pocket top portion 712 of the pocket member 710 can be opened and closed by this elastic deformation (FIG. 77 illustrates an open state of the divided portion of the pocket top portion 712). When assembling the ball bearing, the above-mentioned exposed portion of the reinforcing member 720 is elastically deformed to make the divided portion of the pocket top portion 712 into an open state, and the ball 703 is inserted into the pocket 710a. Then, the above-mentioned exposed portion of the reinforcing member 720 is restored to an original form to make the divided portion of the pocket top portion 712 into a closed state, and the cage 704 is embedded between the inner ring 701 and outer ring 702 to complete the ball bearing.

Although heat and a centrifugal force act on the cage 704 at the time of use of the ball bearing, the divided portion of the pocket top portion 712 is maintained in a closed state because of an elastic force of the reinforcing member 720. For this reason, since rigidity of the cage 704 is improved, even if the ball bearing is used under high speed and high temperature conditions, the cage 704 hardly deforms by a rotational centrifugal force. Although the ball bearing comprising such the cage 704 can rotate stably even under a high-speed condition of 800,000 or more of dmN value depending on temperature conditions.

In addition, this embodiment illustrates an example in accordance with the present invention and the present invention is not limited to this embodiment.

For example, although the reinforcing member 720 is exposed from a resin at two locations of the connection portion between the pocket members 710, and the divided portion of the pocket bottom portion 711 in this embodiment, it is sufficient that construction of being exposed only in the divided portion of the pocket bottom portion 711 is used, and elastic deformation (bending) is possible only in the portion concerned.

In addition, when providing coupling means which connects the divided portion of the pocket top portion 712, connecting the divided portion of the pocket top portion 712 integrally in a closed state, since the rigidity of the cage 704 is further improved, it also becomes possible to use the ball bearing on a high-speed condition of 1 million or more of dmn value.

Although the coupling means is not limited particularly, for example, the coupling means 714 as illustrated in FIG. 78 is suitable. That is, it means that a convex portion 715 and a recessed portion 716 which can engage each other are provided in the portion which the divided portion of the pocket top portion 712 faces. At the time of a closed state, the convex portion 715 is inserted into the recessed portion 716, the convex portion 715 and recessed portion 716 are made to engage with elasticity of a resin, both portions which face each other are connected to be able to be integrated. In addition, so long as forms of the convex portion 715 and the recessed portion 716 to engage each other can be connected using the elasticity of a resin, they are not limited to those illustrated in FIG. 78.

Figure 79:
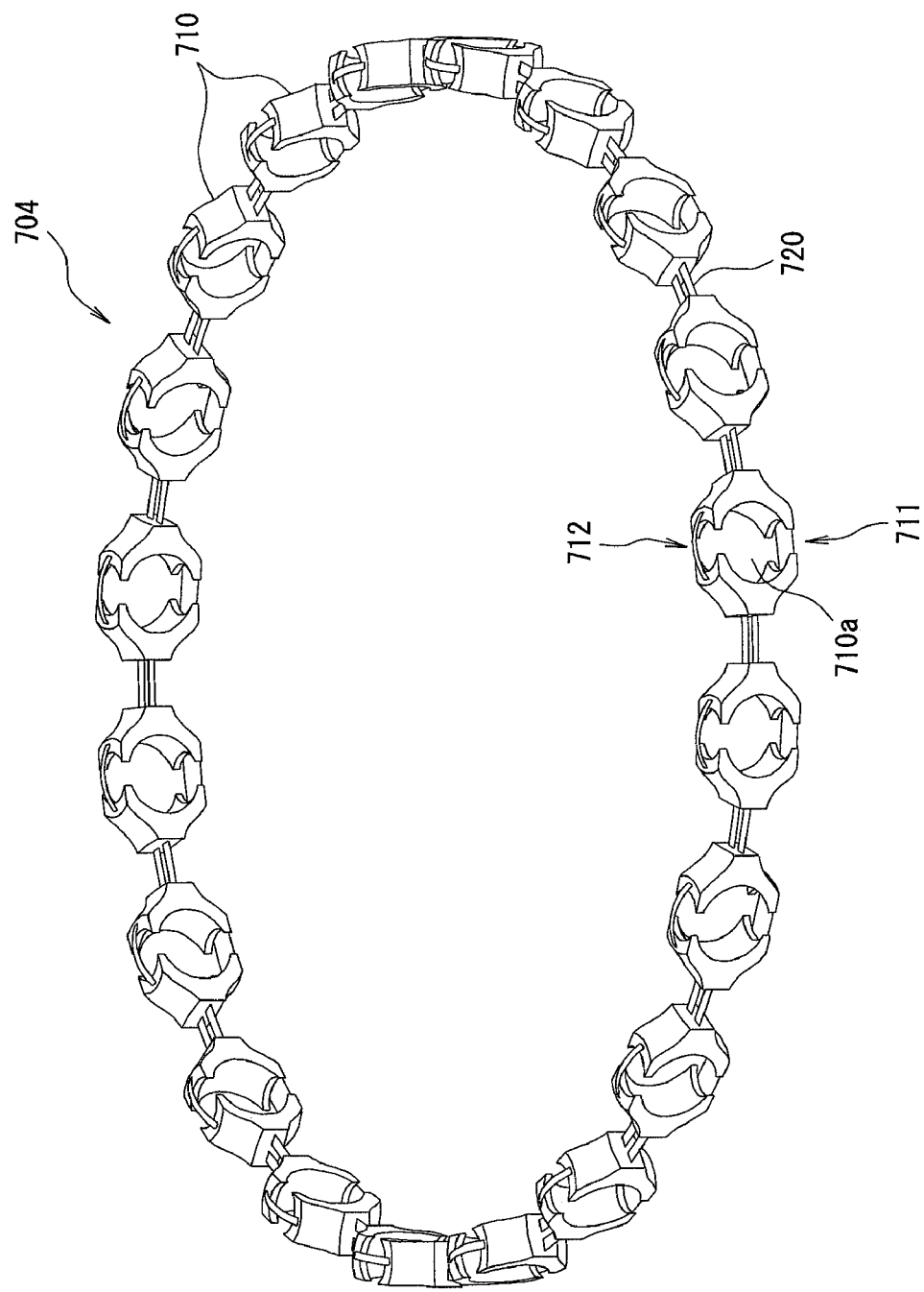
FIG. 79 is a perspective view of a cage illustrating a modified example of the reinforcing member.
Figure 80A:
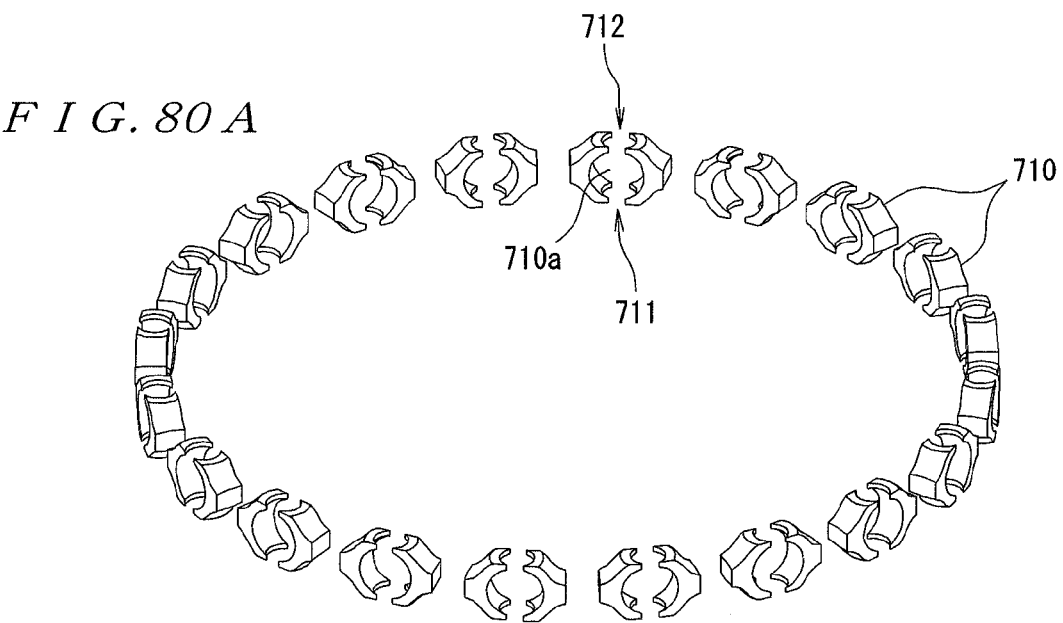
FIG. 80 is an exploded perspective view illustrating a pocket member and a reinforcing member, which construct the cage of FIG. 79, in an exploded manner.
Figure 80B:
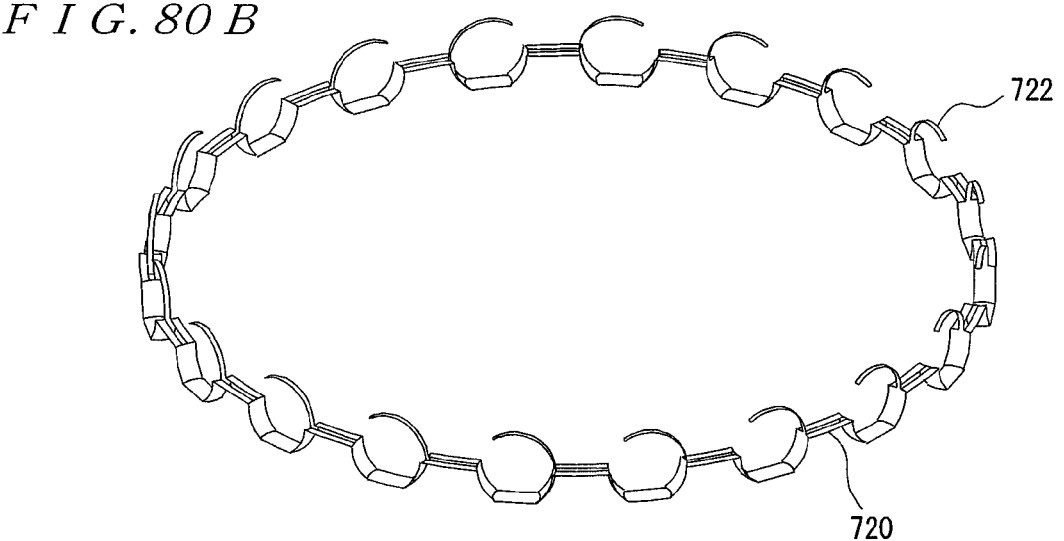

In addition, they may be connected by building a connecting member over the divided portion of the pocket top portion 712, and fixing both ends of the connecting member to both portions that face each other. Furthermore, it is also sufficient to use a part of reinforcing member 720 as coupling means. For example, it is good to make the reinforcing member 720 into a form as illustrates in FIG. 80(b). That is, when providing in the reinforcing member 720 a pocket top portion connecting portion 722 extending so as to be built over the divided portion of the pocket top portion 712 and suppressing the divided portion of the pocket top portion 712 by this pocket top portion connecting portion 722, a closed state can be maintained easier (refer to FIG. 79). Furthermore, when a tip of the pocket top portion connecting portion 722 is fixed to the portion which the divided portion of the pocket top portion 712 faces, connection of the divided portion can be strengthened further.

Furthermore, although cold rolling carbon steel and stainless steel such as SPCC are preferable as material of the reinforcing member 720, so long as heat resistance and rigidity are sufficient and elastic deformation capability is superior to a resin which constructs the pocket member 710, it is not limited to metal, but it is also possible to use a resin and a resin composite containing a fibrous filler (e.g., a glass fiber, and a carbon fiber). When such a resin and a resin composite are used, further weight saving of the cage 704 is possible.

Furthermore, although a type of a resin which constructs the pocket member 710 is not limited particularly, high-performance engineering plastics which are injection-moldable, such as a polyamide resin (e.g., polyamide 46 and polyamide 66), polyphenylene sulfide (e.g., L-PPS), and polyether ether ketone, are preferable. In addition, by adding 10 to 50 wt % of fibrous filler (e.g., a glass fiber and a carbon fiber) to such a resin, while the rigidity of the cage 704 is enhanced, dimensional accuracy can be enhanced.

Furthermore, construction of not using a reinforcing member is also adoptable. That is, a cage is made from only a resin, a pocket member has construction that a pocket bottom at an end face side in an axial direction is elastically deformable, and a pocket top portion at the other end face in an axial direction is circumferentially divided. When a pocket bottom can be elastically deformed because of its material and form, the divided portion of a pocket top portion can be open and close because of the elastic deformation of the pocket bottom.

Embodiment of Eighth Invention

An eighth invention of the present application relates to a resin snap cage embedded into a rolling bearing. In addition, the eighth invention of the present application relates to a radial ball bearing in which a resin snap cage is embedded.

As a general resin snap cage used widely up to now, there is, for example, Japanese Patent Laid-Open No. H8-145061 illustrated in FIGS. 5 and 6. Then, it becomes frequent that a rolling bearing in which such a resin snap cage is embedded is used under severe conditions, such as a high speed and a high temperature. In addition, refers to also Japanese Patent Laid-Open Nos. H9-151943, H9-79265, and 2000-323046 about conventional techniques.

When a rolling bearing in which the above conventional resin snap cage was embedded was used on a high speed rotation condition, since lubricants, such as grease and oil, scattered easily from a pocket of the cage by a centrifugal force, an amount of the lubricant retained in a rolling contact surface of a rolling element or a raceway surface of a race became insufficient, and there was a possibility that lubrication shortage might occur in the rolling bearing.

Then, an object of the present invention is to provide a resin snap cage which solves the above-mentioned issues which the conventional techniques have, and hardly makes a lubricant scatter even if it is used on a high-speed rotation condition. In addition, another object of the present invention to provide a radial ball bearing which hardly causes insufficient lubrication even if it is used on high-speed rotation condition.

In order to solve the above-mentioned tasks, the eighth invention of the present application has the following construction. That is, a resin snap cage of the present invention is a resin snap cage which comprises a resin-made circular main part, and a plurality of pockets provided at an end face in the axial direction of this circular main part, being characterized by providing a lubricant reservoir, which can accommodate a lubricant, in each inner face of the above-mentioned pockets. In this resin snap cage, it is preferable that the above-mentioned lubricant reservoir is provided near each bottom of the above-mentioned pockets. Since such construction makes it possible to hold a lubricant in the lubricant reservoir, even if used on a high speed rotation condition, a lubricant does not scatter easily.

In addition, in this resin snap cage, it is preferable to install a circular reinforcing member along the above-mentioned circular main part at the other end face in an axial direction of the above-mentioned circular main part. Furthermore, it is preferable that it is manufactured by insert molding of making the above-mentioned reinforcing member an insert, and the above-mentioned circular main part and the above-mentioned reinforcing member are made into one piece. Since reinforcement is performed by a reinforcing member in such construction, even if it is used on a high speed rotation condition, it is hard to generate deformation outside in a radial direction by a centrifugal force.

Furthermore, the radial ball bearing is a radial ball bearing which comprises an inner ring, an outer ring, a plurality of balls arranged rotatably between the above-mentioned inner ring and the above-mentioned outer ring, and a cage which holds the above-mentioned balls between the above-mentioned inner ring and the above-mentioned outer ring, being characterized by making the above-mentioned cage into the resin snap cage as described above. In such construction, since a lubricant is retained in the lubricant reservoir of the resin snap cage and the lubricant does not scatter easily even if used on a high speed rotation condition, a sufficient amount of lubricant is retained on a surface of the ball or raceway surfaces of the inner ring and outer ring, and it is hard to generate lubrication shortage in the radial ball bearing.

In this radial ball bearing, it is preferable that the above-mentioned resin snap cage is a cage with a ball guide system.

Since the resin snap cage in accordance with the present invention makes a lubricant retained in the lubricant reservoir, even if used on a high speed rotation condition, the lubricant does not scatter easily. In addition, in the radial ball bearing in accordance with the present invention, since a lubricant is retained in the lubricant reservoir of the resin snap cage and the lubricant does not scatter easily even if used on a high speed rotation condition, lubrication shortage does not arise easily.

Figure 81:
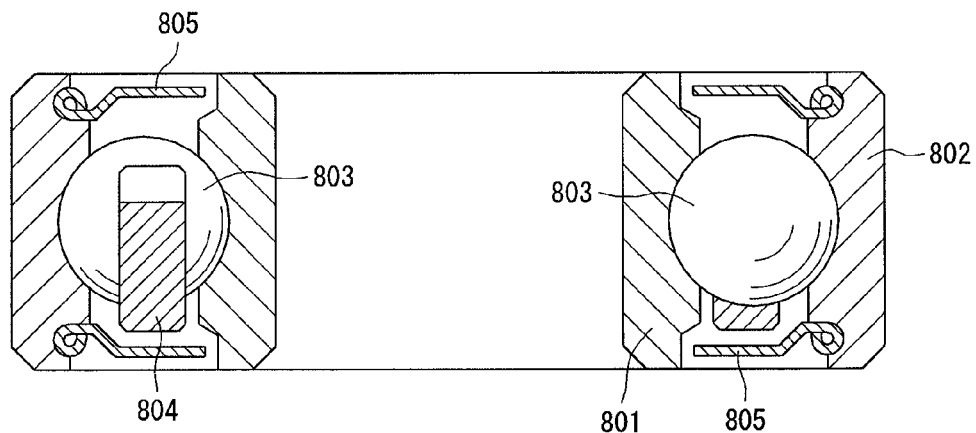
FIG. 81 is a longitudinal sectional view illustrating the structure of an embodiment of a radial ball bearing according to an eighth invention of the present application.
Figure 82:
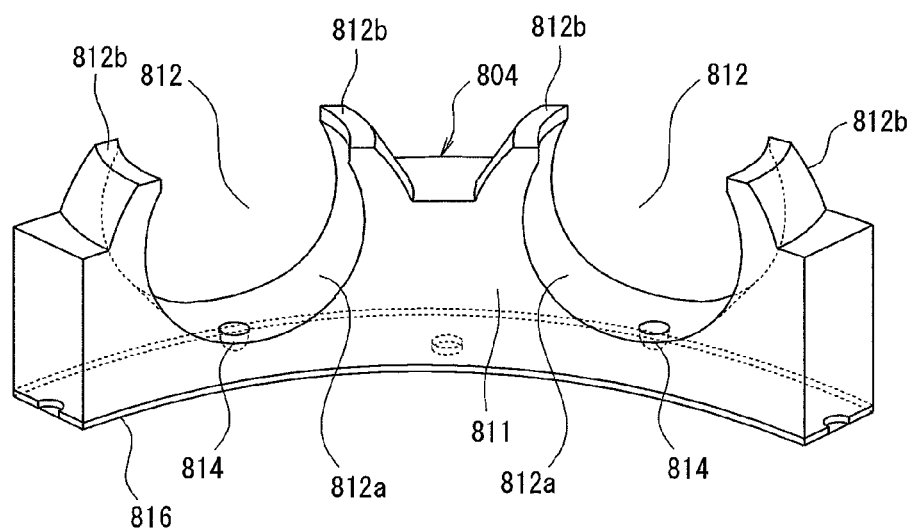
FIG. 82 is a partially perspective view of a resin snap cage embedded in the radial ball bearing of FIG. 81.

Embodiments of the resin snap cage and radial ball bearing according to the eighth invention of the present application will be described with reference to drawings. FIG. 81 is a vertical sectional view showing structure of the radial ball bearing, and FIG. 82 is a partial perspective view of a resin snap cage used in this radial ball bearing.

The radial ball bearing in FIG. 81 comprises an inner ring 801, an outer ring 802, a plurality of balls 803 arranged rotatably between the inner ring 801 and outer ring 802, a resin snap cage 804 which retains two or more balls 803 between the inner ring 801 and outer ring 802, and shields 805 and 805.

In addition, a bearing space surrounded by the inner ring 801, outer ring 802, and shields 805 and 805 is filled with a grease composition (lubricant) which is not illustrated, and it is sealed by the shield 805 in the radial ball bearing. Then, lubrication of contact surfaces of raceway surfaces of the inner ring 801 and outer ring 802 and the ball 803 is performed by this grease composition.

Next, structure of the resin snap cage 804 in FIG. 82 will be described. The resin snap cage 804 comprises a circular main part 811 and a plurality of pockets 812 provided at an end face in the axial direction of this circular main part 811, and each pocket 812 is formed of a concave portion 812a provided at an end face in an axial direction of the circular main part 811, and one pair of elastic pieces 812b and 812b which is arranged oppositely with keeping an interval in edges of the concave portion 812a mutually. Then, faces of this pair of elastic pieces 812b and 812b which face each other, and an inner surface of the concave portion 812a form one spherical concave surface or a cylindrical surface continuously.

Such a resin snap cage 804 can retain the ball 803 rotatably in each pocket 308 by pushing the ball 803 in between one pair of elastic pieces 812b and 812b with expanding the interval between the elastic pieces 812b and 812b resiliently.

Near a bottom of an inner surface of the pocket 812 of this resin snap cage 804, a lubricant reservoir 814 which is constructed of a recessed portion is formed, and a grease composition can be accommodated here. Therefore, since the grease composition is retained in the lubricant reservoir 814 and it is hard to scatter even if a radial ball bearing is used on a high speed rotation condition, a sufficient amount of grease composition is retained in a surface of the ball 803, or raceway surfaces of the inner ring 801 and outer ring 802, and it is hard to generate lubrication shortage in the radial ball bearing.

A form of the lubricant reservoir 814 is not limited particularly but it may be hemispherical as shown in FIG. 82, but it may be a groove extending circumferentially as illustrated in FIG. 83. In addition, as illustrated in FIG. 84, a part or all of the radially inside wall surface may be removed among wall surfaces which form the recessed portion which is the lubricant reservoir 814. In such structure as shown in FIG. 84, a grease composition is replenished to the lubricant reservoir 814 from a radial interior.

A reinforcing member for enhancing rigidity may be installed to this resin snap cage 804. For example, as shown in FIG. 82, when installing a circular reinforcing member 816 along the circular main part 811 at the other end face in an axial direction (an edge face opposite to an edge face in which the pocket 812 is provided) of the circular main part 811, since rigidity of the resin snap cage 804 is improved, even if the radial ball bearing is used under a high-speed rotation condition of 800,000 or more of dmn value, the resin snap cage 804 hardly deforms outside in a radial direction by a rotational centrifugal force. Therefore, the stable high-speed rotation becomes possible.

It is preferable that material of the reinforcing member 816 is metal such as SPCC. Nevertheless, if heat resistance and rigidity are sufficient, it is not limited to metal, but a resin and a resin composite containing a fibrous filler (e.g., a glass fiber and a carbon fiber) can be also used. When such a resin and a resin composite are used, further weight saving of the resin snap cage 804 is possible.

In addition, although a method of fixing the reinforcing member 816 to the resin snap cage 804 is not limited particularly, it is preferable to manufacture the resin snap cage 804 by insert molding that the reinforcing member 816 is used as an insert, and to form the circular main part 811 and reinforcing member 816 in one piece. When not only unifying the circular main part 811 and reinforcing member 816 by insert molding but also adopting structure of connecting tips of the elastic pieces 812b and 812b, since deformation of the resin snap cage 804 outside in a radial direction can be further suppressed, it becomes possible to use the radial ball bearing on a high speed rotation condition of 1 million or more of dmn value.

Moreover, this embodiment illustrates an example of the present invention and the present invention is not limited to this embodiment. For example, a guide system of the resin snap cage 804 is not limited particularly, but it may be a ball guide system or a bearing ring guide system. Nevertheless, in the case of a bearing ring guide system, since an inside diameter surface and an outside diameter surface of the resin snap cage 804 slide with bearing rings, there is a possibility that wear may arise in the resin snap cage 804 or bearing rings, or torque fluctuations may arise in the bearing. The tendency becomes large when the resin snap cage 804 comprises the metal reinforcing members 816 particularly. Therefore, it is preferable that the guide system of the resin snap cage 804 is a ball guide system.

In addition, although material of the resin snap cage 804 is not limited particularly, high-performance engineering plastics which are injection-moldable, such as a polyamide resin (e.g., polyamide 46 and polyamide 66), polyphenylene sulfide (e.g., L-PPS), and polyether ether ketone, are preferable. In addition, by adding 10 to 50 wt % of fibrous filler (e.g., a glass fiber and a carbon fiber) to such a resin, while the rigidity of the cage is enhanced, dimensional accuracy can be enhanced.

INDUSTRIAL APPLICABILITY

Even if the resin cage in accordance with the present invention is used in high-speed rotation, deformation, heat generation, and wear do not arise easily. In addition, even if the rolling bearing in accordance with the present invention is used in high-speed rotation, heat generation, and wear do not arise easily.

The invention claimed is:

1. A resin snap cage for a radial ball bearing which comprises: a circular main part made of a resin; a plurality of pockets provided at a first end face in an axial direction of the circular main part; and a reinforcing member concentrically provided along the circular main part at a second end face in the axial direction of the circular main part, characterized in that the following four conditions are fulfilled:
   Condition 1: The reinforcing member has a rectangular cross-sectional shape at a plane parallel to the axial direction;
   Condition 2: The reinforcing member is embedded to be integrally formed with a recessed portion formed at the second end face in the axial direction of the circular main part;
   Condition 3: The resin snap cage is manufactured by insert molding using the reinforcing member as an insert, and the circular main part and the reinforcing member are integrally formed at the time of the insert molding or the reinforcing member is integrally fixed to the circular main part that has been manufactured by injection molding with an adhesive or press fitting; and
   Condition 4: When F denotes a radial distance between an outside diameter surface of the circular main part and an outside diameter surface of the reinforcing member, G denotes a radial distance between an inside diameter surface of the circular main part and an inside diameter surface of the reinforcing member, and E denotes an axial direction distance between a bottom face of one of the pockets and a pocket-side surface of the reinforcing member, E, F, and G exceed zero and the outside diameter surface, the inside diameter surface, and the pocket-side surface of the reinforcing member are covered with the circular main part and a surface opposite to the pocket side is exposed.

2. The resin snap cage for the radial ball bearing according to claim 1, characterized in that shot peening or chemical conversion treatment is given to a surface of the reinforcing member to define projections and dents with a surface roughness Ra of 0.3 μm or more.

3. The resin snap cage for the radial ball bearing according to claim 1, characterized in that shot peening or chemical conversion treatment is given to a surface of the reinforcing member to define projections and dents with a surface roughness Ra of 0.8 μm or more.

4. The resin snap cage for the radial ball bearing according to claim 1, characterized in that the pocket-side surface of the reinforcing member is concave.

5. The resin snap cage for the radial ball bearing according to claim 1, characterized in that a portion opposite to the pocket side in the axial direction of the reinforcing member has a tapered shape such that a width between the inside diameter surface and outside diameter surface is gradually smaller from the pocket side to the opposite of the pocket side.

6. The resin snap cage for the radial ball bearing according to claim 1, characterized in that: the reinforcing member is manufactured by stamping from a metal plate; and a lower part in a stamping direction is arranged to face the pockets.

7. An angular contact ball bearing which comprises: an inner ring; an outer ring; a plurality of rolling elements rotatably arranged between the inner ring and the outer ring; and a cage which holds the rolling elements between the inner ring and the outer ring, characterized in that the cage is the resin snap cage for the radial ball bearing according to claim 1.

8. A double row ball bearing which comprises: an inner ring; an outer ring; a plurality of rolling elements rotatably arranged between the inner ring and the outer ring; and a cage which holds the rolling elements between the inner ring and the outer ring, characterized in that the cage is the resin snap cage for the radial ball bearing according to claim 1.

9. A resin snap cage for a radial ball bearing which comprises: a circular main part made of a resin; a plurality of pockets provided at a first end face in an axial direction of the circular main part; and a circular reinforcing member concentrically provided along the circular main part at a second end face in the axial direction of the circular main part, characterized in that the following four conditions are fulfilled:

Condition 5: The reinforcing member has a rectangular shape at a plane parallel to the axial direction;

Condition 6: The reinforcing member is fixed to the second end face in the axial direction of the circular main part, and an outside diameter surface, an inside diameter surface, and a surface opposite to the pocket side are not covered with the circular main part, but are exposed;

Condition 7: The resin snap cage is manufactured by insert molding using the reinforcing member as an insert, and the circular main part and the reinforcing member are integrally formed at the time of the insert molding or the reinforcing member is integrally fixed to the circular main part that has been manufactured by injection molding with an adhesive or press fitting; and Condition 8: When F denotes a radial distance between an outside diameter surface of the circular main part and an outside diameter surface of the reinforcing member, G denotes a radial distance between an inside diameter surface of the circular main part and an inside diameter surface of the reinforcing member, and E denotes an axial direction distance between a bottom face of one of the pockets and a pocket-side surface of the reinforcing member, E, F, and G exceed zero.

* * * * *